United States Patent [19]

Kobayashi et al.

[11] Patent Number: 5,305,126
[45] Date of Patent: Apr. 19, 1994

[54] POLYMER-DISPERSED LIQUID CRYSTAL MATERIAL WITH IN-SITU POLYMERIZED LIQUID CRYSTAL POLYMER GRAINS DISPERSED IN A LAYER OF LIQUID CRYSTAL MATERIAL SEALED BETWEEN SUBSTRATES AND FIELD ELECTRODES

[75] Inventors: Hidekazu Kobayashi; Kiyohiro Samizu; Jin-Jei Wu, all of Suwa, Japan

[73] Assignee: Seiko Epson Corporation, Tokyo, Japan

[21] Appl. No.: 798,478

[22] Filed: Nov. 26, 1991

[30] Foreign Application Priority Data

| Nov. 26, 1990 | [JP] | Japan | 2-321779 |
| Feb. 12, 1991 | [JP] | Japan | 3-18750 |
| Feb. 20, 1991 | [JP] | Japan | 3-26024 |
| Feb. 20, 1991 | [JP] | Japan | 3-26025 |
| Mar. 22, 1991 | [JP] | Japan | 2-59126 |
| May 23, 1991 | [JP] | Japan | 3-118619 |
| Jun. 7, 1991 | [JP] | Japan | 3-136170 |
| Jun. 12, 1991 | [JP] | Japan | 3-140008 |
| Jun. 17, 1991 | [JP] | Japan | 3-144583 |
| Jun. 25, 1991 | [JP] | Japan | 3-153116 |
| Jul. 9, 1991 | [JP] | Japan | 3-167972 |
| Aug. 9, 1991 | [JP] | Japan | 3-200716 |
| Sep. 3, 1991 | [JP] | Japan | 3-222982 |
| Oct. 29, 1991 | [JP] | Japan | 3-282703 |

[51] Int. Cl.$^5$ .................................. G02F 1/133
[52] U.S. Cl. ................................ 359/52; 359/51; 359/70; 359/73; 359/101
[58] Field of Search .......... 359/51, 52, 73, 70, 359/96, 101, 93, 94, 103

[56] References Cited

U.S. PATENT DOCUMENTS

| 3,600,060 | 8/1991 | Kettering | 350/51 |
| 3,872,050 | 3/1975 | Benton et al. | 359/51 |
| 4,613,207 | 9/1986 | Fergason | 359/51 |
| 4,685,771 | 8/1987 | West et al. | 359/51 |
| 4,688,900 | 8/1987 | Doane et al. | 359/52 |
| 4,944,576 | 7/1990 | Lackep et al. | 359/51 |
| 4,949,204 | 2/1991 | Doane et al. | 359/51 |
| 5,093,735 | 3/1992 | Doane et al. | 359/52 |
| 5,188,760 | 2/1993 | Hikmet et al. | 252/299.01 |

FOREIGN PATENT DOCUMENTS

| 0142713 | 6/1989 | Japan | 359/51 |
| 0145635 | 6/1989 | Japan | 359/51 |

OTHER PUBLICATIONS

Makromol. Chem. 189, "In-situ photopolymerization of an oriented liquid-crystalline acrylate", D. Broer et al., 1988, pp. 185-194.
Makromol. Chem. 190, "In-situ photopolymierzation of an oriented liquid-crystalline acrylate, $3^a$", D. Broer et al., 1989, pp. 2255-2268.

(List continued on next page.)

Primary Examiner—William L. Sikes
Assistant Examiner—Huy Mai
Attorney, Agent, or Firm—W. Douglas Carothers, Jr.

[57] ABSTRACT

A polymer dispersed liquid crystal material (PDLC) device is fabricated by sealing a composite layer mixture of components comprising a polymer and liquid crystal material while both are in their liquid phase in a gap portion formed between two substrates of the device. A predetermined directional alignment is transmitted to the polymer via the liquid crystal material by means, for example, of formed directional alignment on surfaces in contact with the composite layer, such as, by deposited alignment films on a surface of at least one of the substrates. The predetermined directional alignment of the polymer is thereafter fixed by means of a polymer hardening method, such as, for example, by polymerization of a polymer precursor, so that the predetermined directional alignment of the polymer is permanently retain within the liquid crystal material, i.e., the polymer is in a solid phase and the liquid crystal material remains in its liquid phase. For better results, a chiral component and/or a light absorbing component may be added to the liquid crystal material.

95 Claims, 35 Drawing Sheets

OTHER PUBLICATIONS

Makromol. Chem. 190, "In-situ photopolymerization of an oriented liquid-crystalline acrylate, 4a)", D. Broer et al., 1989, pp. 3201-3215.

Liquid Crystals, "Anisotropic gels and plasticized networks formed by liquid crystal molecules", R. A. M. Hikmet, Philips Research Laboratories, vol. 9, No. 2, 1991, pp. 405-416.

Mol. Crys. Liq. Cryst., "From Liquid Crystalline Molecules to Anisotropic Gels", R. A. M. Hikmet, Philips Research Laboratories, vol. 198, 1991, pp. 357-370.

Mol. Crys. Liq. Cryst., "Cholexteric Networks Containing Free Molecules", R. A. M. Hikmet et al., Philips Research Laboratories, vol. 200, 1991, pp. 197-204.

Pure & Appl. Chem., "Synthesis, structure and properties of liquid crystalline polymers", by M. Engel et al., vol. 57, No. 7, pp. 1009-1015, 1985.

Polymer Liquid Crystals, "Synthesis, Structure, and Properties of Liquid Crystalline Side Chain Polymers", by H. Finkelmann, 1982, pp. 35-63.

Paul S. Drzaic et al., "High-Brightness Reflective Displays Using Nematic Droplet/Polymer Films", SID 90 Digest, No. 12, pp. 210-213, May 1, 1990.

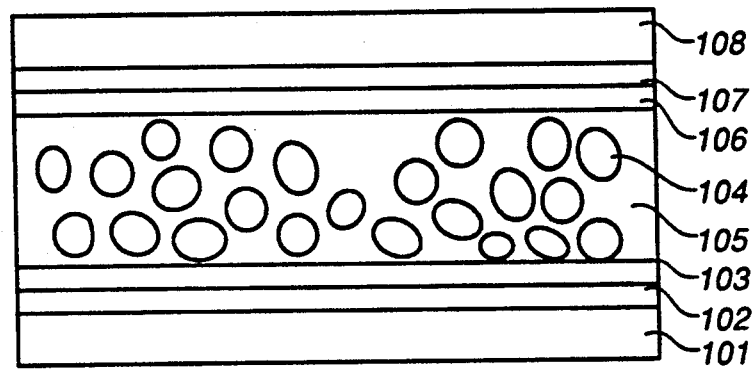
FIG._1
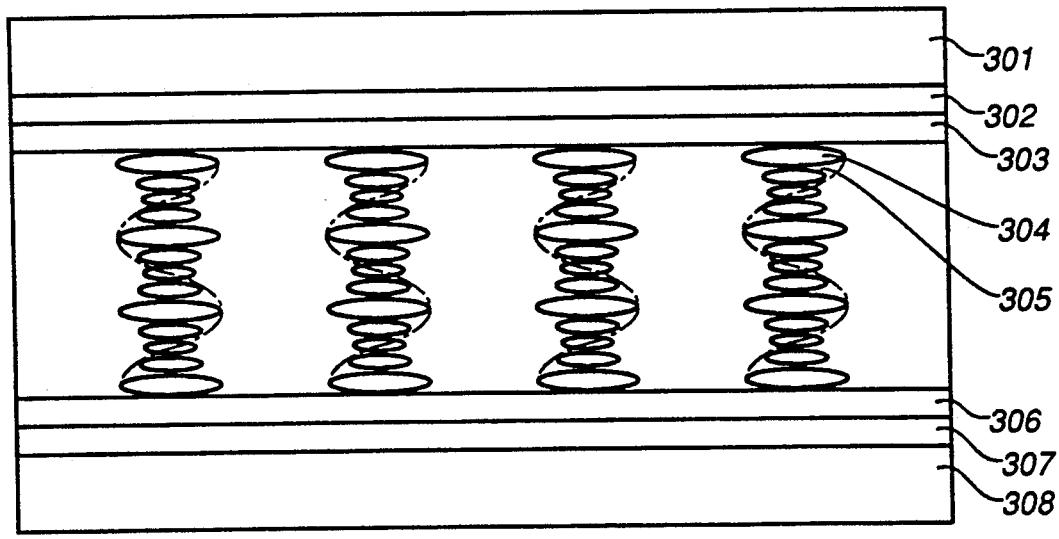
FIG._2

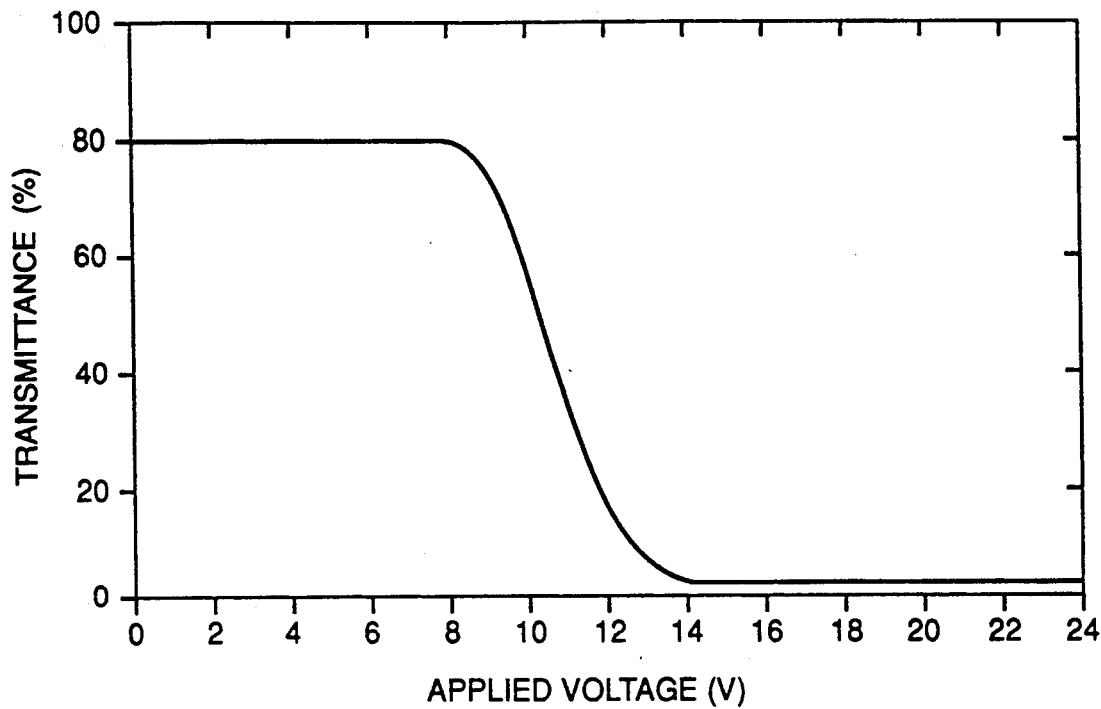
FIG._3
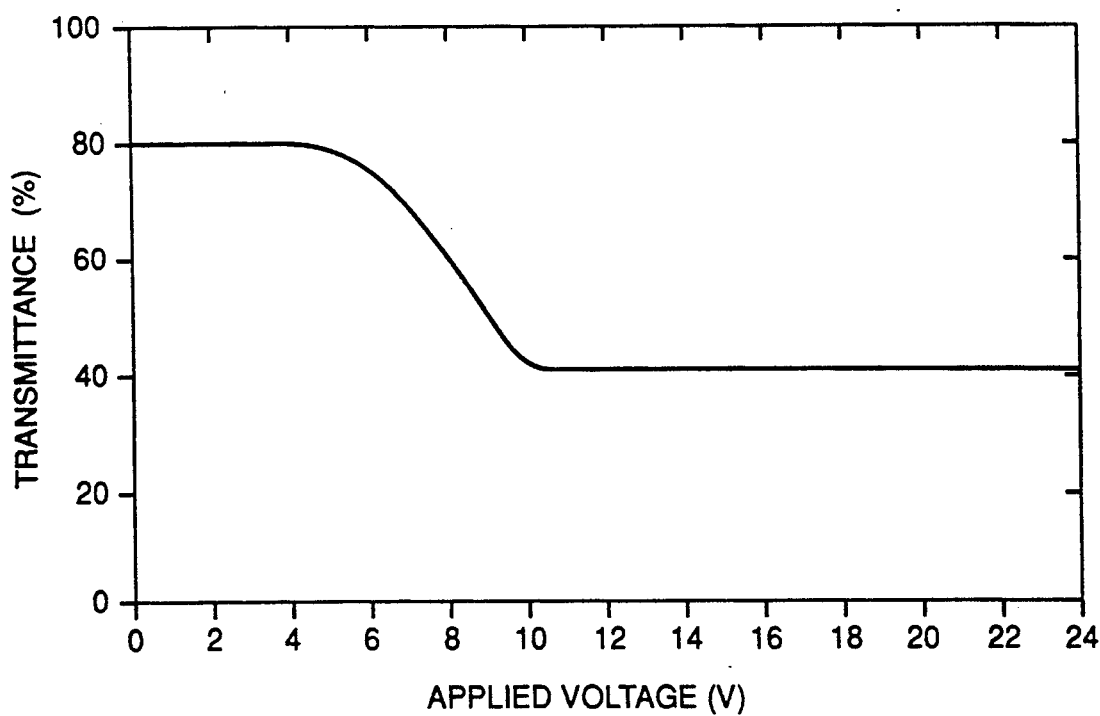
FIG._4

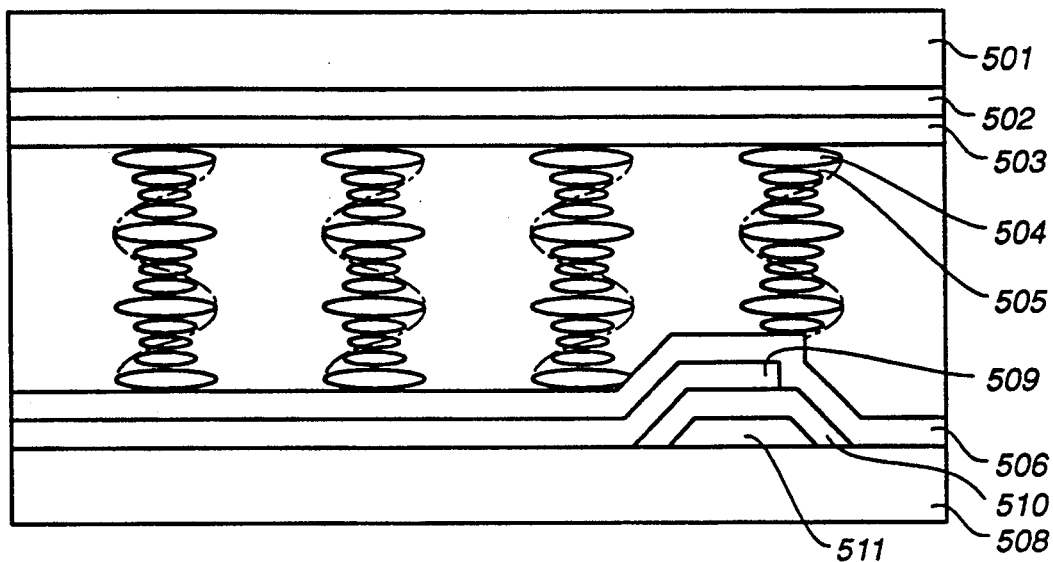
FIG._5
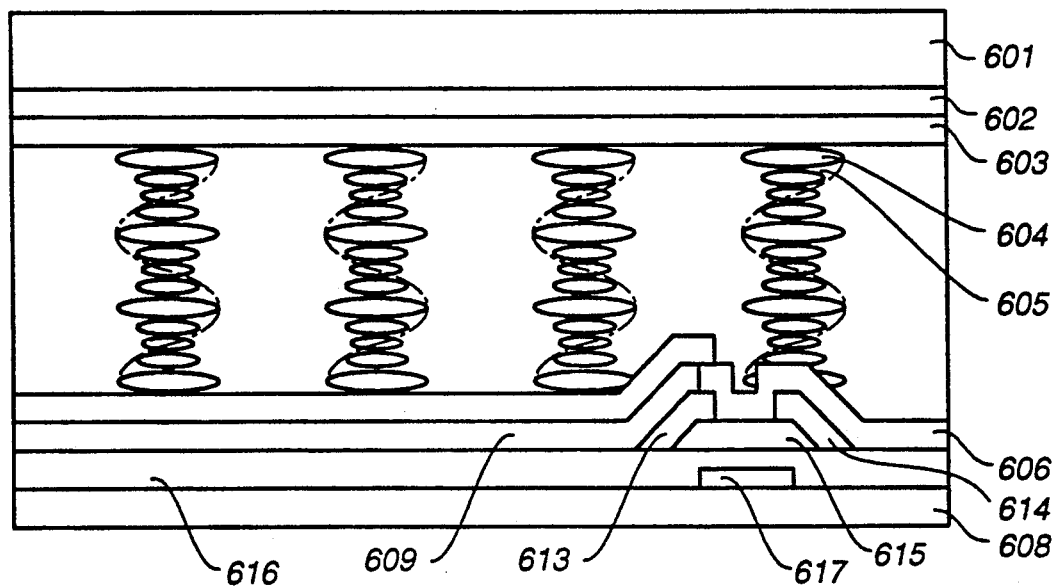
FIG._6

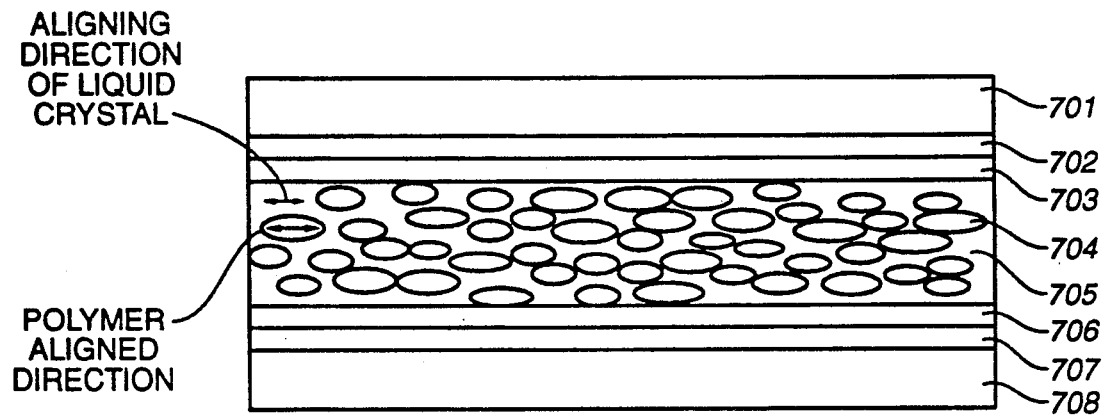
FIG._7A
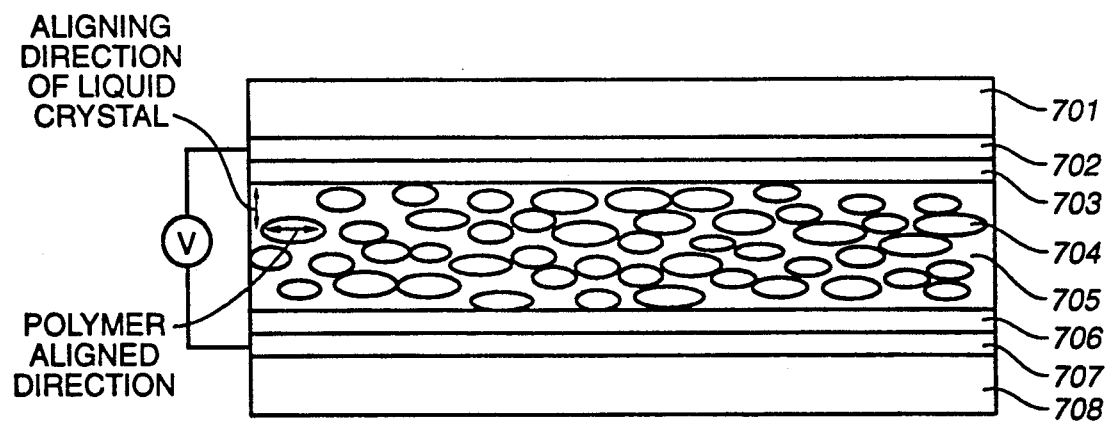
FIG._7B

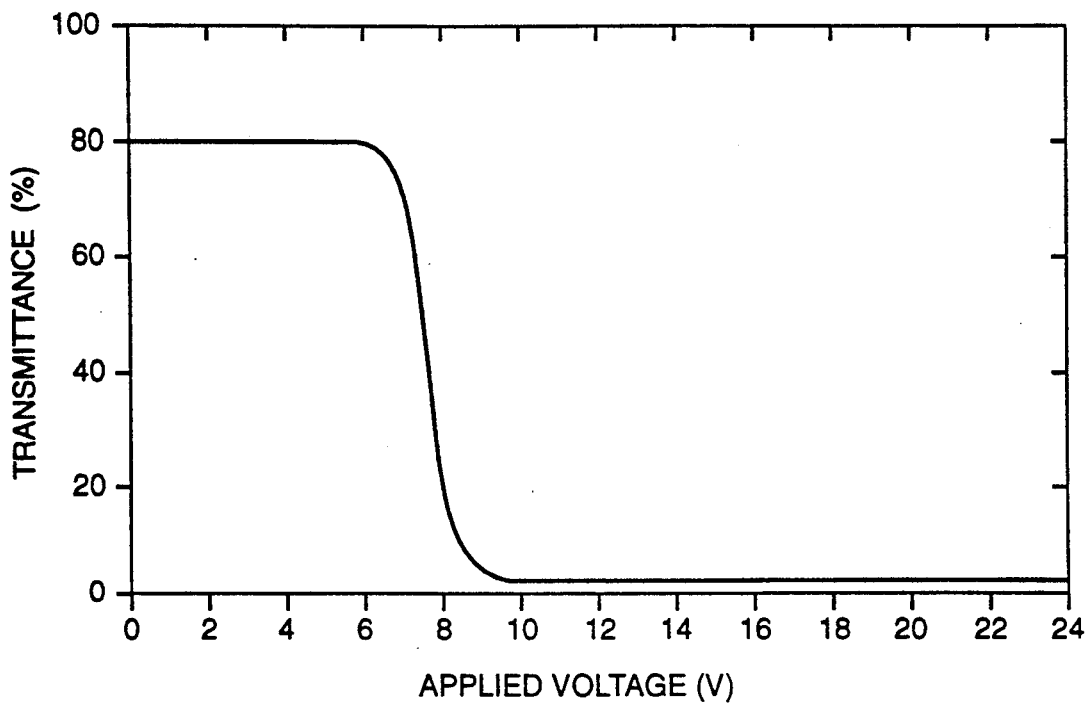
FIG._8
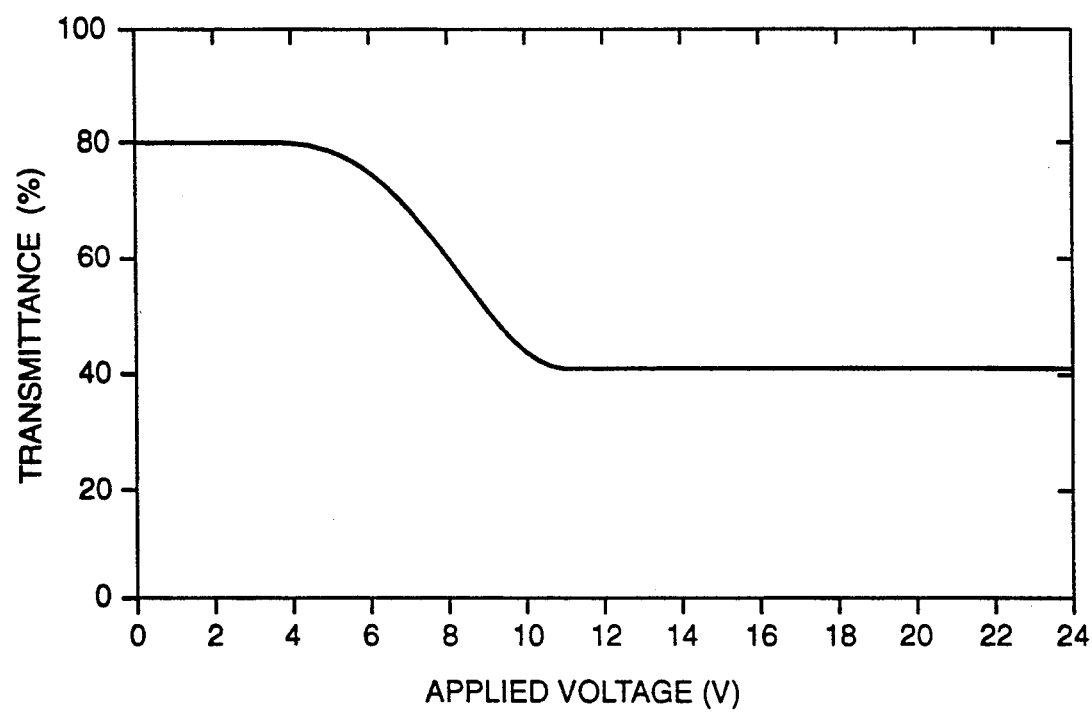
FIG._9
(PRIOR ART)

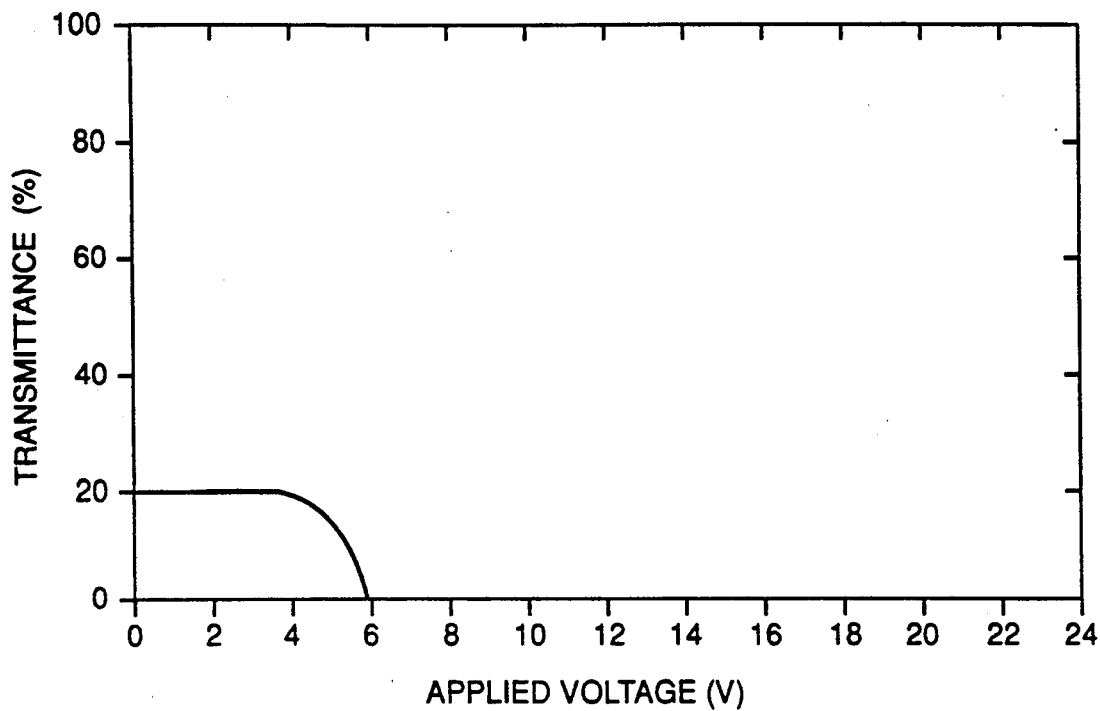
FIG._10
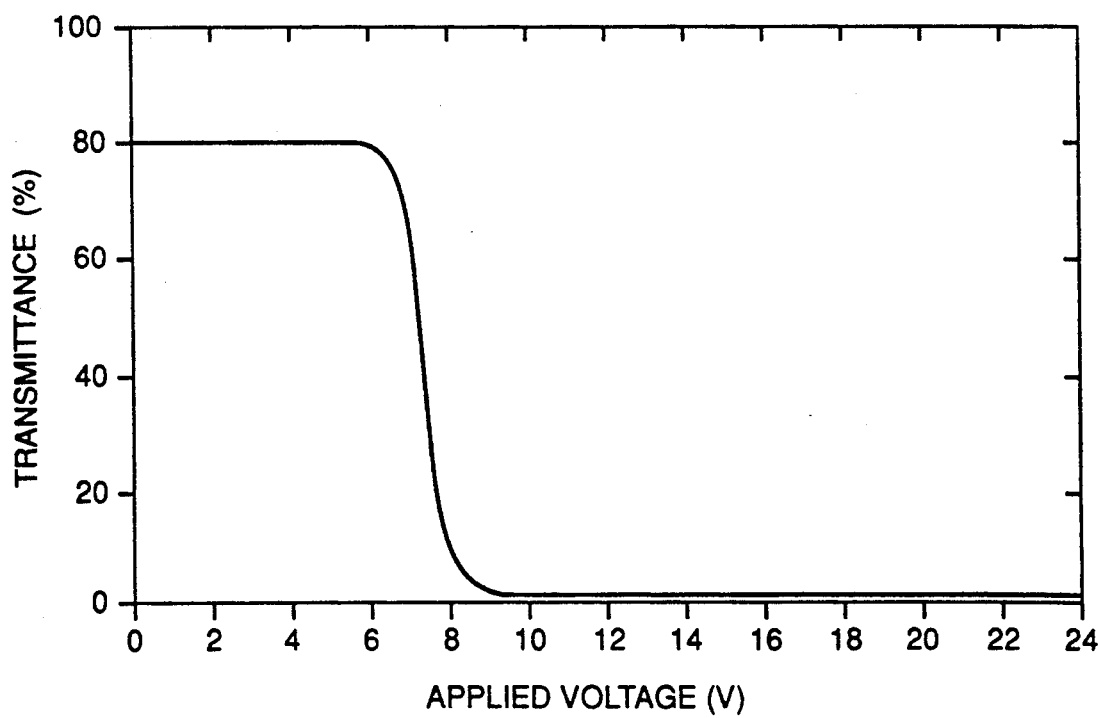
FIG._11

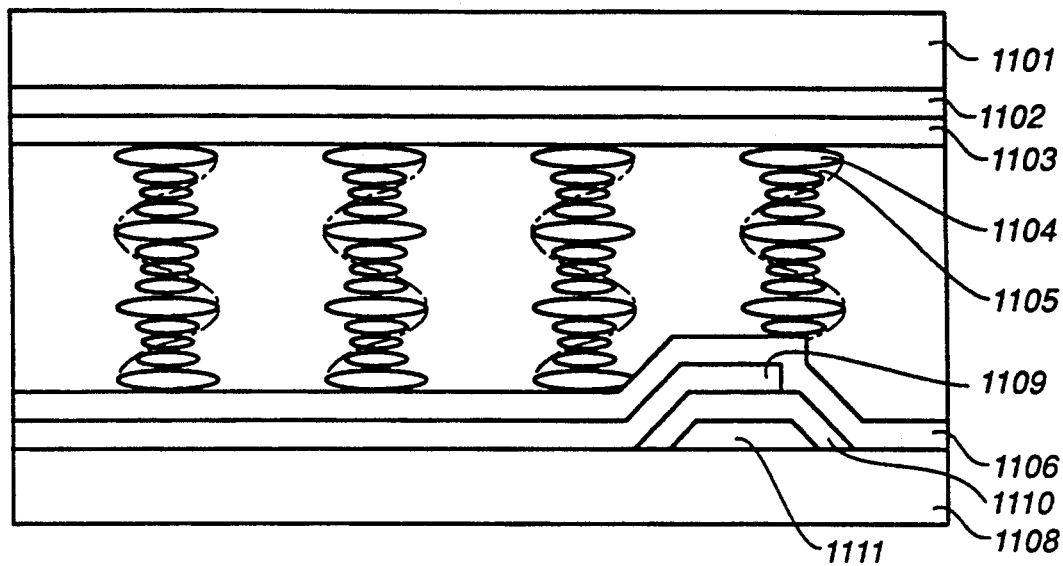
FIG._12
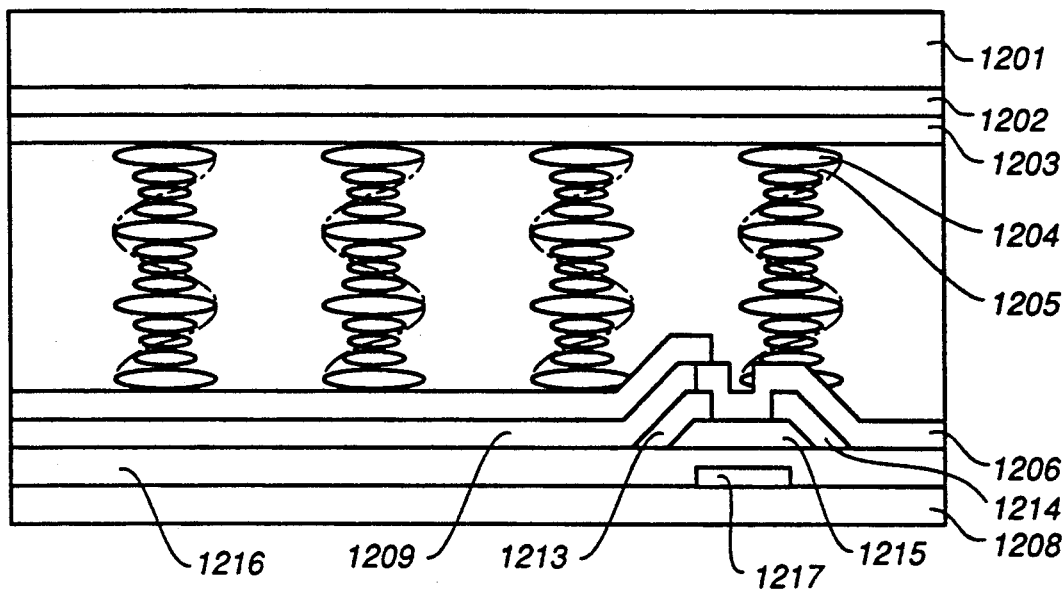
FIG._13

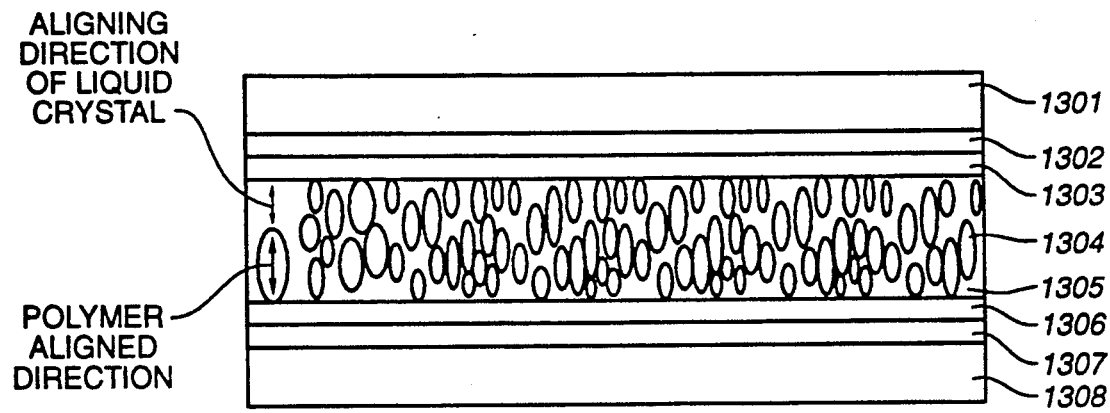
FIG._14A
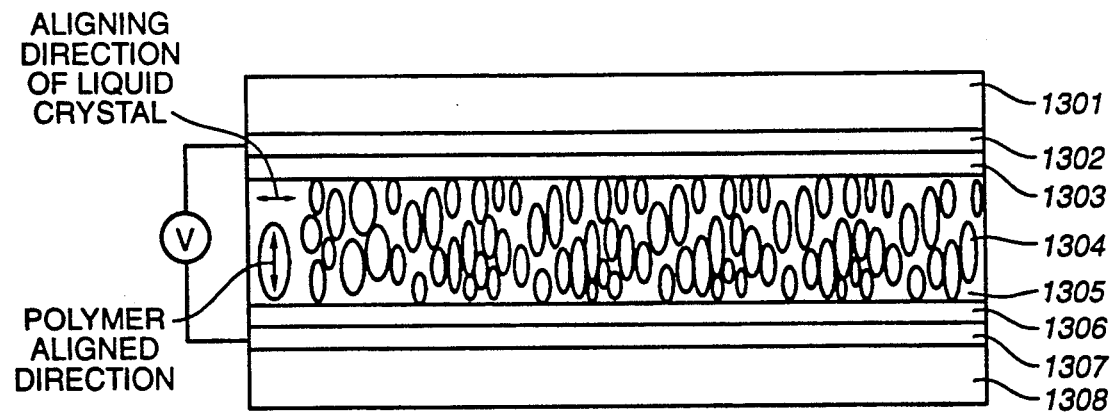
FIG._14B

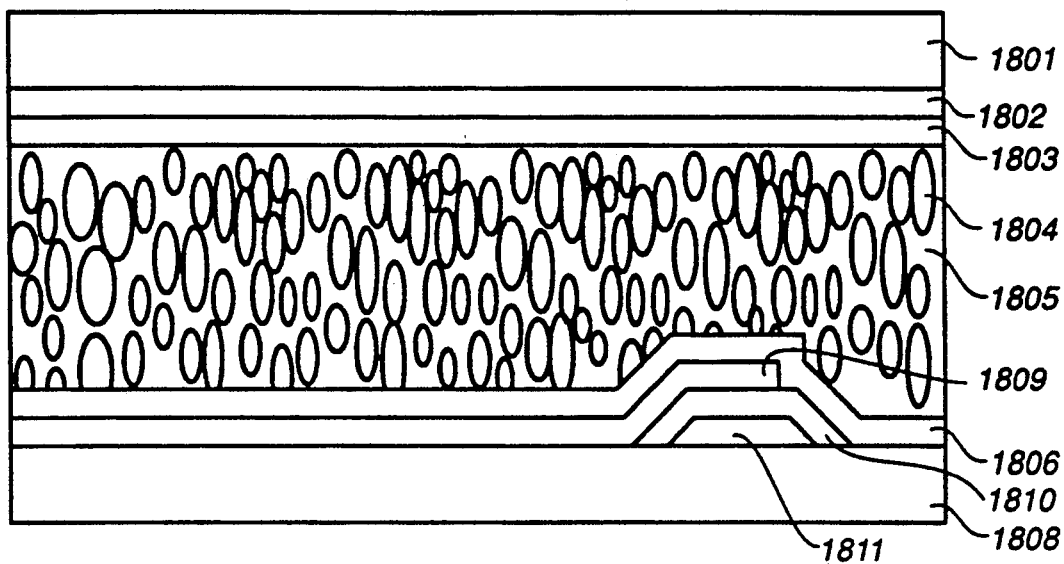
FIG._15
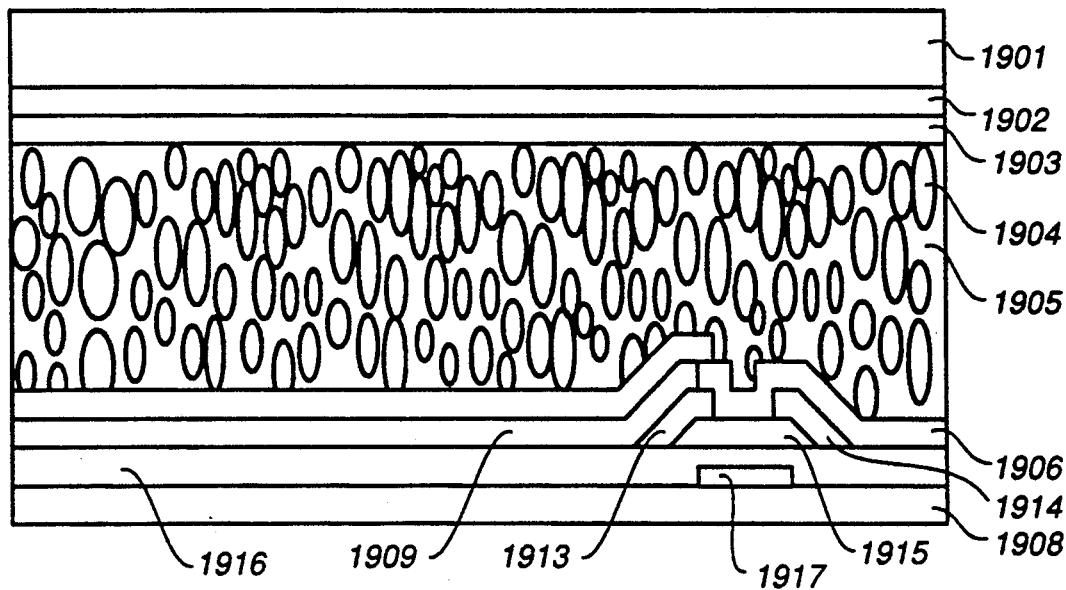
FIG._16

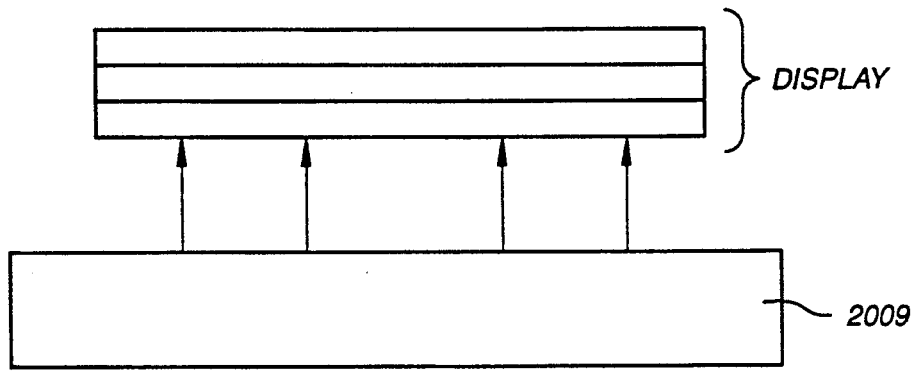
FIG._17
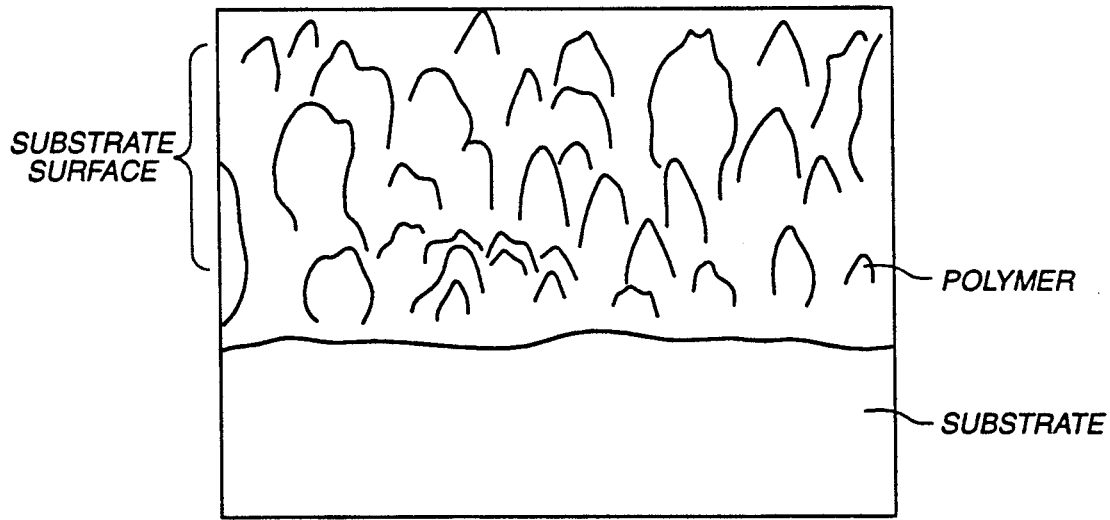
FIG._19

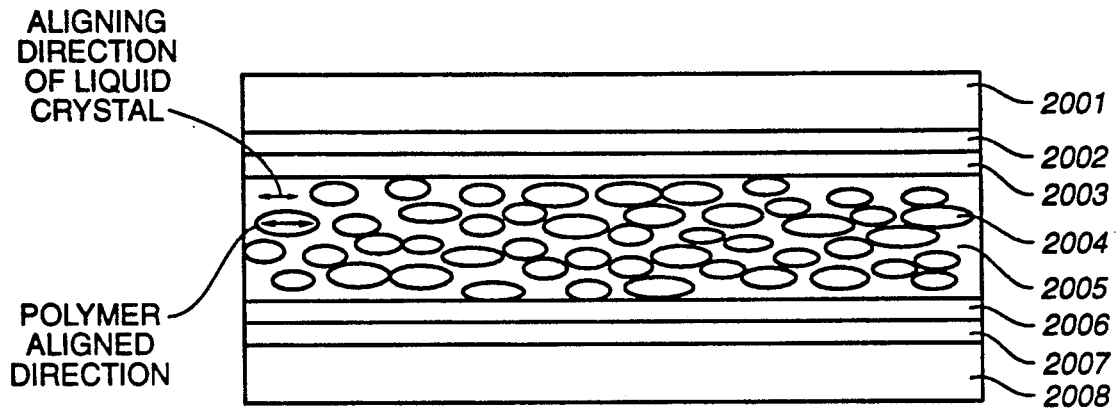
FIG._18A
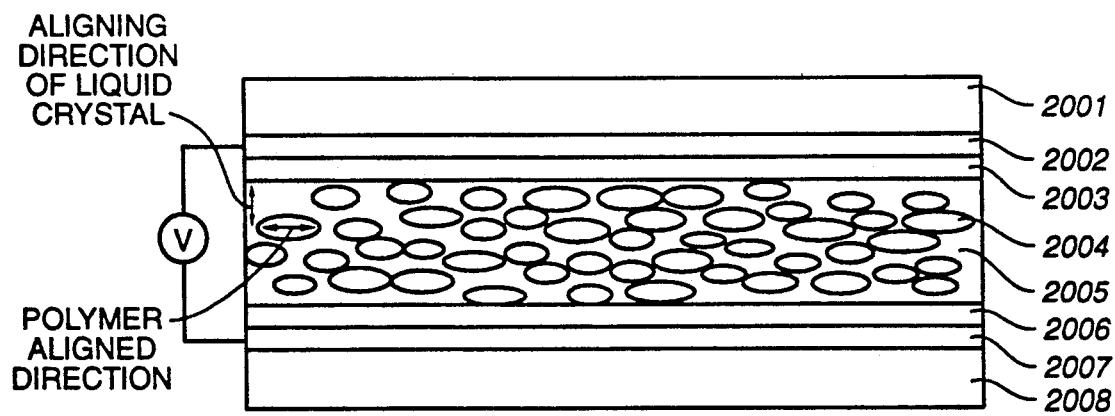
FIG._18B

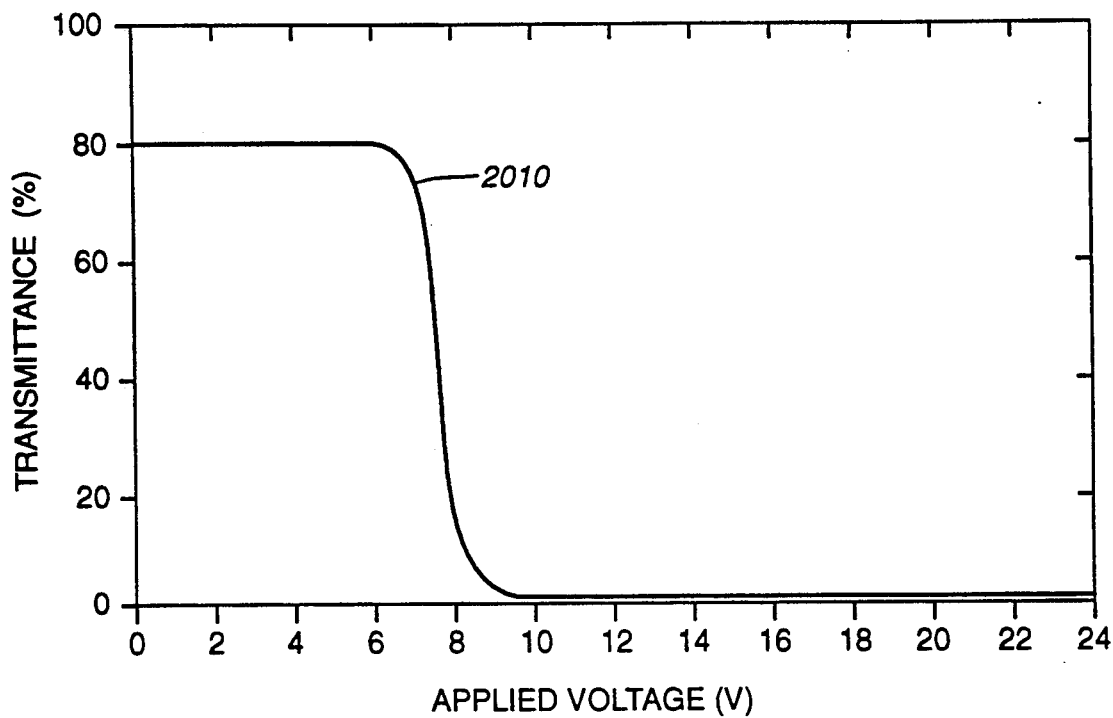
FIG._20
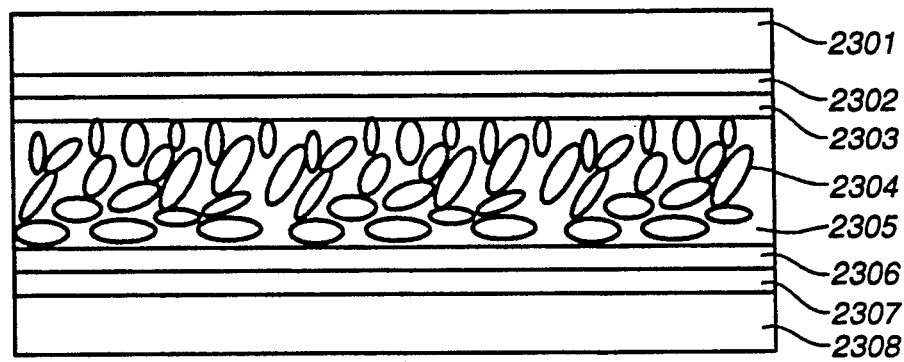
FIG._21

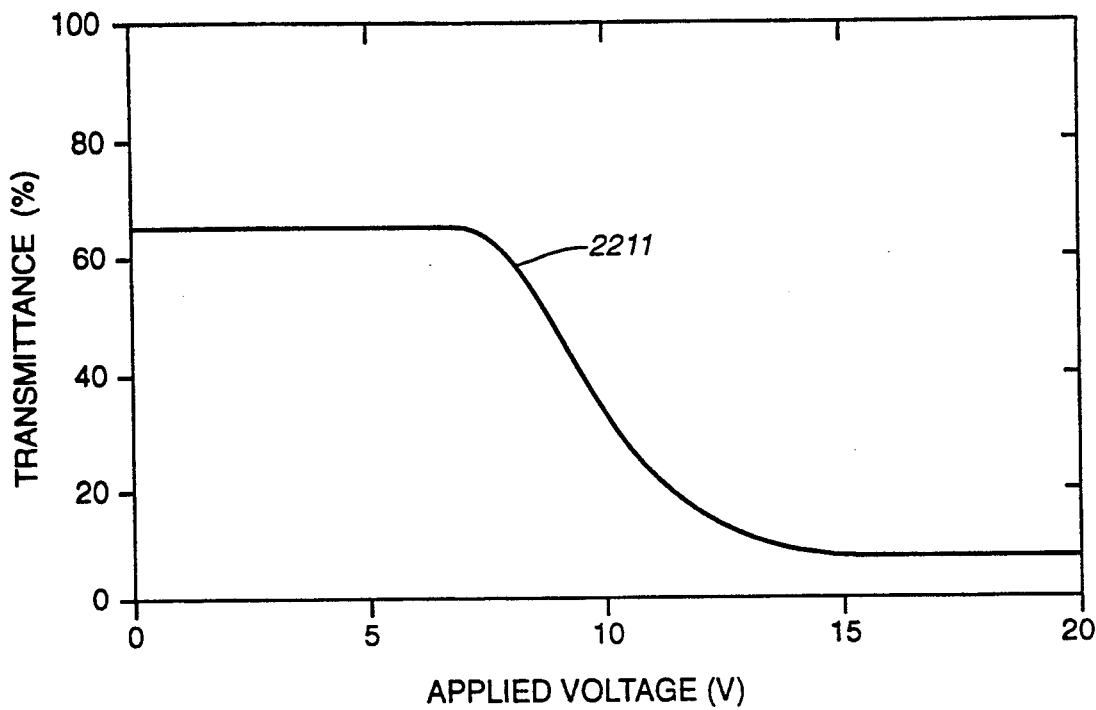
FIG._22
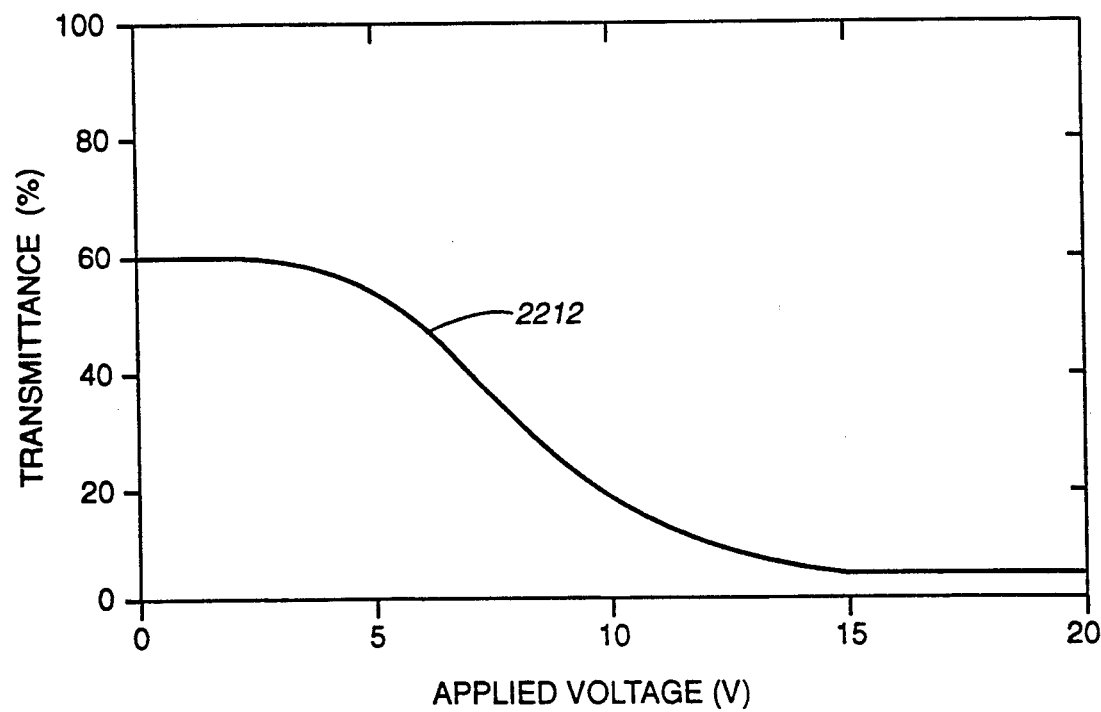
FIG._23
(PRIOR ART)

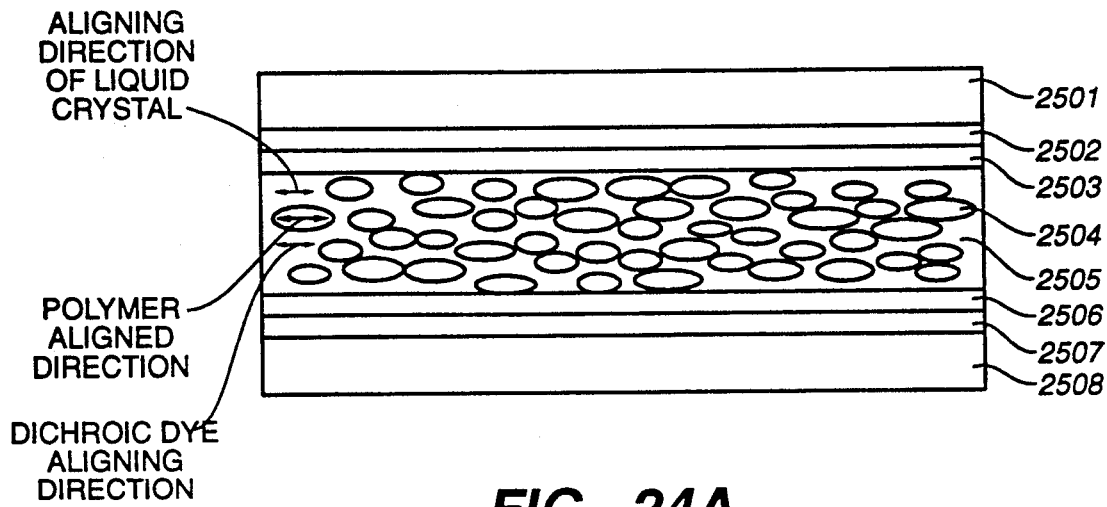
FIG._24A
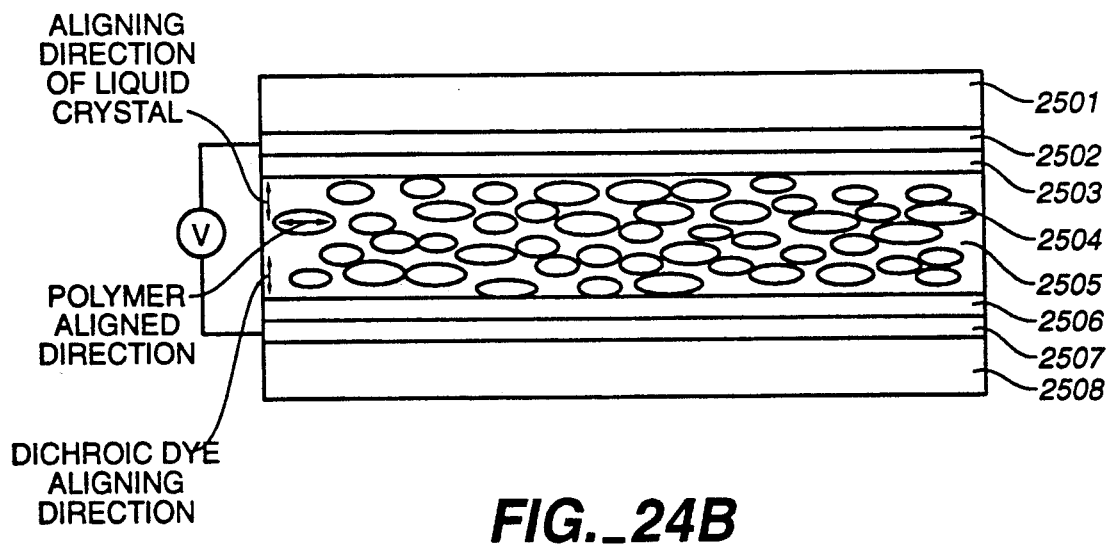
FIG._24B

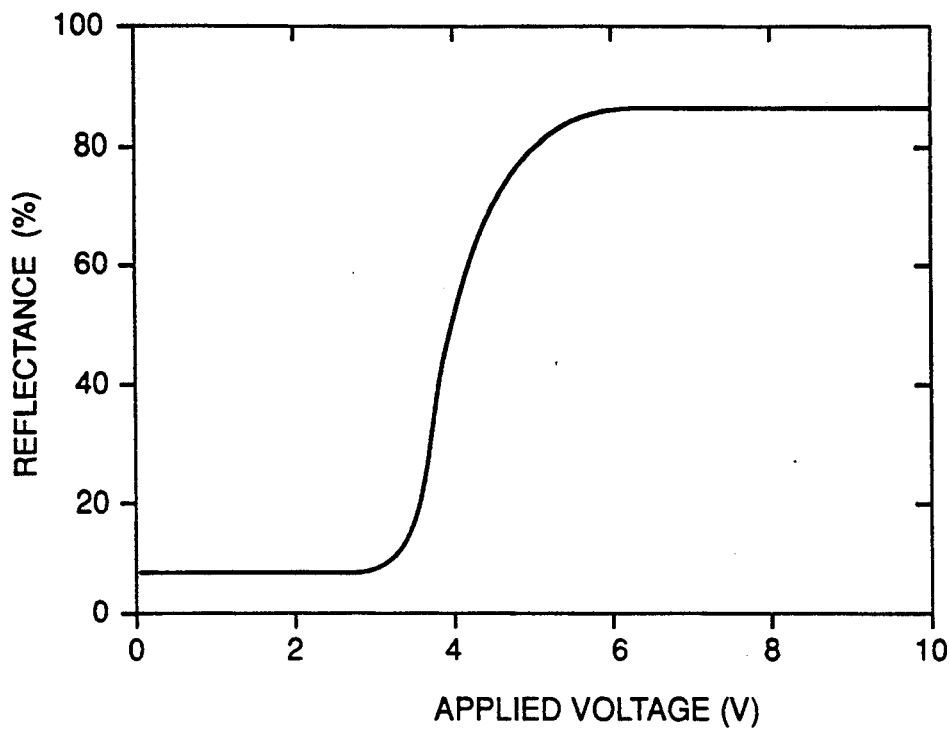
FIG._25
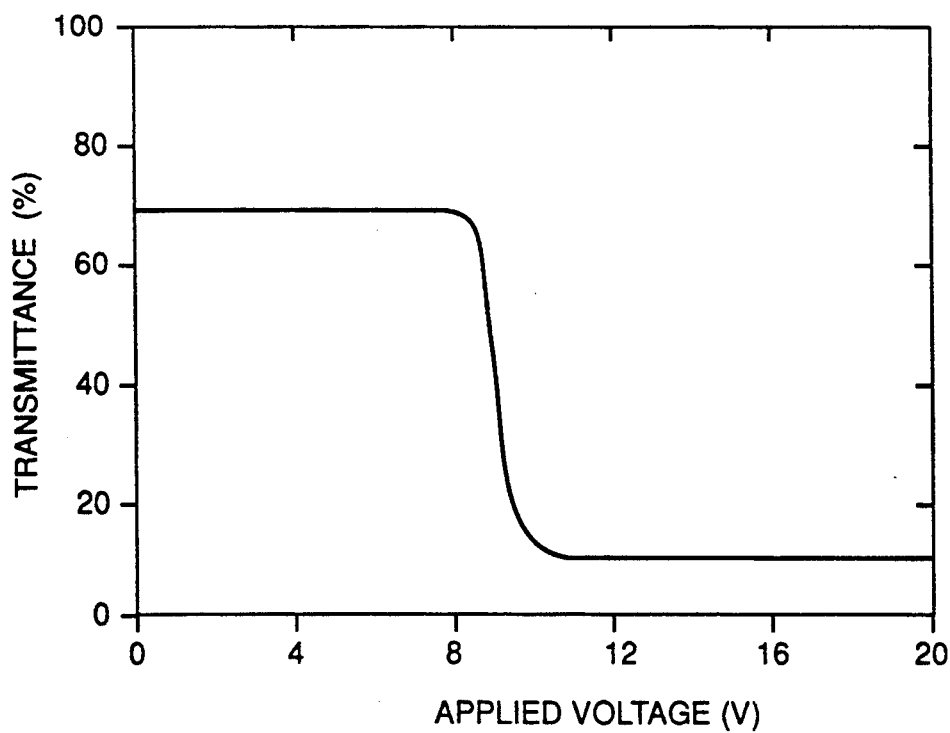
FIG._30

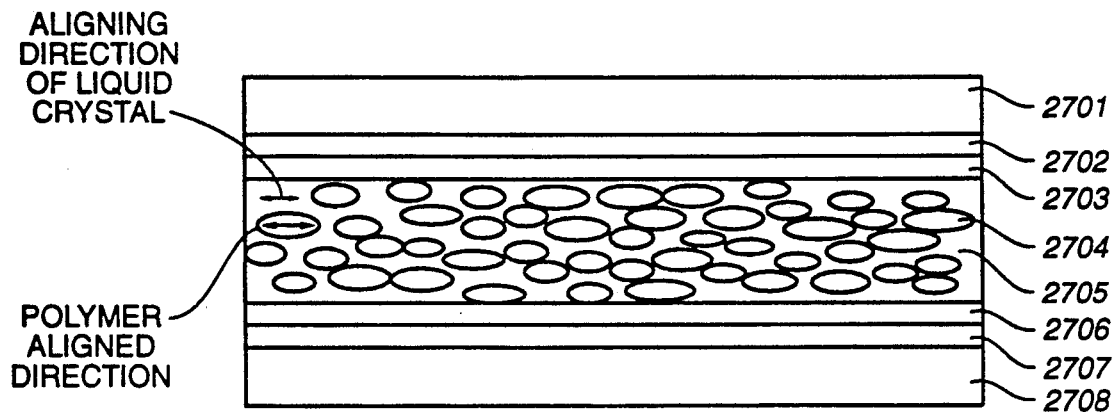
FIG._26A
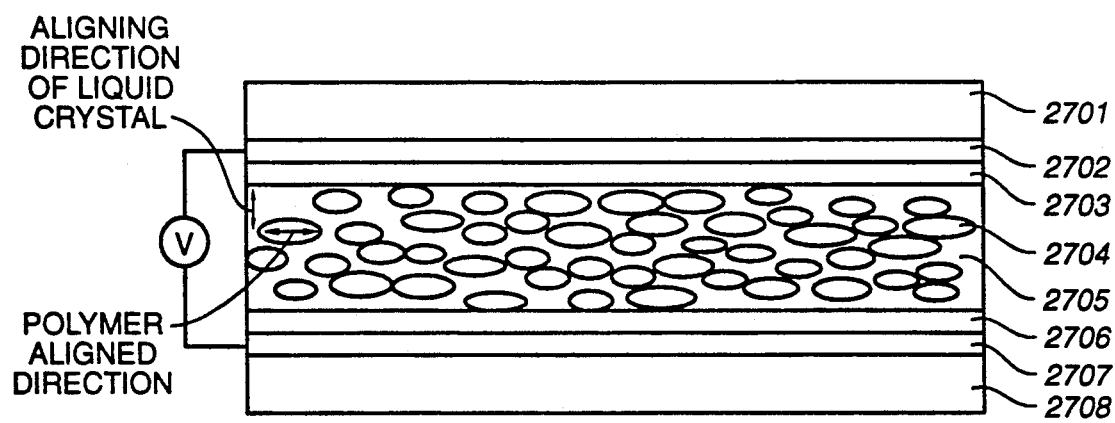
FIG._26B

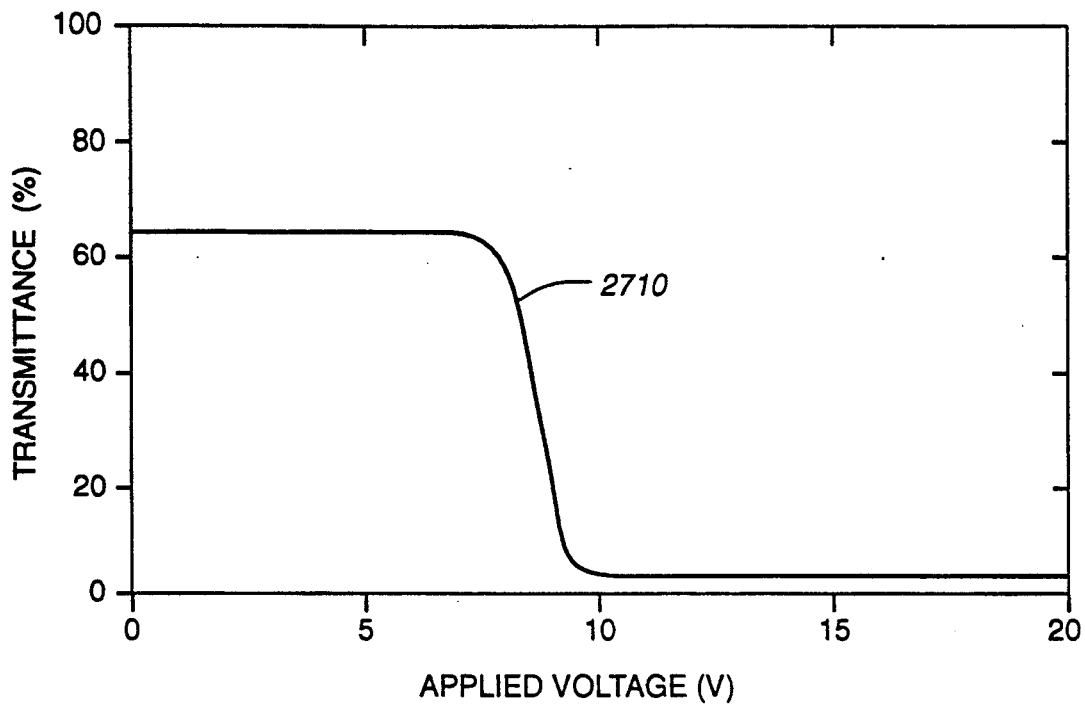
FIG._27
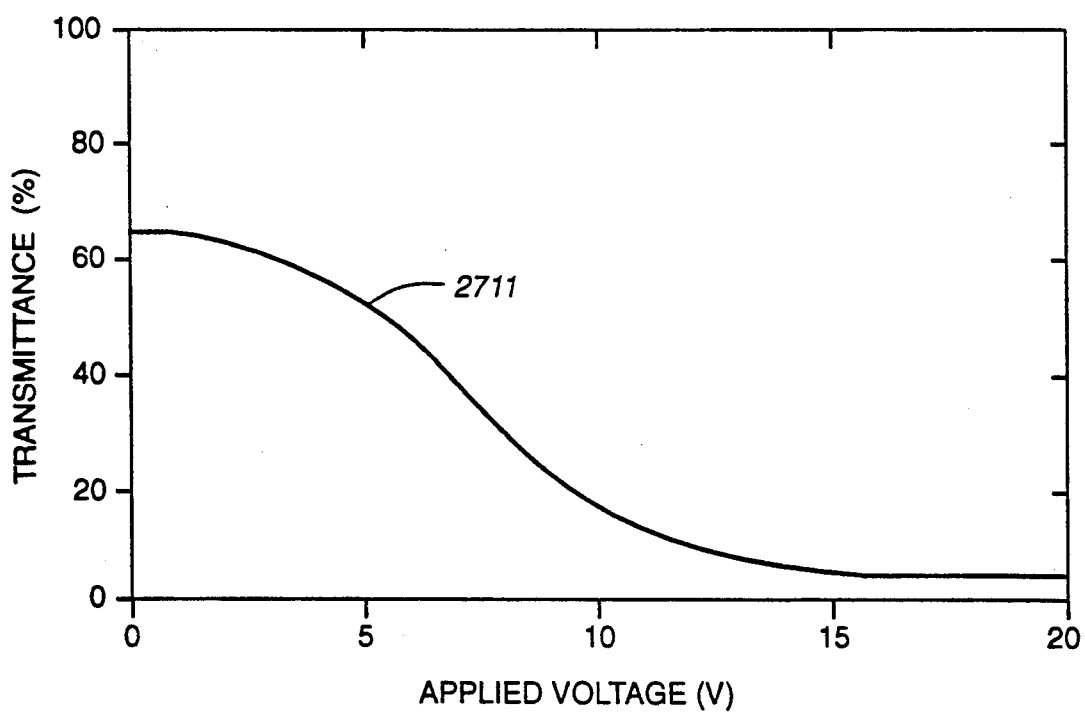
FIG._28
(PRIOR ART)

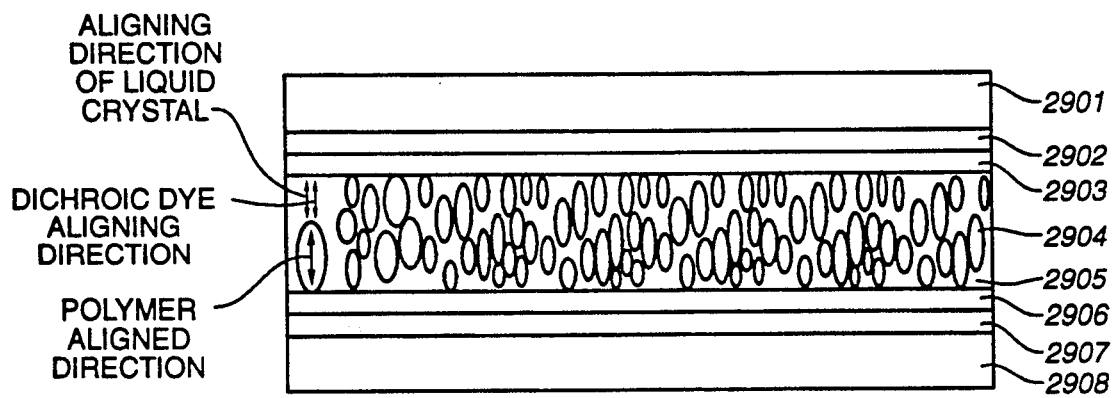
FIG._29A
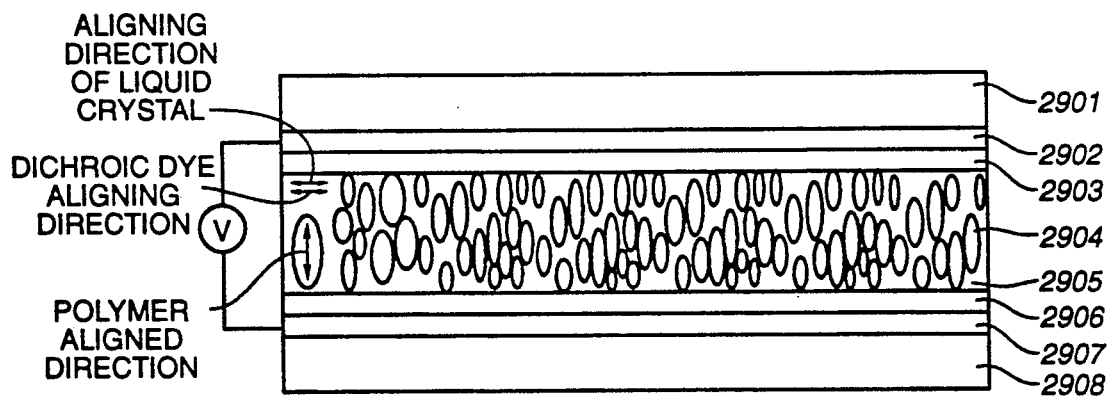
FIG._29B

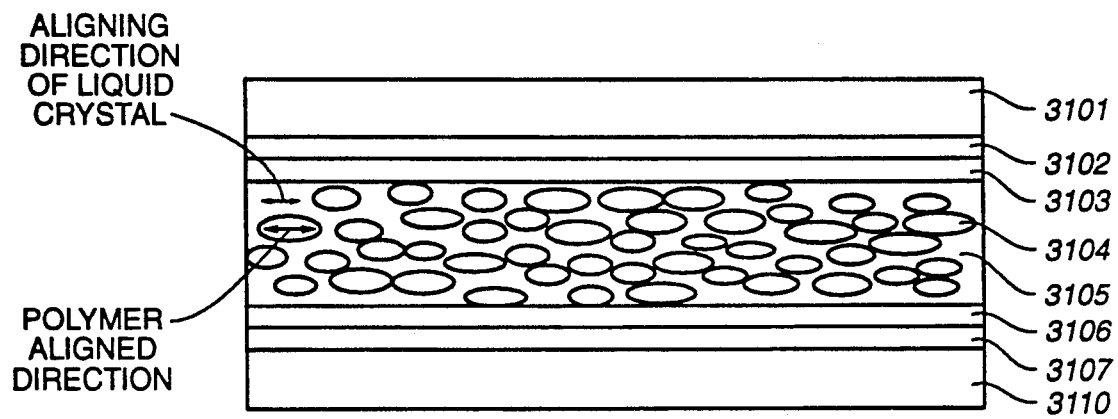
FIG._31A
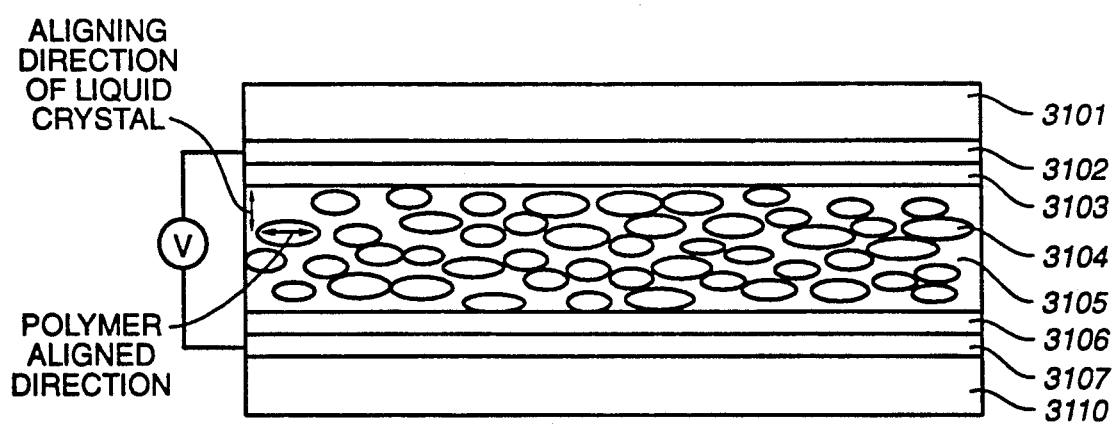
FIG._31B

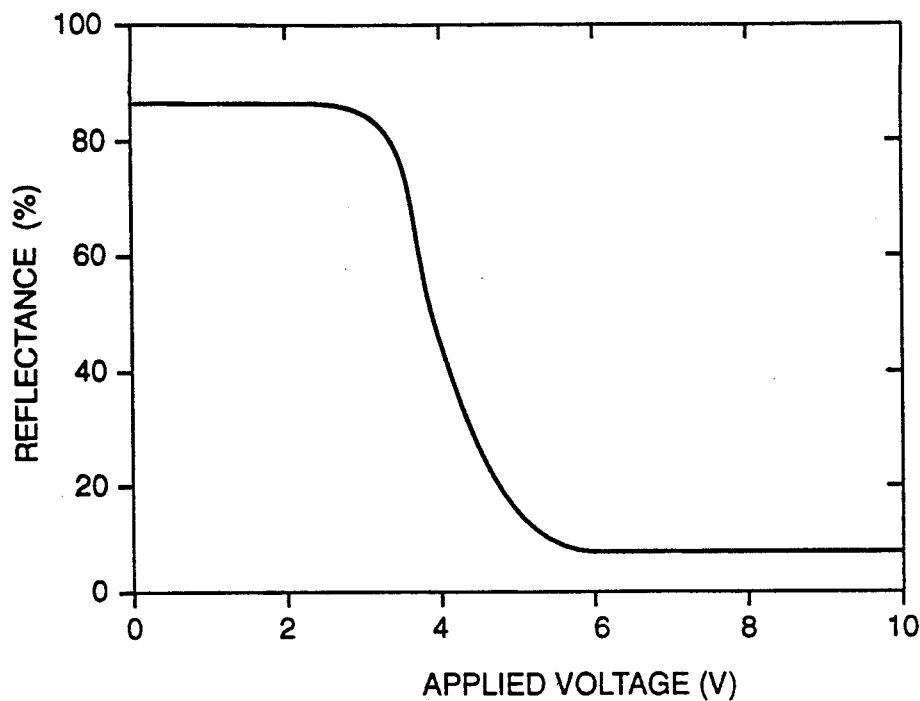
FIG._32
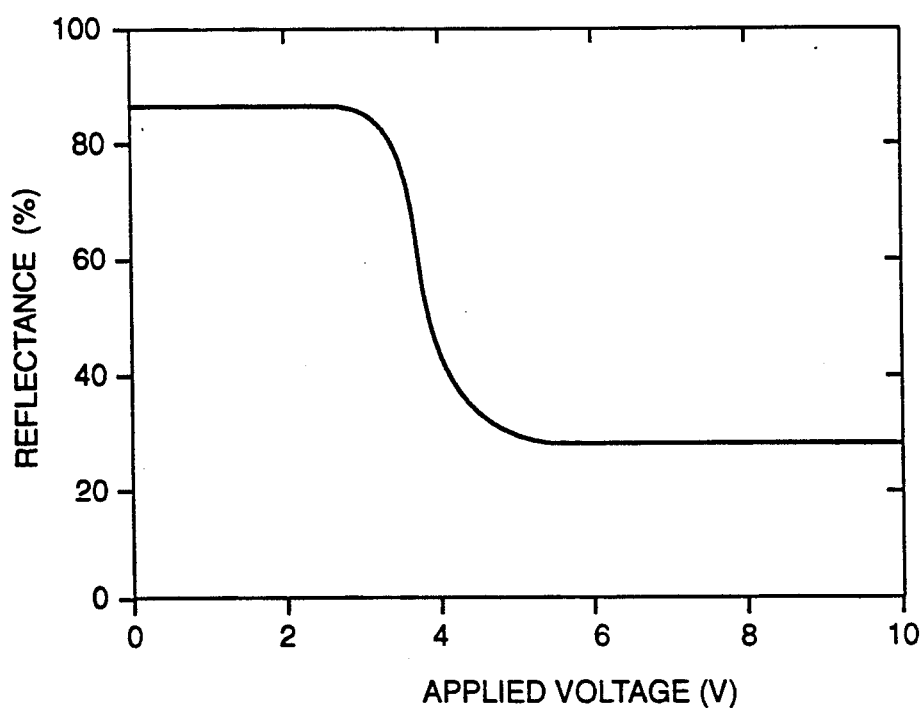
FIG._33
(PRIOR ART)

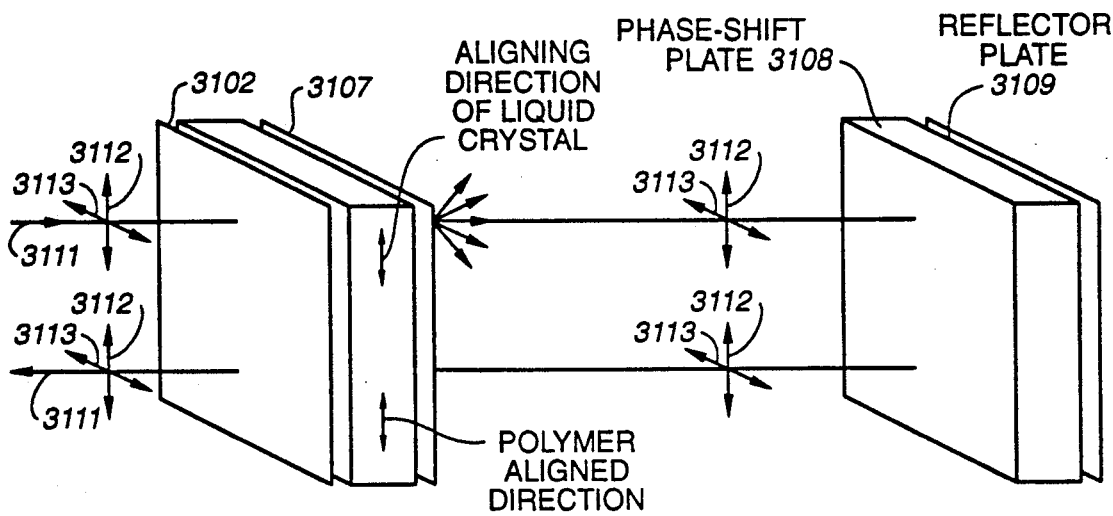
FIG._34A
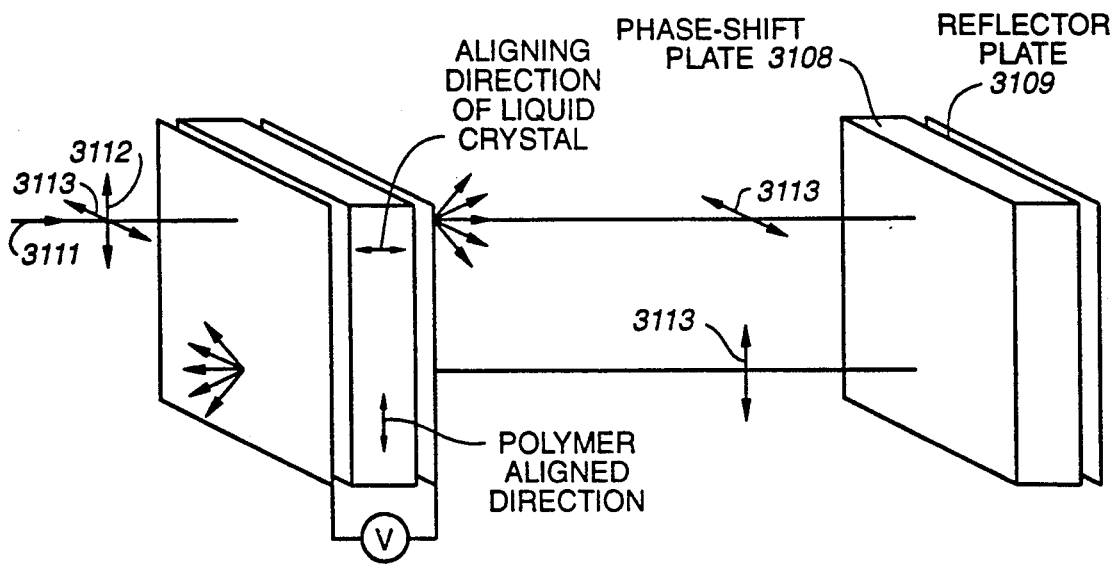
FIG._34B

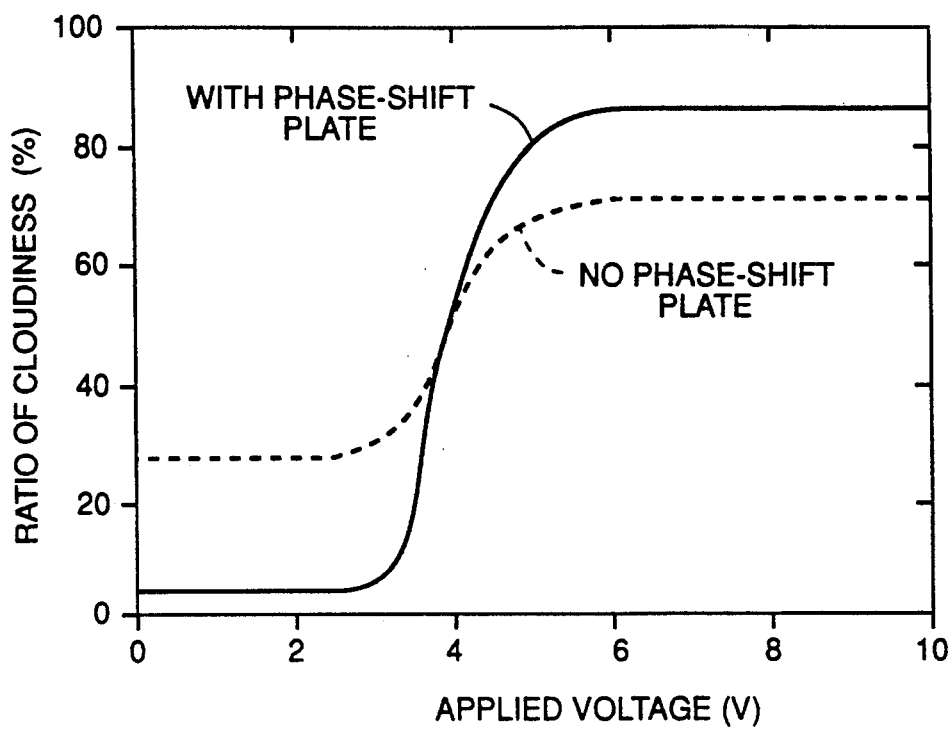
FIG._35
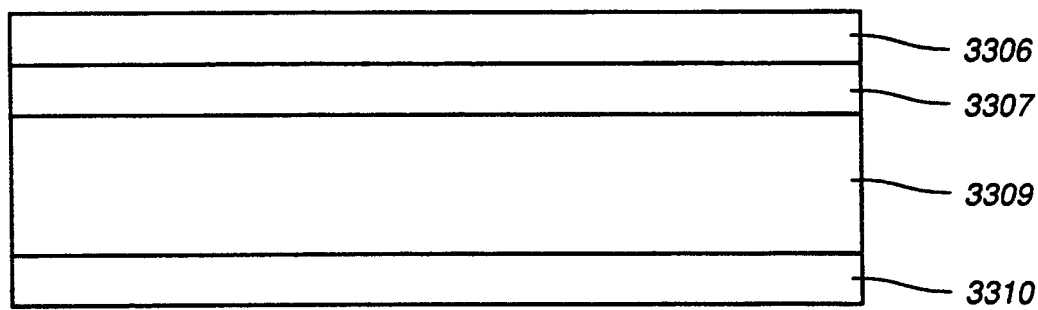
FIG._37

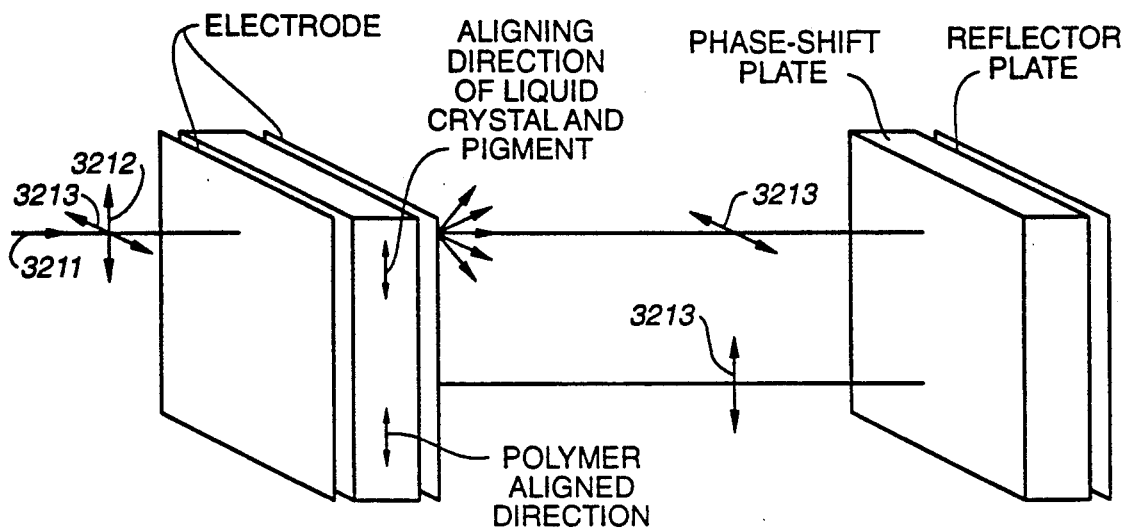
FIG._36A
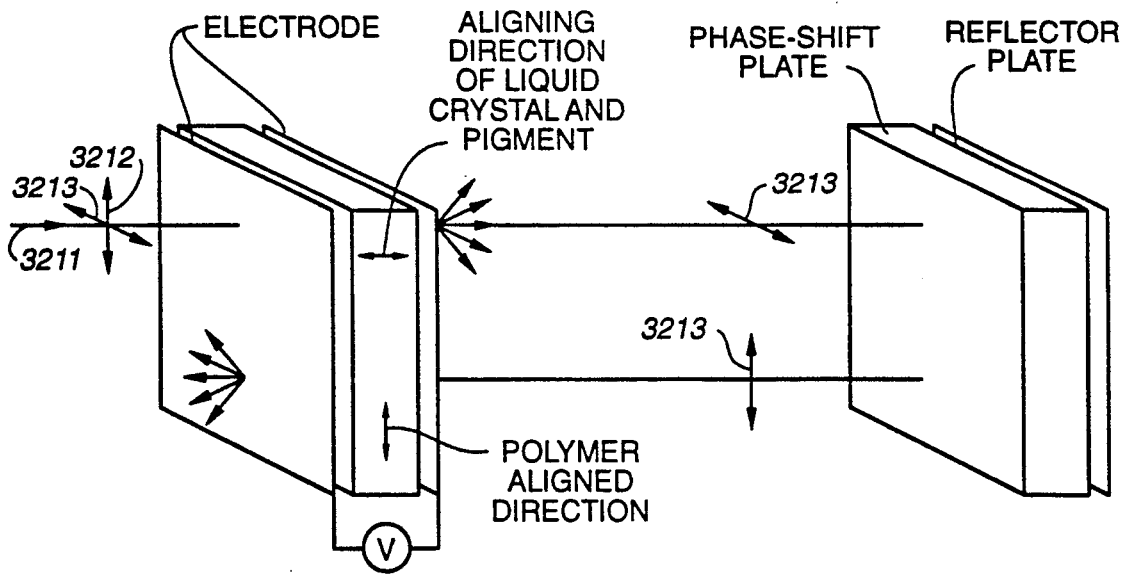
FIG._36B

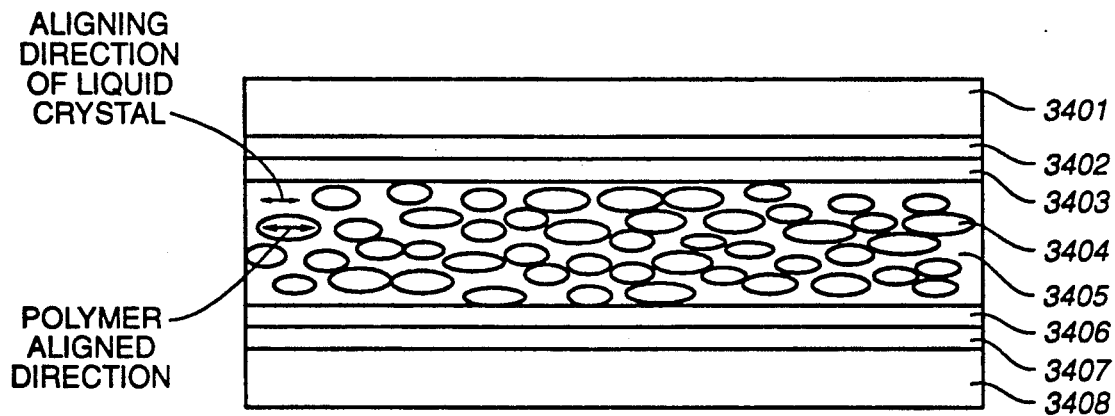
FIG._38A
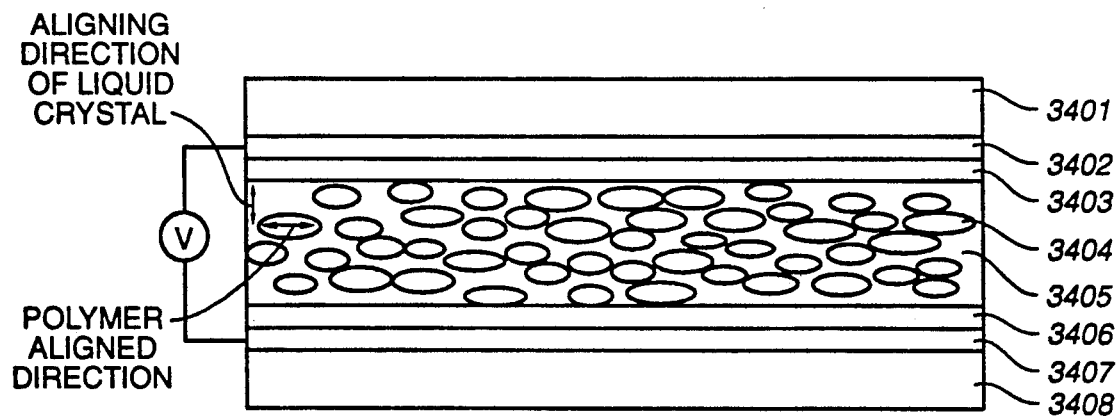
FIG._38B

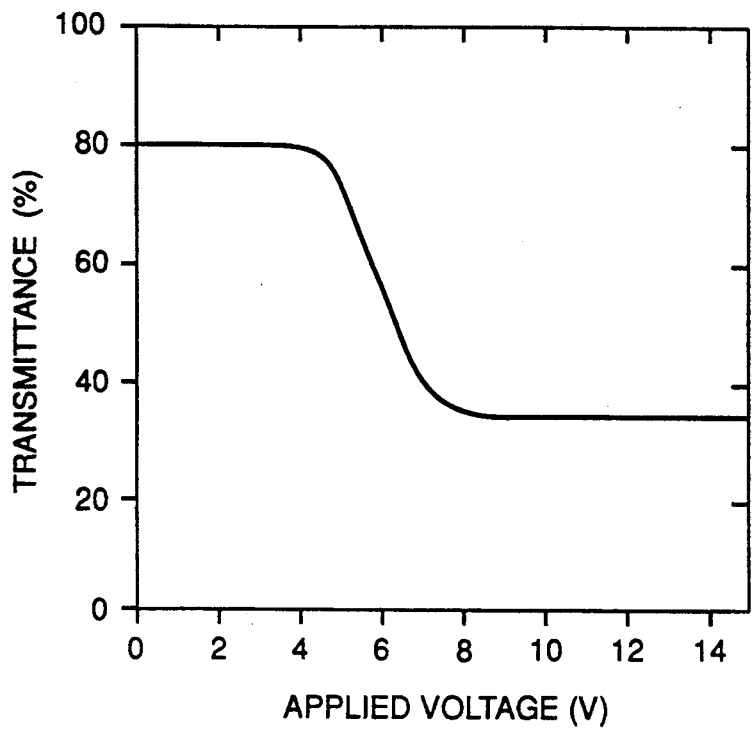
FIG._39
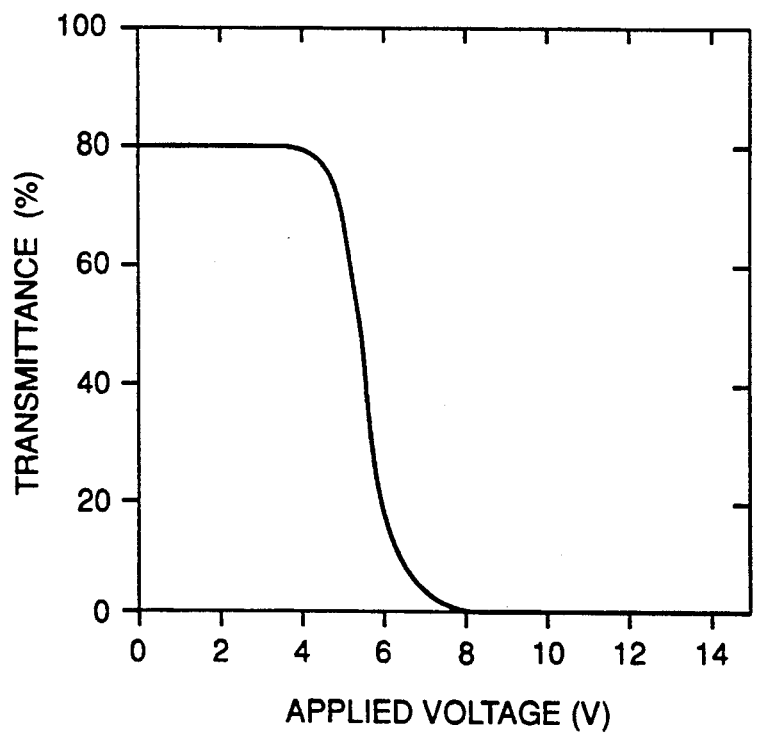
FIG._41

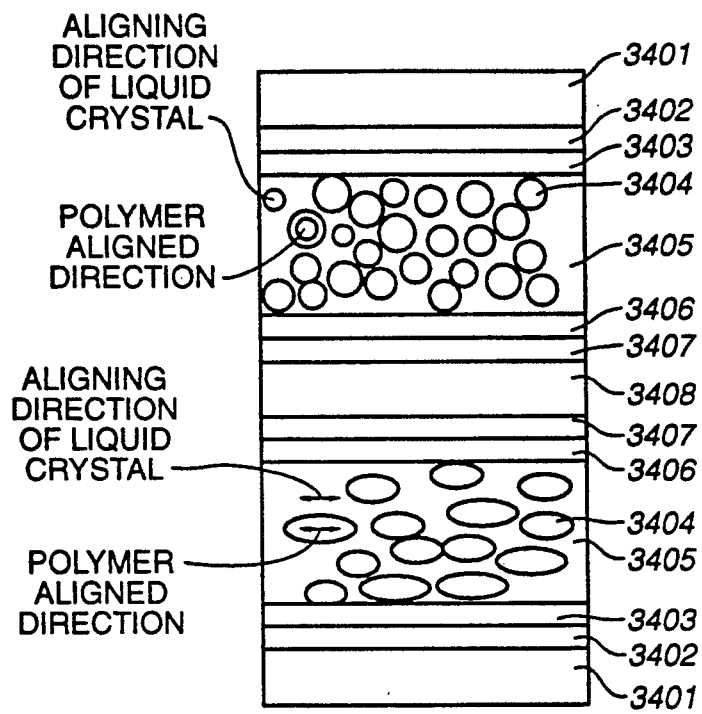
FIG._40A
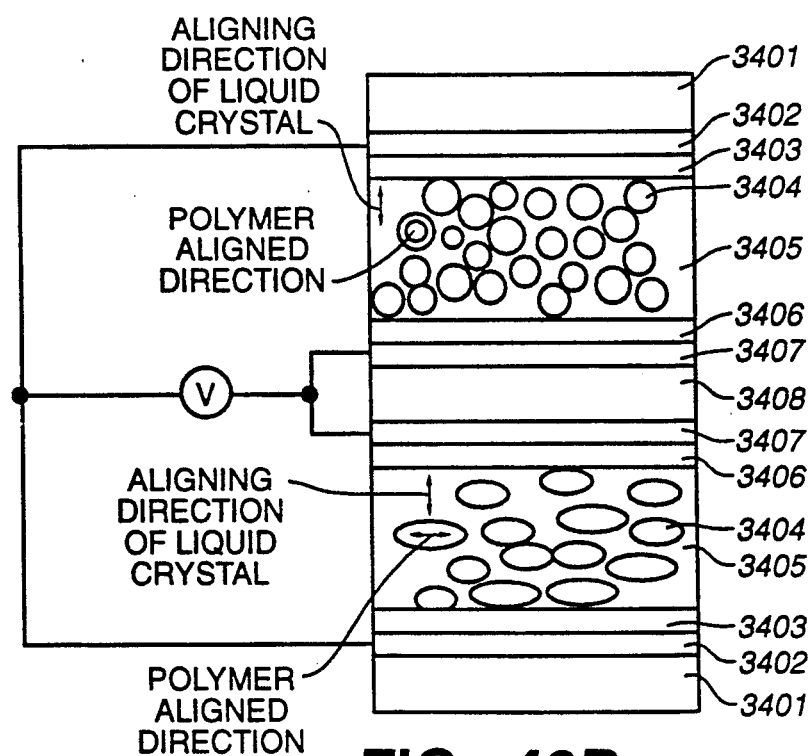
FIG._40B

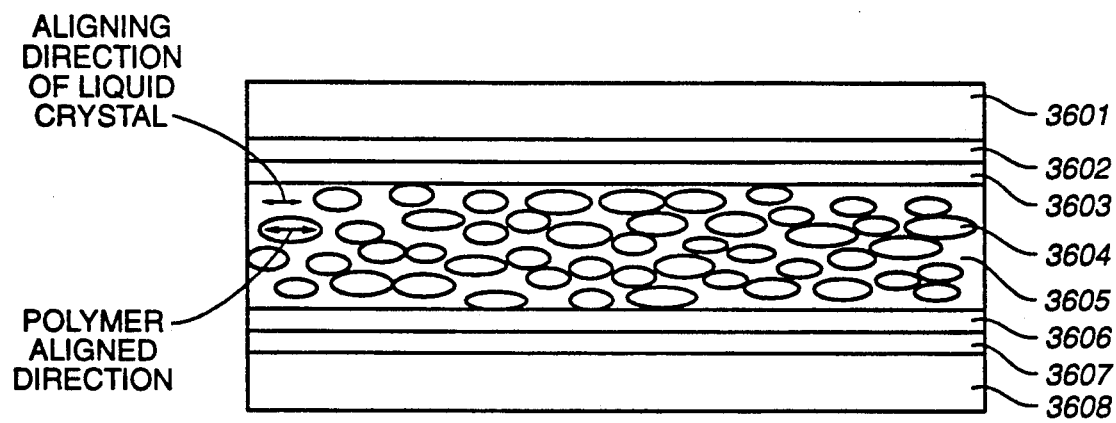
FIG._42
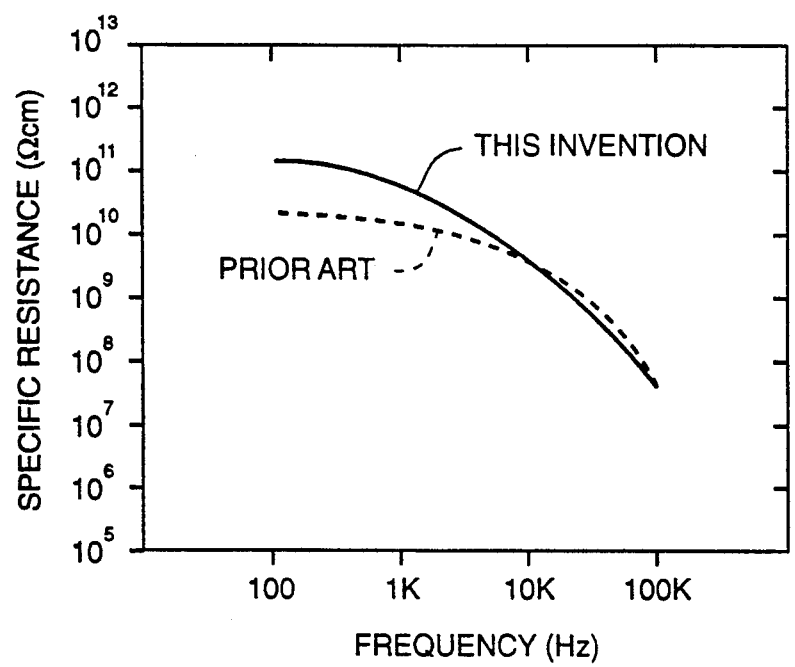
FIG._43

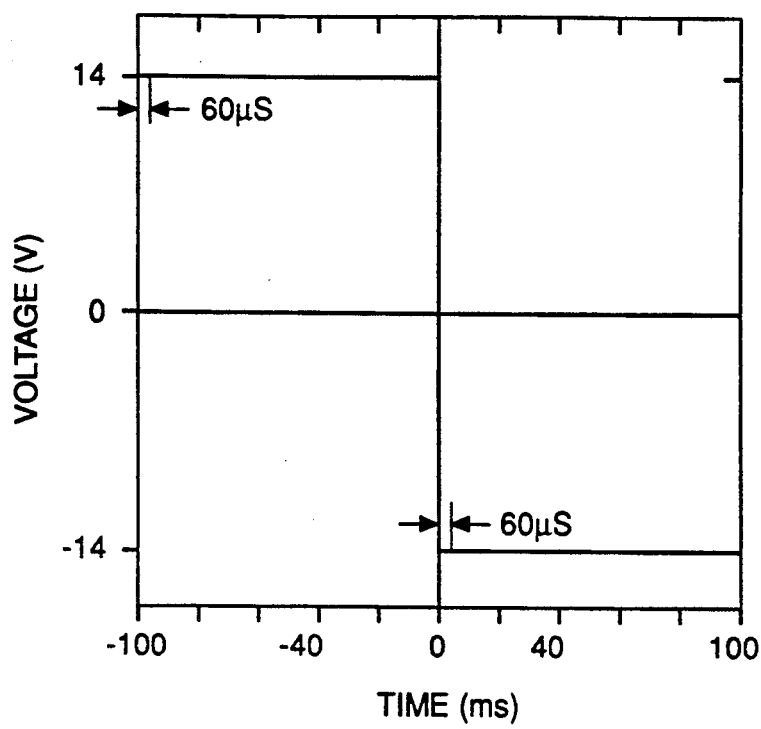
FIG._44
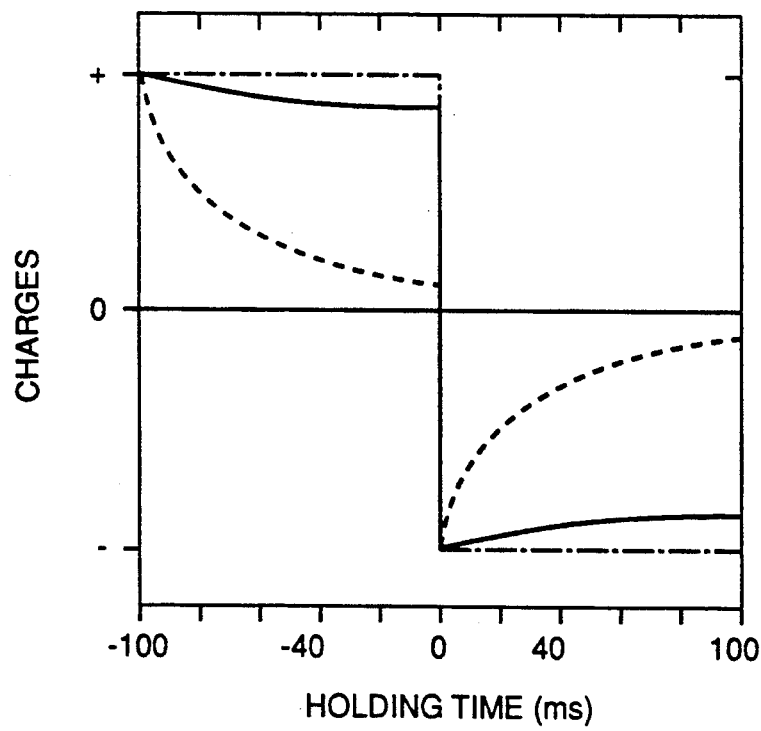
FIG._45

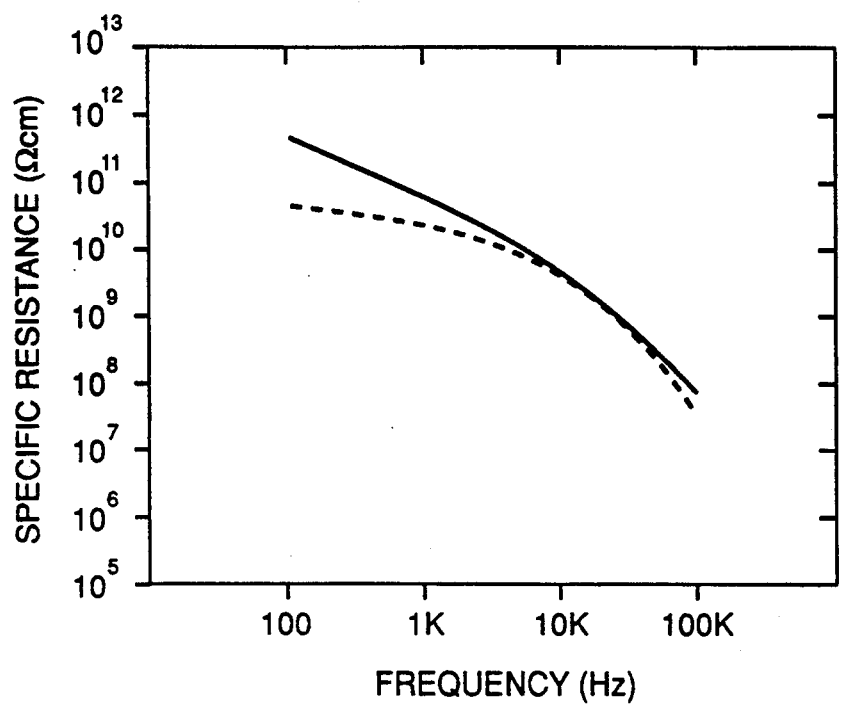
FIG._46
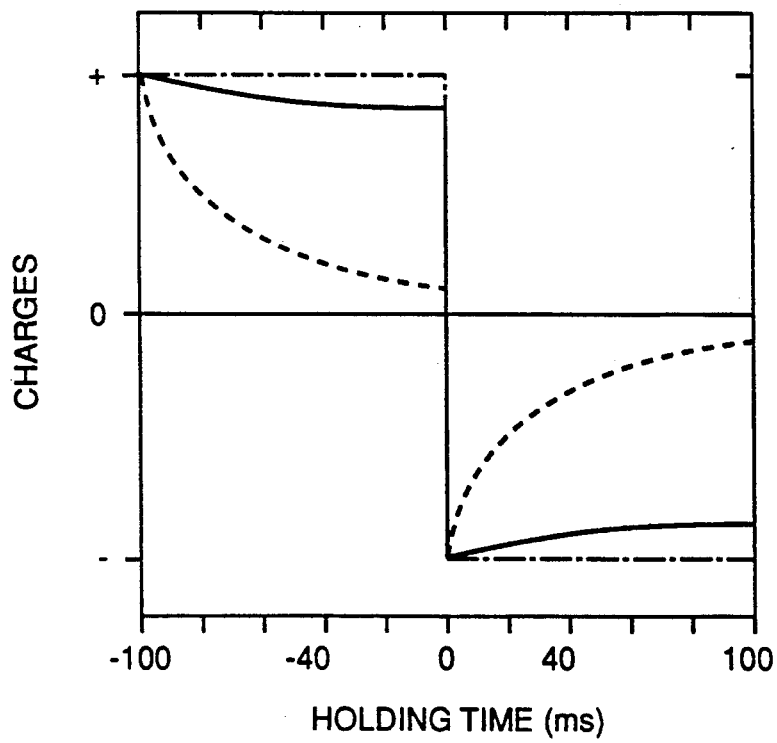
FIG._47

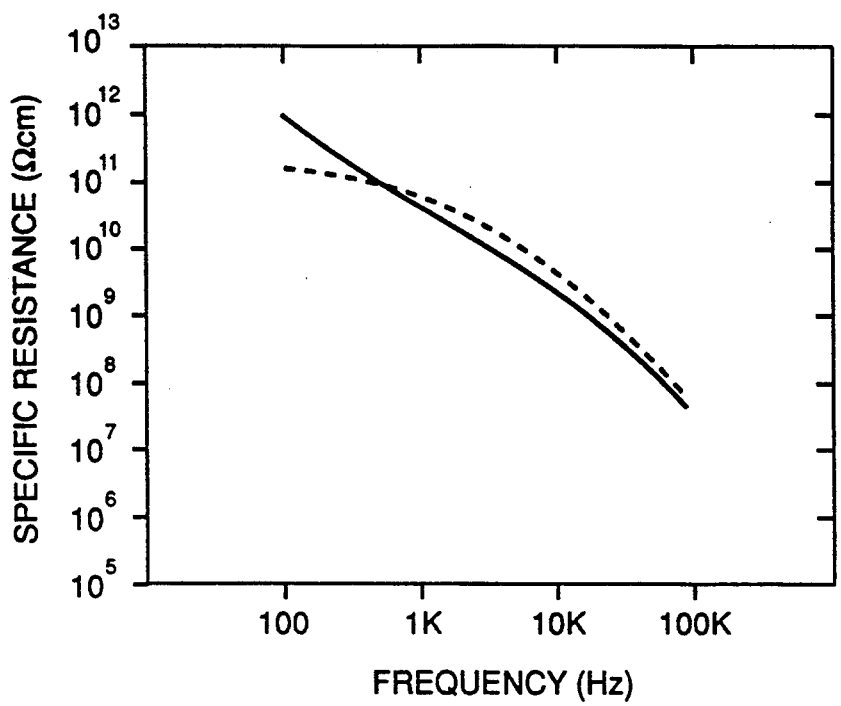
FIG._48
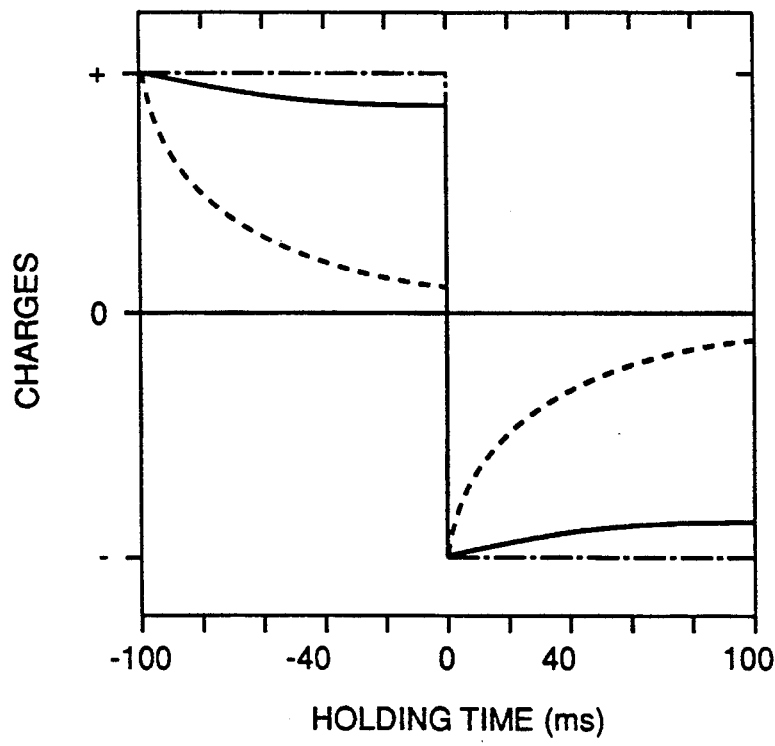
FIG._49

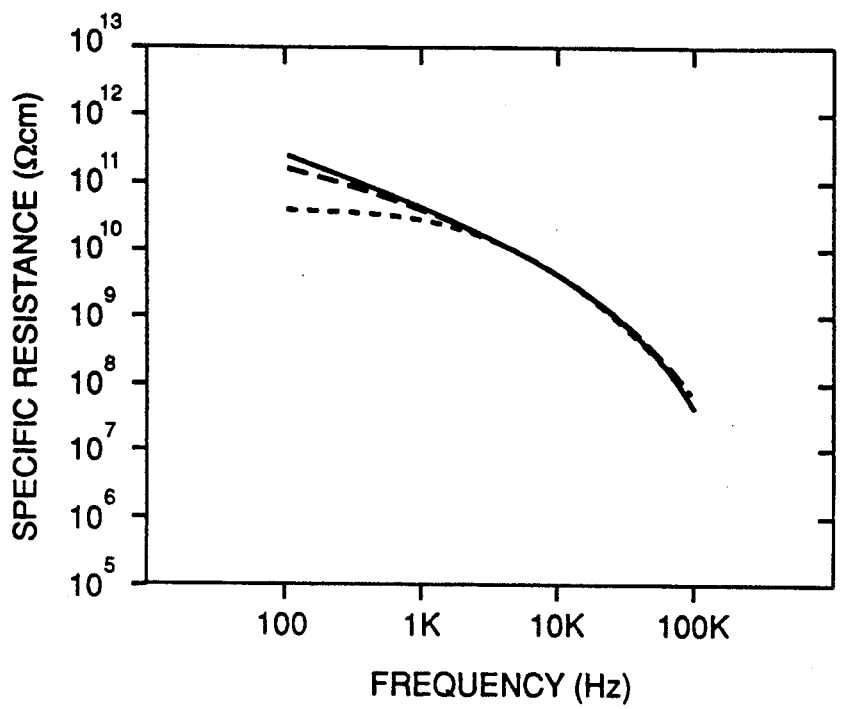
FIG._50
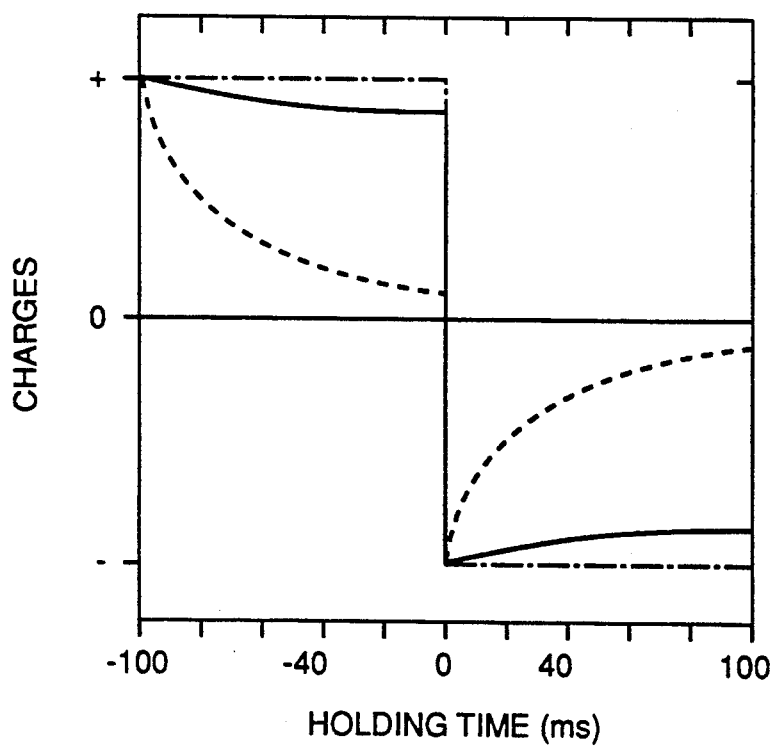
FIG._51

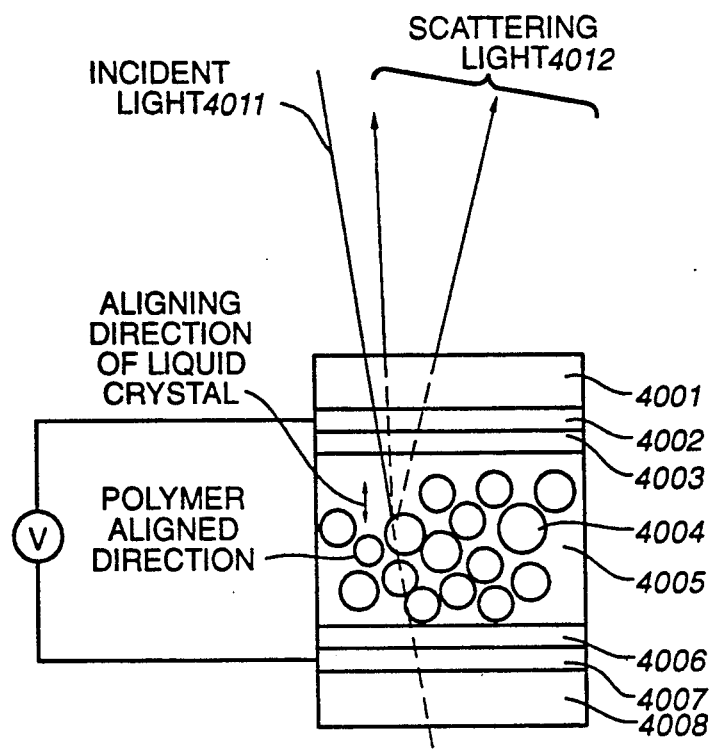
FIG._52
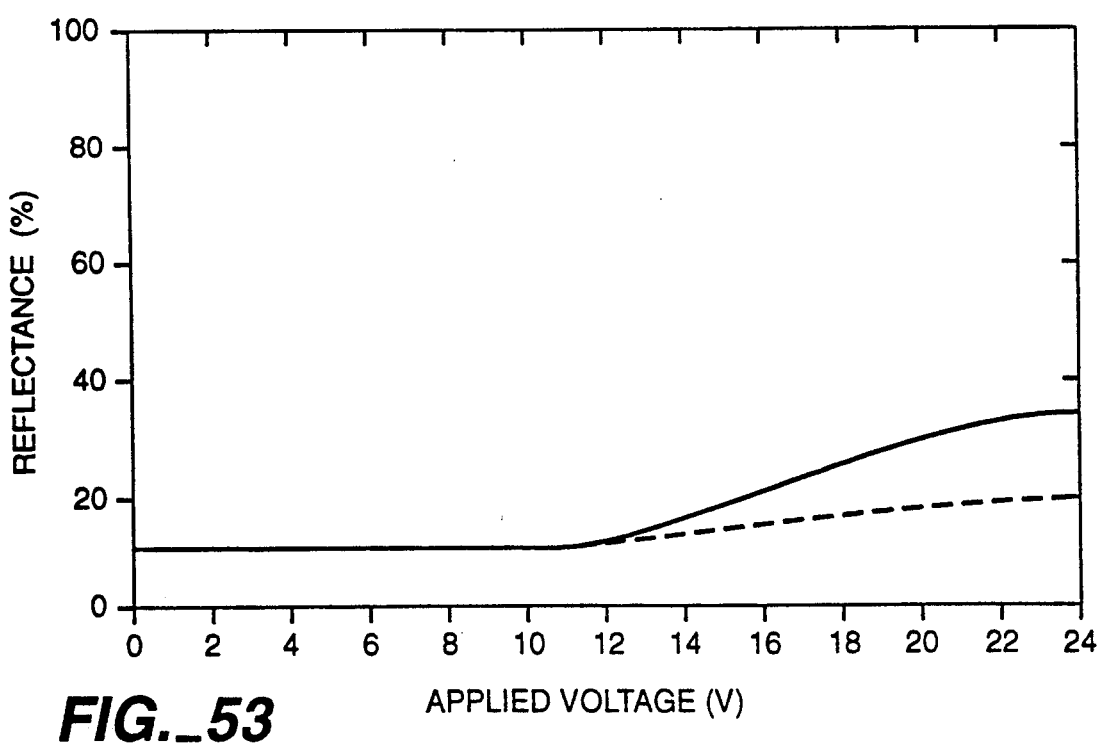
FIG._53

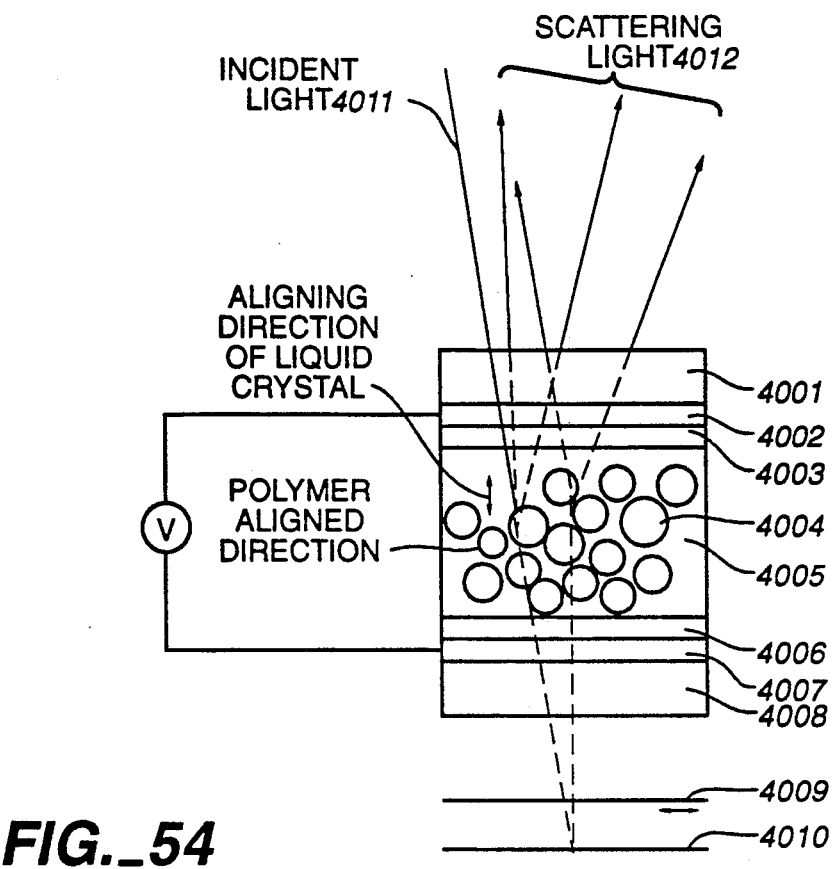
FIG._54
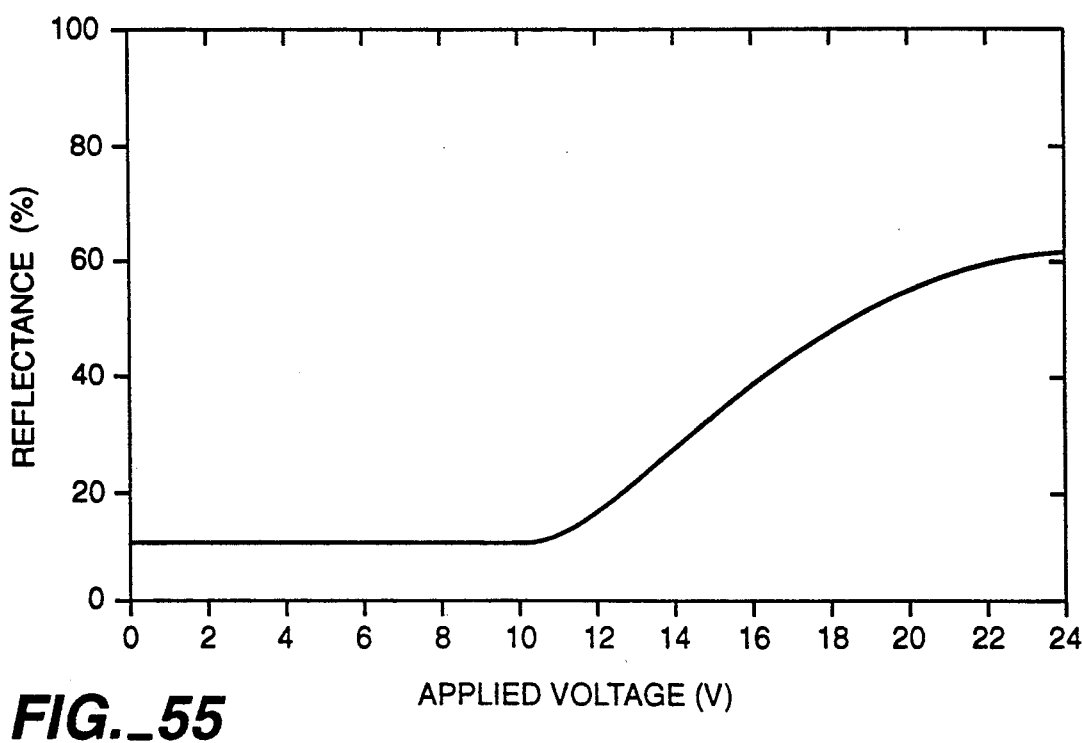
FIG._55

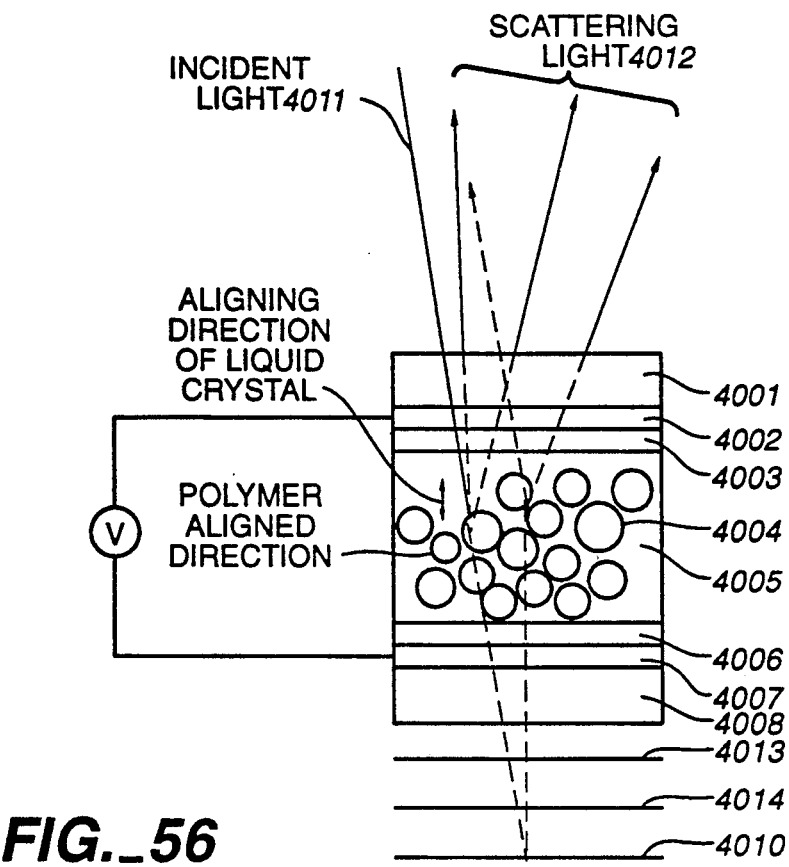
FIG._56
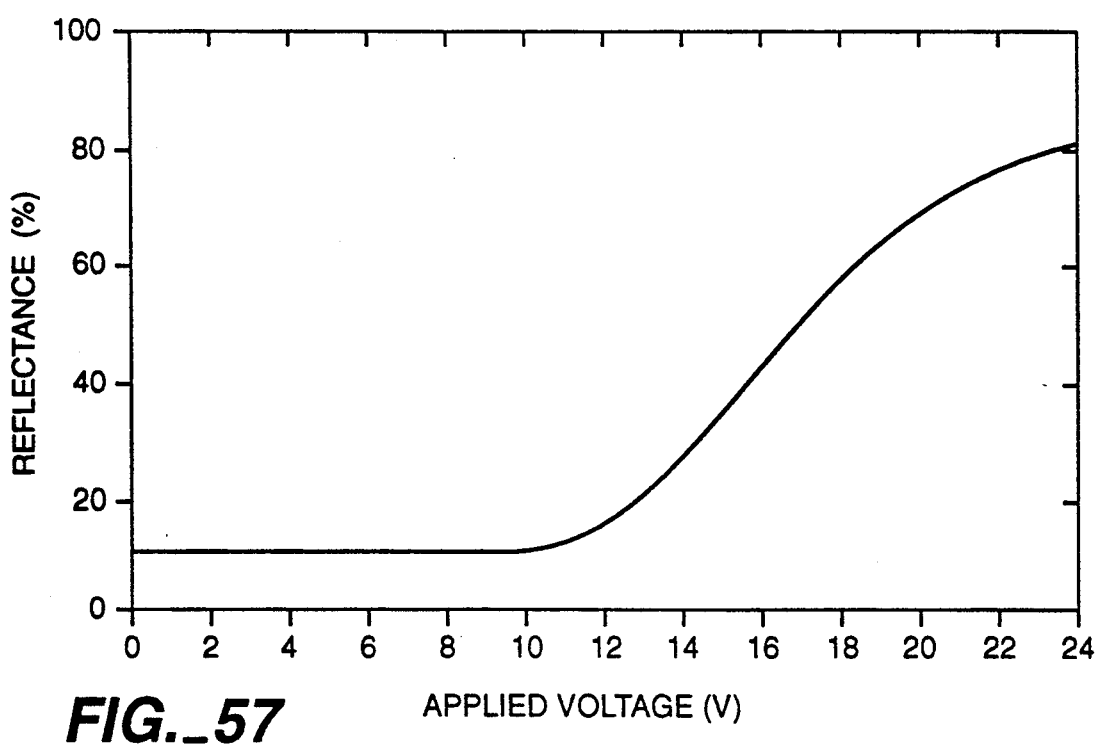
FIG._57

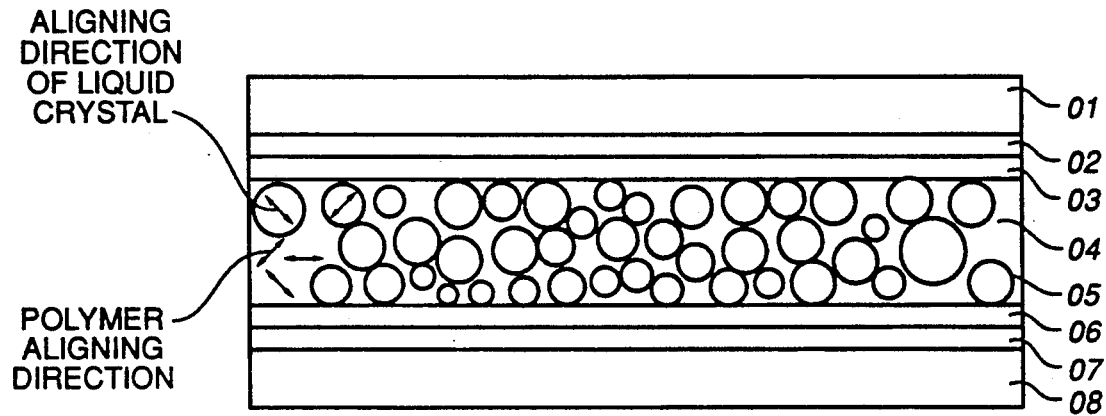
FIG._58A
(PRIOR ART)
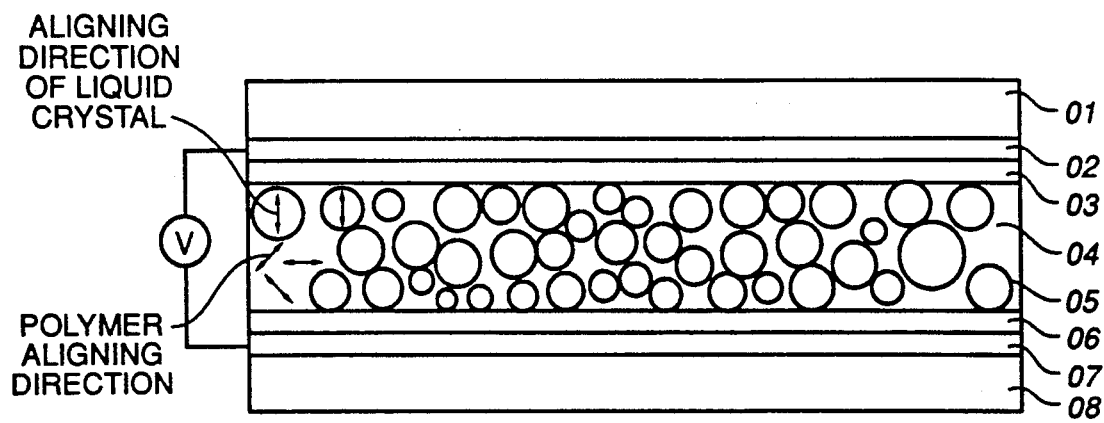
FIG._58B
(PRIOR ART)

POLYMER-DISPERSED LIQUID CRYSTAL MATERIAL WITH IN-SITU POLYMERIZED LIQUID CRYSTAL POLYMER GRAINS DISPERSED IN A LAYER OF LIQUID CRYSTAL MATERIAL SEALED BETWEEN SUBSTRATES AND FIELD ELECTRODES

BACKGROUND OF THE INVENTION

1. Field of the Invention

The present invention relates generally to a liquid crystal material displays (LCDs) and more specifically to polymer dispersed liquid crystal (PDLC) displays comprising a composite layer of liquid crystal material and polymer, and to a method of fabricating LCDs useful in computer displays, video projectors, and the like. There are two types of PDLC displays, normal mode and reverse mode. The present invention, in particular, is directed to the reverse mode PDLC display wherein the application of an applied voltage results in an opaque or ON state for the display.

2. Description of the Related Art

Liquid crystal material displays can be classified into at least two types that employ polymer matrices encapsulating liquid crystal material globules: the nematic curvilinear aligned phase (NCAP) type and the polymer dispersed liquid crystal material (PDLC) type. An example of NCAP is a material made by Taliq Corporation, a subsidiary of Raychem Corporation, Menlo Park, Calif., and is available in large sheets because the liquid crystal material does not need to be sealed in between precisely spaced substrates. The PDLC type is further separable into normal mode and reverse mode displays. With normal PDLC displays, a liquid crystal material is distributed in droplets in a polymer matrix. Considerable research on normal PDLC material has been conducted by Kent State University, General Motors Corporation, Hughes Aircraft, Seiko Epson Corporation (Japan), Asahi Glass (Japan), Dainippon Ink and Chemical (Japan), and others. Doane, et al. have received U.S. Pat. No. 4,994,204, issued Feb. 19, 1991, relating to PDLC. Doane, et.al. claim their liquid crystal material microdroplet structure and birefringent light transmissive synthetic resin matrix can be manipulated to obtain effects different from normal mode and reverse mode. In reverse mode PDLC displays, the devices are translucent milky white with the application of an applied voltage.

By now, most people are familiar with liquid crystal material displays (LCDs). They are ubiquitous in watches, calculators, laptop computers, and small TVs. Light emitting diodes (LED) are an early technology used in watches and calculators that ultimately gave way to LCDs, because the power needed to run LEDs is too high and LEDs are hard to read in bright sunlight. LCDs are used a lot because flat, thin display can be constructed with relatively large areas. The laptop computers generally take advantage of this feature. Projection TV, which once used high-output CRT tubes, now is even brighter and more compact, thanks to the use of transmissive mode LCDs set in front of halogen projection lamps.

U.S. Pat. No. 4,613,207, issued Sep. 23, 1986, to Fergason describes a liquid crystal material projector and method. A projection lamp has its light collected by a collimator lens and directed to a liquid crystal material display that passes or blocks the light according to a modulation signal applied to a transmissive mode LCD. Light that passes through the LCD is focused by an optics system for viewing on a screen. Fergason suggests using dye to color light to produce a colored output.

The most popular LCDs are the twisted nematic type, which use two light polarizing plates in order to achieve a contrast between field-ON and field-OFF conditions. Liquid crystal material in contact with a substrate that has been rubbed in a uniform direction will align with that direction. If the liquid crystal material, in its liquid phase form, is contained between the two substrates that have surfaces that have been rubbed at 90° relative to each other, successive layers of liquid crystal material molecules will twist so that they align with the rubbing direction at each liquid crystal material/substrate interface. The relative twist between such layers is gradual enough that polarized light can twist correspondingly along with the layers and exit polarized 90° from its original orientation. If polarizing plates are positioned properly at each substrate, light can pass directly through the assembly, rendering the whole assembly to appear transparent. However, if an electric field is placed across the liquid crystal material, its influence on the alignment of the liquid crystal material therebetween and its molecular layers will be stronger than that provided by the rubbing alignment at the substrates. In a field-ON condition, the twist structure will be straightened or rendered uniform, and light passing through the structure will not be twisted sufficiently to pass through the second polarizing plate. The area involved in the field, therefore, will appear dark or black. Unfortunately, these polarizing plates substantially reduce the amount of light that is able to pass through an LCD. Most light sources do not directly produce polarized light. All undesirably polarized light is filtered out. Only a small percentage will have the proper polarization and will pass through the liquid crystal material. To compensate, higher power backlight or projection lamps must be used, or the resulting reduced light levels must simply be tolerated.

As a solution to the above mentioned shortcomings, a type of PDLC display has appeared requiring no polarizing plates and employs the difference between the refractive indices of a liquid crystal material and a polymer having liquid crystal properties which are mixed together but phase separated, i.e., one component remains in a liquid phase and the other component remains in a solid phase. The optical properties of the liquid crystal material and the liquid crystal polymer can be made to match or not match so that the refractive indices of these separate components are nearly matched or not matched. When their indices are matched, the display is transparent. When their indices are not matched, the display becomes translucen, milky white.

FIG. 58 illustrates an example of a known PDLC display, also shown in U.S. Pat. No. 3,600,060. This LCD has a composite layer which is sandwiched between the two transparent substrates 01 and 08 and have transparent electrodes 02 and 07 on their inner surfaces. The composite layer has microscopic grains of a liquid crystal material 05 distributed throughout a solid, sponge-like polymer matrix 04. The molecules of polymer matrix 04 are randomly oriented. Liquid crystal material 05 has a positive dielectric anisotropy and its molecules will align in the direction of an applied electric field. Under field-OFF conditions, as shown in FIG. 58A, molecules of liquid crystal material 05 in the various pockets of polymer matrix 04 will be randomly aligned. The liquid crystal material has a refractive index of approximately 1.6, which is an average of the normal refractive index, which is about 1.5, and the extraordinary refractive index, which is about 1.7. The polymers in polymer matrix 04 are solidified, e.g., polymerized, without regard to the constituent individual molecules' alignment. Their resulting refractive index is approximately 1.5. In FIG. 58, the directions of the arrows in polymer matrix 04 indicate random orientations in three dimensions. Under field-OFF condition, there is a difference in the refractive index of about 0.1 at the countless interfaces between liquid crystal material 05 and polymer matrix 04. These interfaces are envelopes containing the microdroplets of liquid crystal material 05. Light incident to the composite layer will be scattered, making the display appear to be translucent, milky white or translucent. Actually, only incident light polarized parallel to the direction of alignment of the molecules of liquid crystal material will be scattered. When a drive signal is connected between the transparent electrodes 02 and 07, as shown in FIG. 58B, applying an electric field to liquid crystal polymer composite layer, individual molecules of liquid crystal material 05 re-align themselves in the direction of the electric field. A refractive index of about 1.5 results, which approximates the refractive index of polymer matrix 04. Incident light will, therefore, pass through the composite layer without being scattered, so that the display is transparent.

Describe in U.S. Pat. No. 4,944,576 to Lacker, et al, issued Jul. 31, 1990, is a PDLC fabrication method that enables partial pre-alignment of the liquid crystal material. Partial alignment is attained by the controlled application of an electric or magnetic field, or a mechanical flow, during the polymerization process.

Although the above description gives an example where the display becomes translucent, milky white under field-OFF conditions and transparent with an applied electric field under field-ON conditions, it is possible to construct a device with opposite optical characteristics. Other types and combinations of liquid crystal material and polymers are employed to achieve this opposite characteristic. If the refractive indices of liquid crystal material and polymer are adjusted to be equal or close to each other in the absence of an electric field, incident light passes through the composite layer without scattering so that the display appears transparent. When liquid crystal material is aligned because of an applied electric field, differences between the refractive indices of liquid crystal material and polymer is increased, thereby scattering light at the interface between liquid crystal material and polymer. As a result, the display appears translucent, milky white or translucent.

Another type of PDLC display which becomes transparent or translucent, milky white on the application of an applied field is based on a different principle. This other type of display relies on a phenomenon where the display clouds by applying an electric field to a composite layer comprising a mixture of polymer, such as, a methacrylate with a side chain having a biphenyl molecular structure and a metamorphosis of the liquid crystal material is caused by an exposure to strong ultraviolet light.

A liquid crystal polymer composite display with dichroic dye has been reported in 1990 by the Society for Information Display in the *International Symposium Digest of Technology Papers*, No. 12, May 1, 1990. Dichroic dye is added to liquid crystal material in a composite layer sandwiched between two transparent electrodes. Under field-OFF conditions, incident light will be scattered due to a difference in the refractive indexes between the liquid crystal material and the polymer. When the dichroic dye is randomly aligned, scattered light permits the dye color to be visually observed. Under field-ON conditions, a liquid crystal material with the dye aligns in the direction of the field, effectively zeroing out any difference in refractive indices at the interface between liquid crystal material and polymer. The display becomes transparent. It is customary to place a colored sheet of paper as a background for such a display.

Conventional PDLC display elements have microscopic grains of a liquid crystal material dispersed in a randomly aligned polymer which prevent the appearance of complete transparency. Since the sizes of these grains are not uniform, the display quality is not uniformly consistent across the display resulting in low reliability. Further, under field-OFF condition, the liquid crystal material becomes randomly aligned. Also, individual liquid crystal material molecules will not have a uniform response to an electric field, which prevents the display from having a sharp switch-over in ON/OFF states.

There is relatively a small difference between the refractive index of the polymer (1.5) and the average refractive index of the liquid crystal material (1.6). A sufficient amount of light scattering effect is not achieved for a completely translucent, milky white condition, even when the refractive index of liquid crystal material is different from the polymer. If the composite layer is made thicker to improve the amount of the light scattering effect, the required applied power to drive the display would have to be raised to the range of 60 to 80 volts.

Prior art displays have slow or poor threshold characteristics resulting in improper amounts of contrast. For example, if the maximum number of scan lines is three for simple matrix driving, it is necessary to employ an active element, such as, a TFT (thin film transistor) element or MIM (metal-insulator-metal) element when driving a display having a large viewing screen area.

Also, in a polymer LCD having a dichroic dye, the transparent mode and/or dye color is changed by the turning an electric field on or off. However, the display will appear dark. Further, increasing the amount of dye content will overall darken the display and also require a higher driving voltage.

To overcome these shortcomings, a PDLC display element has recently been developed eliminating the need for polarizing plates and employing differences between refractive indices of combined components comprising liquid crystal material and a polymer to provide contrast conditions for display of information. Polymer dispersed LCDs have a combination liquid crystal material and a polymer and are phase separated from one another. The operation of this type of display is such that when refractive indices of both these components match for, respectively, ON or OFF field conditions, the display will appear transparent. When the refractive indices of these components are no longer the same because of, respectively, field ON or OFF conditions, the display will appear translucent, milky white.

An object of this invention is the provision of a PDLC display having commonly aligned liquid crystal material and polymer components insuring excellent threshold characteristic, good contrast and a high brightness.

Another object of this invention is the provision of a reflection-type PDLC display which requires a relatively low drive voltage having good contrast and visibility, providing a large area display.

A further object of this invention is the provision of a PDLC display having a high specific resistance and excellent charge holding characteristic.

A still further object of this invention is a method of fabricating PDLC display elements.

SUMMARY OF THE INVENTION

According to the present invention, a PDLC display comprises a composite layer comprising a liquid crystal material and a polymer which are phase-separated from each other. A light-scattering effect is developed when the liquid crystal material aligns with an applied electric field, wherein initially the liquid crystal material and the polymer align in the same direction when no such electric field is applied. The composite layer is sandwiched between the two substrates each having a transparent electrode on an inner surface, or is formed on a single substrate having a transparent electrode formed on a surface with a transparent electrode formed on the top surface relative to liquid crystal/polymer composite layer. The liquid crystal material may have a positive dielectric anisotropy so that the liquid crystal material and the polymer are align in a direction parallel to the planar surfaces of the substrates when subjected to an electric field. On the other hand, the liquid crystal material may have a negative dielectric anisotropy so that the liquid crystal material and the polymer are align perpendicular to the planar surfaces of the substrates when subjected to an electric field.

An advantage of the present invention is the elimination of the requirement for polarizing plates that cause a reduction in light transmission through the liquid crystal material.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a cross sectional view of a PDLC display according to a first embodiment of this invention;

FIG. 2 is a cross sectional view of a PDLC display according to a third embodiment of this invention, as well as for subsequent embodiments, wherein the twisted stacks of polymer grains extending between the substrates are not as uniform in actual practice as shown in the figure, and the distances and lack of connection between the grain stacks is exaggerated for clarity in presenting the concepts comprising this invention;

FIG. 3 is a graphic illustration of the electro-optical characteristics of a PDLC display according to a second embodiment of this invention;

FIG. 4 is a graphic illustration of the electro-optical characteristics according to a prior art PDLC display;

FIG. 5 is a partial, cross sectional view of a PDLC display according to a fifth embodiment of this invention;

FIG. 6 is a partial, cross sectional view of a PDLC display according to sixth embodiment of this invention;

FIGS. 7A and 7B are cross sectional views of a PDLC display according to a seventh embodiment of this invention wherein FIG. 7A illustrates field-OFF conditions and FIG. 7B illustrates field-ON conditions;

FIG. 8 is a graphic illustration of the electro-optical characteristics of a PDLC display according to the seventh embodiment of this invention;

FIG. 9 is a graphic illustration of the electro-optical characteristics according to a prior art PDLC display;

FIG. 10 is a graphic illustration of the electro-optical characteristics of a PDLC display according to an eighth embodiment of this invention;

FIG. 11 is a graphic illustration of the electro-optical characteristics of a PDLC display according to a ninth embodiment of this invention;

FIG. 12 is a partial, cross sectional view of a PDLC display according to a eleventh embodiment of this invention;

FIG. 13 is a partial, cross sectional view of a PDLC display according to a twelfth embodiment of this invention;

FIGS. 14A and 14B are cross sectional views of a PDLC display according to a thirteenth embodiment wherein FIG. 14A illustrates field-OFF conditions and FIG. 14B illustrates field-ON conditions;

FIG. 15 is a partial, cross sectional view of a PDLC display according to an eighteenth embodiment of this invention;

FIG. 16 is a partial, cross sectional view of a PDLC display according to a nineteenth embodiment of this invention;

FIG. 17 is a conceptual diagrammatic view illustrating an embodiment of a display fabricating device employed in the fabrication of a PDLC display of this invention;

FIGS. 18A and 18B are cross sectional views of a PDLC display according to a twentieth embodiment wherein FIG. 18A illustrates field-OFF conditions and FIG. 18B illustrates field-ON conditions;

FIG. 19 is a diagrammatic representation of an electron micrograph of a cross section of a PDLC display according to the twentieth embodiment of this invention with a magnification of 50,000, as viewed at an angle of 45° relative to the substrate surface, and the substrates have a rubbing direction longitudinally along its surface;

FIG. 20 is a graphic illustration of the electro-optical characteristics of a PDLC display according to the twentieth embodiment of this invention;

FIG. 21 is a cross sectional diagram of a PDLC display according to a twenty-third embodiment of this invention;

FIG. 22 is a graphic illustration of the electro-optical characteristics of a PDLC display according to the twenty-third embodiment of this invention;

FIG. 23 is a graphic illustration of the electro-optical characteristics of a prior art PDLC display;

FIGS. 24A and 24B are cross sectional views of a PDLC display according to a twenty-fifty embodiment of this invention wherein FIG. 24A illustrates field-OFF conditions and FIG. 24B illustrates field-ON conditions;

FIG. 25 is a graphic illustration of the electro-optical characteristics of a PDLC display according to the twenty-fifth embodiment of this invention;

FIGS. 26A and 26B are cross sectional views of a PDLC display according to a twenty-seventh embodiment of this invention wherein FIG. 26A illustrates field-OFF conditions and FIG. 26B illustrates field-ON conditions;

FIG. 27 is a graphic illustration of the electro-optical characteristics of a PDLC display of the twenty-seventh embodiment of this invention;

FIG. 28 is a graphic illustration of the electro-optical characteristics according to a prior art PDLC display;

FIGS. 29A and 29B are cross sectional views of a PDLC display according to a twenty-ninth embodiment of this invention wherein FIG. 29A illustrates field-OFF conditions and FIG. 29B illustrates field-ON conditions;

FIG. 30 is a graphic illustration of the electro-optical characteristics of a PDLC display according to the twenty-ninth embodiment of this invention;

FIGS. 31A and 31B are cross sectional views of a PDLC display according to a thirty-first embodiment of this invention wherein FIG. 31A illustrates field-OFF conditions and FIG. 31B illustrates field-ON conditions;

FIG. 32 is a graphic illustration of the electro-optical characteristics of a reflection-type PDLC display of this invention using a quarter-wave plate;

FIG. 33 is a graphic illustration of the electro-optical characteristics of a prior art reflection-type PDLC display without using a quarter-wave plate;

FIGS. 34A and 34B are diagrammatic views for explaining the optical operating principle of a PDLC display according to the thirty-first embodiment of this invention;

FIG. 35 is a graphic illustration of the electro-optical characteristics of a reflection-type PDLC display wherein the solid line therein illustrates the case of the present invention employing a quarter-wave plate and the dash line illustrates the case of the prior art employing no quarter-wave plate;

FIGS. 36A and 36B are a diagrammatic views for explaining the optical operating principle of a PDLC display according to a thirty-second embodiment of this invention;

FIG. 37 is a side elevation of a PDLC display according to a thirty-third embodiment of this invention;

FIGS. 38A and 38B are cross sectional views of a PDLC display according to a thirty-fourth embodiment of this invention wherein FIG. 38A illustrates field-OFF conditions and FIG. 38B illustrates field-ON conditions;

FIG. 39 is a graphic illustration of the electro-optical characteristics of a PDLC display according to the thirty-fourth embodiment of this invention;

FIGS. 40A and 40B are cross sectional views of a PDLC display of the thirty-fifth embodiment of this invention wherein FIG. 40A illustrates field-OFF conditions and FIG. 40B illustrates field-ON conditions;

FIG. 41 is a graphic illustration of the electro-optical characteristics of a PDLC display according to a thirty-fifth embodiment of this invention;

FIG. 42 is a cross sectional view of a PDLC display according to a thirty-sixth embodiment of this invention;

FIG. 43 is a graphic illustration showing the relationship between the specific resistance and the frequency of a polymer aligned type of PDLC display wherein the solid line illustrates this relationship according to the thirty-sixth embodiment of this invention employing two polymer precursors, and the dash line illustrates this relationship according to the prior art characteristic when employing a single polymer precursor;

FIG. 44 is a graphic illustration of a waveform of an applied voltage when measuring the charge holding ratio of a PDLC display with an applied electric field of about 14 volts of alternatively applied positive and negative potentials applied for 60 ms for a period of 100 milliseconds after which the applied electric field is removed;

FIG. 45 is a graphic illustration of the charge holding ratio of a PDLC display wherein the solid line illustrates this characteristic according to the thirty-sixth embodiment of this invention employing two polymer precursors, and the dash line illustrates this characteristic according to the prior art employing a single polymer precursor;

FIG. 46 is a graphic illustration showing the relationship between the specific resistance and the frequency of a polymer aligned type of PDLC display wherein the solid line therein illustrates this relationship according to the thirty-seventh embodiment of this invention employing two polymer precursors, and the dash line illustrates this relationship according to the prior art characteristic when employing a single polymer precursor;

FIG. 47 is a graphic illustration of the charge holding ratio of a PDLC display wherein the solid line represents the thirty-seventh embodiment of this invention employing two polymer precursors, and the dash line represents the prior art employing a single polymer precursor;

FIG. 48 is a graphic illustration showing the relationship between the specific resistance and the frequency of a polymer aligned type of PDLC display wherein the solid line therein illustrates this relationship according to a thirty-eighth embodiment of this invention employing two polymer precursors, and the dash line illustrates this relationship according to the prior art characteristic when employing a single polymer precursor;

FIG. 49 is a graphic illustration of the charge holding ratio of a PDLC display wherein the solid line represents the thirty-eight embodiment of this invention employing two polymer precursors, and the dash line represents the prior art employing a single polymer precursor;

FIG. 50 is a graphic illustration showing the relationship between the specific resistance and the frequency of a polymer aligned type of PDLC display wherein the solid line therein illustrates this relationship according to a thirty-ninth embodiment of this invention employing two polymer precursors, and the dash line illustrates this relationship according to the prior art characteristic when employing a single polymer precursor;

FIG. 51 is a graphic illustration of the charge holding ratio of a PDLC display wherein the solid line represents the thirty-ninth embodiment of this invention employing two polymer precursors, and the dash line represents the prior art employing a single polymer precursor;

FIG. 52 is a cross sectional view of a PDLC display according to a fortieth embodiment of this invention wherein the direction of alignment of the liquid crystal material coincides with the direction of an applied electric field with the polymer being elliptic elongated perpendicular to the plane of the drawing sheet, and having an alignment direction perpendicular to the plane of the drawing sheet;

FIG. 53 is a graphic illustration of the electro-optical characteristics of a PDLC display of the fortieth embodiment of this invention wherein the solid line illustrates the case where incident light enters from the same direction as shown in FIG. 52, and the dash line illustrates the case where incident light enters from the direction at right angles with respect to the direction of a line perpendicular to the substrate;

FIG. 54 is a cross sectional view of a PDLC display according to a forty-first embodiment of this invention utilizing a polarizing plate;

FIG. 55 is a graphic illustration of the electro-optical characteristics of a PDLC display of the forty-first embodiment of this invention;

FIG. 56 is a cross sectional view of a PDLC display according to a forty-second embodiment of this invention;

FIG. 57 is a graphic illustration of the electro-optical characteristics of the PDLC display of the forty-second embodiment of this invention; and FIGS. 58A and 58B are cross sectional views illustrating a prior art PDLC display wherein FIG. 58A illustrates field-OFF conditions and FIG. 58B illustrates field-ON conditions.

DETAILED DESCRIPTION OF EMBODIMENTS

First embodiment

FIG. 1 illustrates a polymer dispersed liquid crystal device according to a first embodiment of this invention. The device has a composite layer sandwiched between a pair of transparent substrates 101 and 108, for example, made of glass. The composite layer has many microscopic grains of polymer 104 dispersed in a liquid crystal material 105 in a phase-separated state. Preferably, polymer 104 and liquid crystal material 105 are dissolved in one another when both components are in a liquid phase. They will phase separate from each other after one of these components becomes solidified. Here, "phase separation" means that these two components are in physically different phase states, e.g., one is in a solid form and the other is in a liquid form. Liquid crystal material 105 has a positive dielectric anisotropy and is aligned in a direction parallel to the direction of an applied electric field. The two substrates 101 and 108, respectively, have transparent electrodes 102 and 107 on their inner surfaces, e.g., made from indium tin oxide (ITO), for the purpose of inducing an applied field on the composite layer. A pair of polyimide based alignment films 103 and 106 are formed on respective electrodes 102 and 107, and these films are enabled to align liquid crystal material 105 and polymer 104 parallel to the planes of substrates 101 and 108 while both are in their liquid phase. Liquid crystal material 105 and polymer 104 are in a liquid phase before being sealed in a gap portion between substrates 101 and 108. Although polymer 104 is in a liquid crystal phase when being aligned, it is subsequently hardened to maintain and fix its original pre-alignment regardless of the application an subsequently applied electric field. However, since liquid crystal material 105 has no such fixed direction of alignment, it can align with an applied field during field-ON conditions.

In the absence of a field-OFF condition, polymer 104 and liquid crystal material 105 inherently align parallel to the planes of substrates 101 and 108. Under these conditions, the refractive index of polymer 104 matches that of liquid crystal material 105 rendering the LCD transparent for even wide viewing angles.

When a drive signal is connected between transparent electrodes 102 and 107 to produce a field-ON condition, the direction of alignment of liquid crystal material 105 will adjust to coincide with the direction of the applied field. A light-scattering effect will develop at the interface between liquid crystal material 105 and polymer 104 due to difference in their respective refractive indices so that the display becomes translucent having a milky white appearance.

A polymer precursor, in its liquid crystal phase, is sealed between substrates 101 and 108, and is then polymerized resulting in polymer 104. Many small grains of polymer 104 are thoroughly dispersed throughout liquid crystal material 105. Grains of liquid crystal material 105 also tend to disperse throughout larger pieces of polymer 104.

Transparent electrodes 102 and 107 can be formed on substrates 101 and 108 by means of a vapor deposition method, e.g., CVD. A 2% solution of JIB polyimide, available from manufactured by Japan Synthetic Rubber Co., Ltd., is spin-coated onto the surfaces of transparent electrodes 102 and 107, utilizing a spinning rate of 2000 revolutions per minute to produce alignment films 103 and 106. Substrates 101 and 108 with their respective alignment films 103 and 106 are then annealed at 150° C. An alignment direction method for ingraining an alignment direction on the surfaces of films 103 and 106 comprises rubbing alignment films in a single direction with a bleached cotton cloth. The respective rubbing directions of films 103 and 106 are aligned parallel to each other upon final assembly of substrates 101 and 108. Alignment films 103 and 106 are placed in face-to-face, with a 10 μm gap portion formed between their surfaces. This gap portion is also referred to as the cell thickness. A polymer mixture comprising a precursor and a liquid crystal material are dissolved in one another in a ratio of 1:10, and the mixture is then sealed within the gap portion between substrates. The polymer precursor may be biphenyl methacrylate. The liquid crystal material may be a commercially available material, such as, product No. PN001, available from Rodick Inc. The mixture of polymer precursor and liquid crystal material is then gradually cooled at room temperature and exposed to ultraviolet light to polymerize the polymer precursor bring about a harden polymer state. This also causes a phase separation of liquid crystal material 105 from polymer 104. Polymer 104 and liquid crystal material 105 are selected to have similar refractive index anisotropies. The refractive index is approximately 1.5 parallel to the direction of alignment, and about 1.7 perpendicular to the direction of alignment. Liquid crystal material 105 aligns in the same direction with polymer 104 in the absence of an applied electric field. The refractive indices of liquid crystal material 105 and polymer 104 will be match each parallel to the planes of substrates 101 and 108 so that the display becomes almost transparent. The display has a transmittance of 80%, which is a substantial improvement over the typical transmittance of 60% found in prior art displays.

When a drive signal is applied to electrodes 102 and 107 bring about a field-ON condition, a field is developed across the composite layer. As a result, liquid crystal material 105 aligns in the direction of the applied field, i.e., perpendicular to the planes of substrates 101 and 108. Polymer 104 cannot change its direction of alignment. With a field perpendicular to the planes of substrates 101 and 108, the refractive index of liquid crystal material becomes about 1.5, while that of polymer 104 remains approximately 1.7. Differences between the refractive indices of polymer 104 and liquid crystal material 105 is, therefore, about 0.2. This difference causes incident light from a direction perpendicular to the planes of substrates 101 and 108 to scatter thereby rendering the display translucent, milky white in the direction of the field. For a field-ON condition comprising an applied AC field of 10 KHz at 10 volts, the display will have a cloudy appearance due to differences between the refractive indices of polymer and liquid crystal material. The inherent contrast between the light transmissive mode and the a light scattering mode of this display is 50:1 or better.

The present invention is not limited to polyimide as an alignment film. A variety of other materials are capable of aligning liquid crystal material 105 and polymer 104 in a liquid crystal phase and may be employed in connection with this invention. The process of fixing the alignment direction is also not limited to the use of alignment films. The surface of the substrates may be simply rubbed and provide an acceptable alignment. Alternatively, a magnetic or electric process may be used to physically align the components of the composite layer. Preferably, liquid crystal material 105 has as high as possible refractive index anisotropy, $\Delta n$, to achieve the best contrast. The optimum amount of liquid crystal material 105 in the composite layer mixture is in the range between 50% and 97%. If the amount of liquid crystal material is less than 50%, the lower limit, the display will not respond to an applied electric field. If the amount of liquid crystal material is greater than 97%, the upper limit, adequate display contrast will not be realized.

Polymers of various types, such as thermoplastic polymers, thermosetting polymers, and ultraviolet-hardened type polymers, may be employed for polymer 104 as long as only a side chain of a benzene or biphenyl molecular structure is linked to the main chain of the polymer.

Second Embodiment

In the second embodiment of this invention, a thermoplastic amethylstyrene is employed for the polymer and polyvinyl alcohol is employed for the alignment films. The basic display is the same structure illustrated in FIG. 1. The PDLC display was fabricated by spin-coating a 2% solution of polyvinyl alcohol on the surfaces of formed electrodes on a pair of substrates using a spinning rate of 2000 RPM. The resultant structure was then annealed at 100° C. A mixture of a liquid crystal material and a polymer was then mixed at a ratio of 3:1 and the mixture was sealed between the substrates at a temperature of 150° C. The polymer comprised methylstyrene, having a refractive index of 1.61, and the liquid crystal material was, as an example, product No. SS-5008, available from Chisso Corporation, having an extraordinary refractive index of 1.60. The mixture is cooled to harden the polymer into its solid state and both components of the mixture were aligned according to an alignment direction.

The result was a display that is almost completely transparent with a field-OFF condition and demonstrated a transmittance as high as 60%, compared to prior art displays that do not have the same alignment conditions and have a transmittance only as high as 50%.

For a field-ON condition comprising an AC electric field of 10 KHz and 60 volts, differences between the refractive indices of polymer and liquid crystal material causing light to scatter. The inherent contrast ratio was 15:1 or more.

Although polyvinyl alcohol can be used for the alignment films, a variety of other materials are capable of aligning liquid crystal material used employed as alignment films. Preferably, the liquid crystal material used should have a refractive index anisotropy, $\Delta n$, as high as possible in order to enhance the contrast. It is more preferable that the extraordinary refractive index of liquid crystal material be as close to the refractive index of the polymer. The optimum amount of liquid crystal material in the composite layer mixture is in the range between 50% and 97%. With a less amount of liquid crystal material in the mixture, the display will not respond to an applied electric field. With a greater amount of liquid crystal material in the mixture, proper contrast cannot be achieved. Further, various types of polymers, such as, a thermosetting polymer or ultraviolet-hardened polymer, may be employed as a polymer in lieu of the thermoplastic type.

While this embodiment employs two substrates, the composite layer can be aligned relative to one substrate. It is unnecessary to form alignment films on both substrates, as an alignment film is also effective as applied to only one of the substrates. The alignment process is not limited to the use of alignment films, as simple rubbing the surface of the substrate is acceptable. Alternatively, electric or magnetic means can be used to physically align liquid crystal materials.

The present invention may be applied to a computer display, light projectors, light valve, a light control mirror, and the like.

Third Embodiment

FIG. 2 illustrates a polymer dispersed liquid crystal material device comprising a third embodiment of this invention utilizing a nematic liquid crystal material with a chiral component. A composite polymer/liquid crystal layer is sandwiched between two transparent substrates 301 and 308. This composite layer comprises elongated grains of a polymer 304 formed in a twisted stack and a nematic liquid crystal material 305 with molecules that cling and twist in a chain along with the stack of grains of polymer 304. Preferably, for complete polymer dispersal, the materials comprising polymer 304 and nematic liquid crystal material 305 are such that they will readily dissolve into one other when both materials are in their liquid phase. The polymer is then subsequently precipitated out of the solution. The nematic liquid crystal material in this embodiment has a positive dielectric anisotropy with an added chiral component. The mutual twisting of polymer 304 and nematic liquid crystal material 305 is caused by the added chiral component. Substrates 301 and 308, respectively, have transparent electrodes 302 and 307 formed on their inner surfaces. Alignment films 303 and 306 are formed on respective electrodes 302 and 307, and are processed so as to align both nematic liquid crystal material 305 and polymer 304 in a direction parallel to substrates 301 and 308 while both these components are in their liquid crystal phase and are then sealed between substrates 301 and 308. Although polymer 304 is initially in a liquid crystal phase for alignment orientation, it is solidified, e.g., polymerized, retaining its original alignment. When polymer 304 is placed under a field-ON condition, the polymer alignment will not change to conform to the direction of the applied field, but, rather, liquid crystal material 305 will align in the direction of the applied field during the field-ON condition.

In the absence of an applied field, polymer 304 and the nematic liquid crystal material 305 align parallel to substrates 301 and 308. Under these conditions, the refractive index of the polymer matches that of liquid crystal material 305, rendering the liquid crystal display transparent. In the case of no chiral component mixed with nematic liquid crystal material 305, only polarized light in the incident light, entering the display perpendicular to the plane of substrates 301 and 308, which is polarized parallel to the plane, can be modulated. This limits the contrast from being its best. The addition of the chiral component can substantially improve the contrast.

When a drive signal is connected between electrodes 302 and 307, an electric field is developed across the composite layer, molecules in liquid crystal material 305 will align to coincide with the direction of the applied field. A light scattering effect develops at numerous interfaces between liquid crystal material 305 and polymer 304, due to their differences in refractive indices, and the display will appear translucent, milky white.

A method of fabricating the PDLC display of this embodiment comprises forming electrodes 302 and 307 on substrates 301 and 308 by means of a vapor deposition method. Alignment films 303 and 306 comprise 2% solution of polyimide of JIB, available from Japan Synthetic Rubber Co., which is spin-coated onto the surfaces of the transparent electrodes at a spinning rate of 2000 RPM. Substrates 301 and 308 and respective alignment films 303 and 306 are then annealed at a temperature of 150° C. The method of providing an alignment direction is accomplished by rubbing alignment films 303 and 306 in a single direction with a bleached cotton cloth. The rubbing directions on the respective films are arranged so as to be substantially parallel to each other when their respective substrates are assembled in facing relationship. A 10 $\mu$m gap portion is provide between the facing alignment films. A polymer precursor and a nematic liquid crystal material are mixed together with a ratio of 1:10 and heated to temperature of 100° C. The resultant mixture is then sealed within the gap portion between substrates. The polymer precursor is biphenyl methacrylate. The nematic liquid crystal material is, for example, product No. LV-R2 available from Rodick Inc. A 1% of a chiral component is added to the mixture, such as, product No. S-1011 available from Merck Co., Ltd. The mixture of polymer precursor and the nematic liquid crystal material is then gradually cooled, locking-in the polymer alignment. The resultant structure is exposed to ultraviolet light at room temperature to polymerize the polymer precursor, thereby hardening the polymer, and also allowing liquid/solid separation of liquid crystal material from polymerized polymer. The resulting display is almost completely transparent with field-OFF conditions, and has demonstrated a transmittance as high as 80%, as shown in FIG. 3.

For a field-ON condition comprising an AC electric field of 10 KHz and 20 volts, differences between the refractive indices of the polymer and the liquid crystal material cause light to scatter. The transmittance is 1%, as shown in FIG. 3. With no chiral component added, the transmittance is about 40%, as shown in FIG. 4. Thus, it is apparent that the chiral component considerably improves the transmittance.

Because the chiral component is added into the liquid crystal material in accordance with this embodiment, the threshold characteristic shows a change in the amount of light transmission with a change in voltage is also greatly improved thereby yielding a steep slope in the threshold characteristic, where b=1.34. This permits the use of 16 scan lines in a simple matrix drive scheme.

The material that can be used for the alignment films is not limited to polyimide, as a variety of other materials, such as, polyvinyl alcohol, may be used for alignment of the liquid crystal material. It is also suitable to impose an alignment on only one of the two substrates. When surfaces of two substrates have been aligned, the respective alignment directions must be individually optimized depending on the amount of chiral component present in the mixture. Preferably, the liquid crystal material employed should have a refractive index anisotropy, $\Delta n$, as high as possible to achieve the best contrast. The optimum amount of liquid crystal material in the mixture is in the range between 50% and 97%. If the amount of liquid crystal material is less than this amount, the display will not respond to an applied electric field. If the amount of liquid crystal material is greater than this amount, the proper contrast cannot be achieved. Other types of chiral components may be employed. The pitch of the liquid crystal material is an important consideration. The pitch of the liquid crystal material mixed with a chiral component can be expressed as $P = 1/34\ C$, where P is the pitch in micrometers and C is the concentration expressed in weight ratio. The concentration is in the range of about 0.1% to 5%, which provides a pitch of about 29 $\mu$m to about 0.59 $\mu$m. If other types of chiral components are employed, the pitch should be within this range. There is no problem if multiple chiral components are employed.

Various other types of polymers, such as, thermoplastic polymer, thermosetting polymer, and ultraviolet-hardened type polymer, may be employed only if a side chain of the biphenyl molecular structure is linked with the main chain of polymer.

Fourth Embodiment

A fourth embodiment of this invention is a reflection type, polymer dispersed liquid crystal display, which is a modification of the third embodiment. The fundamental structure of the display is the same as that for the third embodiment, shown in FIG. 2, except that metal, such as, aluminum, is employed as a reflector instead of a transparent conductive material for electrode 307. Accordingly, light incident to the display will be reflected by electrode 307 back through the composite layer.

Since electrode 307 functions as a reflector, the cell thickness is the same as employed in the third embodiment so that the cell transmittance or reflectance can be cut in half thereby doubling the contrast. Since the same contrast is, therefore, achieved with half the cell thickness, as in the case for the third embodiment, the drive voltage can correspondingly be reduced by one half. Specifically, with a cell thickness of 7 $\mu$m, the required drive voltage could be reduced to 7 volts. In lieu of electrode 307 functioning as a reflector, a separate reflection layer can be added to function as the reflector.

Fifth Embodiment

FIG. 5 illustrates a PDLC display, according to a fifth embodiment of this invention. The display comprises a two-terminal MIM (metal-insulator-metal) element. This element has a nonlinear resistance characteristic. The basic display is the same as the third embodiment. The method of fabricating the display, however, differs from the third embodiment in that the MIM element is formed on substrate 508. Tantalum vapor is deposited on the surface of substrate 508 to form electrode 511. The surface of electrode 511 is then oxidized, forming an insulating layer 510. Aluminum is vapor deposited on insulating layer 510 forming pixel electrode 509, which also serves as a reflector layer. Polyimide is applied as alignment film 506 on pixel electrode 509. Film 506 is annealed before an aligning direction is established. Rubbing alignment film 506 may be employed to fix the alignment direction. Oblique evaporation can also be used to achieve the alignment direction. The MIM element is positioned to face the side of substrate 501 containing electrode 502 and film 503. The edges are molded so the cell thickness is about 7 $\mu$m. A polymer precursor and a nematic liquid crystal material are then mixed in a ratio of 1:10, heated to 100° C., and sealed within the gap portion provided between the substrates. The polymer precursor may be biphenyl methacrylate. The nematic liquid crystal material is, for example, product No. LV-R2 available from Rodick Inc. The liquid crystal material has mixed with 1% of a chiral component, product No. S-1011 available from Merck Co., Ltd. The mixture is then gradually cooled and then exposed to ultraviolet light at room temperature to precipitate out an internally pre-aligned solid polymer. The result is a display that is almost completely reflective in the field-OFF condition and demonstrated a reflectance level as high as 75%.

For a field-ON condition comprising an AC electric field of 10 KHz at 7 volts, differences develop between the refractive indices of polymer and liquid crystal material causing light to scatter with a reflectance of 1%. With no chiral component added, the transmittance is about 40%, so that this embodiment provides for considerable improvement in transmittance over the prior art.

Displays having 400 scan lines and 640 signal lines are possible with uniform display performance over the entire screen. Utilizing a reflector on one of the substrates makes possible to use MIM elements rendering the present invention applicable to displays with a large viewing screen areas. Polyimide is not the only alignment film that may be used, as there is a variety of other materials, such as, polyvinyl alcohol, which may be used. It is best to apply an alignment direction only on one of the substrates. When surfaces of the two substrates have been aligned, the respective alignment directions of the alignment films must be individually tuned, depending on the amount of added chiral component. Preferably, the liquid crystal material employed should have a refractive index anisotropy, $\Delta$n, as high as possible in order to achieve the best contrast. The transmittance or reflectance in the transmissive mode can be improved by employing a liquid crystal material and polymer precursor having similar molecular structures. The optimum amount of liquid crystal material in the composite layer mixture is in the range between 50% and 97%. If the amount of liquid crystal material employed is less than this range, the display will not respond to an applied electric field. If the amount of liquid crystal material employed is greater than this range, the proper contrast cannot be obtained.

Other chiral components may be employed. The pitch of the liquid crystal material is important. The pitch of the liquid crystal material mixed with a chiral component can be expressed as P=1/34 C, where P is the pitch in micrometers and C is the weight ratio. The concentration is in the range of about 0.1% to 5%, which is a corresponding pitch of about 29 $\mu$m to about 0.59 $\mu$m. If other chiral components are employed, the pitch should be within this range. Heterogeneous chiral components are also acceptable.

Various types of polymers, such as, thermoplastic polymers, thermosetting polymers, and ultraviolet-hardened type polymers, can be used for the polymer component if a side chain of a biphenyl molecular structure is linked with the main chain of polymer. Alternatively, a polymer having a basic molecular structure similar to that of liquid crystal material molecules may also be employed.

Sixth Embodiment

FIG. 6 illustrates a PDLC display according to a sixth embodiment of this invention comprising a TFT (thin film transistor) element. The basic display is the same as that of the third embodiment except that the difference of employing a TFT active device on substrate 608. A method of fabricating the display comprises forming a gate electrode 617 on the surface of substrate 608. A gate insulating layer 616 is deposited on electrode 617. Semiconductor layer 615, drain electrode 614, source electrode 613 and pixel electrode 609, also serving as a reflector layer, are formed. After placing alignment films 603 and 606 on substrates 601 and 608, an alignment direction is incorporated into the alignment films. To set the alignment direction, the oblique evaporation method or the LB film method may be employed. Substrates 601 and 608 are assembled such that the alignment directions are substantially parallel. The edges are molded so the cell thickness is about 7 $\mu$m. A polymer precursor and a nematic liquid crystal material are mixed in a ratio of 1:10, heated to 100° C., and sealed within a gap portion formed between the substrates. The polymer precursor may be biphenyl methacrylate. The nematic liquid crystal material is, for example, product No. LV-R2 available from Rodick Inc. The liquid crystal material has mixed in 1% of a chiral component, such as, product No. S-1011 available from Merck Co., Ltd. The mixture is gradually cooled, locking in the predetermined alignment. The resultant structure is exposed to ultraviolet light at room temperature to precipitate out an internally pre-aligned solid polymer.

The result is a display that is almost completely transparent with field-OFF conditions, and has a reflectance of 75%. For a field-ON condition comprising an AC electric field of 10 KHz and 7 volts, differences between the refractive indices of polymer 604 and liquid crystal material 605 causes light to scatter with a reflectance of 1%. With no chiral component added, the transmittance is about 40%, so that transmittance is improved considerably with the addition of a chiral component. A prototype display with 400 scan lines and 640 signal lines was formed, which would otherwise be hard to achieve with uniformity over the entire display screen. The reflection layer allows the use of a TFT active device which makes the present invention applicable to a display having a large viewing screen area.

Polyimide is not the only alignment film that can be employed, as a variety of other materials, such as, polyvinyl alcohol, may be used. It is best to apply alignment relative to only one of the substrates. When surfaces of two substrates have been aligned, it is necessary to individually optimize the alignment depending on the amount of added chiral component.

Preferably, the liquid crystal material employed should have a refractive index anisotropy, $\Delta n$, as high as possible in order to obtain the best contrast. In this embodiment, the liquid crystal material has a positive dielectric anisotropy. The transmittance or reflectance in the transmissive mode can be improved by employing a liquid crystal material and polymer precursor having similar molecular structures. The optimum amount of liquid crystal material employed in the composite layer mixture is in the range between 50% and 97%. If the amount of liquid crystal material employed is less than this range, the display will not respond to an applied electric field. If the amount of liquid crystal material employed is greater than this range, the proper contrast cannot be obtained.

Other chiral components may also be employed. The pitch of the liquid crystal material is important. The pitch of the liquid crystal material mixed with a chiral component can be expressed as $P = 1/34C$, where P is the pitch in micrometers and C is the weight ratio. The concentration is in the range of about 0.1% to 5%, which is a pitch of about 29 $\mu$m to about 0.59 $\mu$m. If other chiral components are employed, the pitch should be within this range. Heterogeneous chiral components are also acceptable.

Various types of polymers, such as, thermoplastic polymers, thermosetting polymers, and ultraviolet-hardened type polymers, may be used for the polymer component as long as a side chain of a biphenyl molecular structure is linked with the main chain of polymer. Alternatively, as indicated above, a polymer having a molecular structure similar to that of liquid crystal material molecules may be employed.

Although the above explanations for the fifth and sixth embodiments deal with PDLC reflective mode device with reference to the application to MIM elements and TFT elements, such MIM and TFT active elements are equally applicable in a PDLC transmissive mode device as long as the drive voltage for display can be reduced. Alternatively, even if the drive voltage for PDLC display is not reduced, these embodiments may be used directly with MIM and TFT active devices as a transmissive mode device.

Seventh Embodiment

FIGS. 7A and 7B illustrates a polymer-dispersed liquid crystal material device comprising a seventh embodiment of this invention employing an epoxy resin as a thermosetting polymer. It has the same basic structure as the third embodiment illustrated in FIG. 2. A method of fabricating a PDLC display comprises forming electrodes 702 and 707 respectively on two transparent substrates 701 and 708 by means of a vapor deposition method. A 2% solution of polyimide of JIB, available from Japan Synthetic Rubber Co., is spin-coated on the surfaces of transparent electrodes 702 and 707, at a spinning rate of 2000 RPM, providing alignment films 703 and 706. Substrates 701 and 708 and respective alignment films 703 and 706 are annealed at 150° C. The method of ingraining an alignment direction is by rubbing alignment films 703 and 706 in one direction with a bleached cotton cloth. Beside using a rubbing alignment process, other means, such as, an oblique evaporation method or an LB film method, which physically aligns the liquid crystal material parallel to substrates 701 and 708, may be employed. The rubbing directions are produced in a manner that they will be substantially parallel to each other after assembly of substrates 701 and 708 with alignment film surfaces 703 and 706 face-to-face relation with a cell thickness of 10 $\mu$m.

An epoxy resin and a nematic liquid crystal material are mixed in a ratio of 1:9, heated to 100° C., and sealed within a gap portion provided between substrates. As the epoxy resin, product No. YDF-170 available from Toto Kasei Co., Ltd. can be employed with a curing agent, such as product No. 121, available from Shell Oil Co. Product No. LV-R2, available from Rodick Inc., can be employed as the nematic liquid crystal material, to which a 1% of product No. S-1011, available from Merck Co., Ltd., is added as a chiral component. The mixture of epoxy resin and nematic liquid crystal material is gradually cooled, locking in the predetermined alignment. The resultant structure is then left for a day at room temperature to harden the epoxy resin and to allow liquid/solid separation of liquid crystal material 705 from polymer 704. In FIGS. 7A and 7B, the arrows indicate the direction of alignment, respectively, of polymer 704 and liquid crystal material 705.

The result achieved is a PDLC display that is almost completely transparent with field-OFF conditions and has demonstrated a transmittance as high as 80%, as illustrated in FIG. 8. For a field-ON condition comprising an AC electric field of 10 KHz and 10 volts is applied to electrodes 702 and 707, as viewed in FIG. 7B, differences between the refractive indices of polymer 704 and liquid crystal material 705 cause light to scatter. As indicated in FIG. 8, the transmittance is 1%. With no chiral component added, the transmittance is about 40%. Also, the threshold characteristic, which shows the change in the amount of light transmission when the voltage is varied, was significantly improved.

Polyimide is not the only alignment film that can be employed, as a variety of other materials, such as, polyvinyl alcohol may be used. It is best to apply an alignment only on one of the substrates. When surfaces of two substrates have been aligned, the respective alignment directions must be individually tuned depending on the amount of added chiral component. Preferably, the liquid crystal material employed should have a refractive index anisotropy, $\Delta n$, as high as possible in order to achieve the best contrast and be of a type having positive dielectric anisotropy. The optimum amount of liquid crystal material in the composite layer mixture is in the range between 50% and 97%. If the amount of liquid crystal material employed is less than this range, the display will not respond to an applied electric field. If the amount of liquid crystal material employed is greater than this range, the proper contrast cannot be obtained.

Other chiral components may be employed. The pitch of the liquid crystal material is important. The pitch of the liquid crystal material mixed with a chiral component can be expressed as $P = 1/34C$, where P is the pitch in micrometers and C is the weight ratio. The concentration is in the range of about 0.1% to 5%, which is a pitch of about 29 $\mu$m to about 0.59 $\mu$m. If other chiral components are employed, the pitch should be within this range. Heterogeneous chiral components are also acceptable.

A thermosetting type polymer that can be harden via polymerization while mixed with liquid crystal material can also be employed. For instance, 4,4'-propyl biphenyl-w, w'-diisocyanate and diol of biphenyl may be mixed and polymerized. Ideally, a polymer precursor having a molecular structure similar to liquid crystal material molecules may also be employed.

Eighth Embodiment

An eighth embodiment of this invention comprises a thermoplastic poly-α methylstyrene having the same basic structure as the seventh embodiment shown in FIGS. 7A and 7B. A method of fabricating a display comprises forming electrodes on two transparent substrates by means of a vapor deposition method. Alignment films are made with a 2% solution of polyimide of JIB, available from Japan Synthetic Rubber Co., spin-coated at 2000 RPM onto the surfaces of the substrates, and are then annealed at 150° C. The alignment film surfaces are then rubbed in a single uniform direction to provide for directional alignment. Other methods, such as, the oblique evaporation method and the LB film method, may also be employed. The rubbing directions are such that the respective directions are substantially parallel after assembly of the substrates. The alignment film surfaces of the substrates face each other with a cell thickness of about 10 μm. A mixture of a thermoplastic poly-α methylstyrene and a liquid crystal material is heated to 100° C., and is sealed within the gap portion provided between substrates. A liquid crystal material, such as, product No. RDP80616, available from Rodick Inc., may be employed. The mixture of thermoplastic poly-α methylstyrene and liquid crystal material is gradually cooled to room temperature locking in the predetermined alignment. One component of the mixture becomes a solid phase and the other component remains in its liquid phase. The solid phase comes from a hardening of the thermoplastic poly-α methylstyrene. PDLC displays made in this manner have demonstrated a transmittance as high as 20%, as shown in FIG. 10.

For a field-ON condition comprising an AC electric field of 10 KHz and 6 volts, differences between the refractive indices of polymer and liquid crystal material cause a light scattering effect with a transmittance that falls to 1%, as shown in FIG. 10. Though not perfect, the performance can be improved by structurally optimizing the thermoplastic resin. For example, a molecular structure can be linked with liquid crystal molecules, such as a biphenyl group, introduced in a side chain or main chain.

Alignment film materials are not limited to polyimide, as a variety of other materials, such as, polyvinyl alcohol may be employed. It is best to apply an alignment film only on one of the substrates and also add a chiral component to the liquid crystal mixture. For example, a chiral component, product No. S-1011 available from Merck Co., Ltd., has the effect of improving threshold characteristics. When surfaces of both substrates have been aligned, the respective alignment directions must be individually tuned depending on the amount of chiral component added to the liquid crystal mixture.

Preferably, the liquid crystal material used should have a refractive index anisotropy, Δn, as high as possible in order to achieve the best contrast and should be of a type having positive dielectric anisotropy. The optimum amount of liquid crystal material in the composite layer mixture is in the range between 50% and 97%. If the amount of liquid crystal material employed is less than this range, the display will not readily respond to an applied electric field because the polymer grains form a thick gel or solid matrix. If the amount of liquid crystal material employed is greater than this range, the proper contrast cannot be obtained because an insufficient amount of polymer exists to produce a sufficient blanket of interfaces with mismatched reflective indices. Any chiral component added into liquid crystal material should be as explained in the seventh embodiment. As to the polymer component, a thermoplastic type polymer that can be dissolved into liquid crystal material at a temperature higher than operational temperatures, that can be aligned in a liquid phase, and that can be phase separated from the liquid crystal material when cooled, may be employed.

Ninth Embodiment

A ninth embodiment of this invention comprises a side-chain type liquid crystal polymer having a cyanobiphenyl group as a liquid crystal polymer. The basic structure of this embodiment is the same as that of the seventh embodiment shown in FIGS. 7A and 7B.

A method of fabricating a display is as follows. First, electrodes 702 and 707 are formed respectively on transparent substrates 701 and 708 by means of a vapor deposition method. A 2% solution of polyimide, such as, JIB polyimide, available from Japan Synthetic Rubber Co., is spin-coated at 2000 RPM onto the surfaces of substrates 701 and 708, forming alignment films on these surfaces. The substrates are then annealed at 150° C. The alignment film surfaces are rubbed in a single uniform direction. The rubbing directions are such that the respective directions are substantially parallel after assembly of the substrates in spatial relation with a gap portion of 10 μm formed therebetween with the alignment film surfaces facing each other.

A mixture of a side-chain type liquid crystal polymer having a cyanobiphenyl group, expressed in Formula 1 below, and a nematic liquid crystal material, are heat to 120° C. and is sealed within the gap portion between substrates 701 and 708. Product No. LV-R2, available from Rodick Inc., may be used as the nematic liquid crystal material, and 1% of product No. S-1011, available from Merck Co., Ltd., is added as a chiral component.

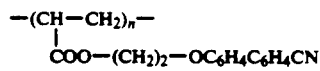

Formula 1:

(The isotropic phase transition point is 112° C., the nematic phase transition point is 62° C., and $C_6H_4$ indicates a benzene ring.)

The mixture of the side-chain, liquid crystal polymer and the nematic liquid crystal material is gradually cooled to 70° C., locking in the prealignment wherein one component of the mixture becomes solid phase and the other component remains in its liquid phase.

FIG. 11 illustrates test results showing that the resulting PDLC display has a transmittance as high as 80%. For a field-ON condition comprising an AC electric field of 10 KHz and 10 volts, differences between the refractive indices of polymer and liquid crystal material caused a light scattering effect, with a transmittance of 1%, as shown in FIG. 11. This characteristic is substantially improved over the prior art, as shown in FIG. 9, due to the addition of a chiral component. Although a chiral component is not strictly necessary, it does improve performance in the embodiments of this inventions.

Polyimide is not the only alignment film that can be employed, as a variety of other materials, such as, polyvinyl alcohol may be employed. It is best to apply an alignment film only on one of the substrates. Preferably, liquid crystal material having a refractive index anisotropy, $\Delta n$, as high as possible in order to achieve the best contrast. The liquid crystal material should have positive dielectric anisotropy. The optimum amount of liquid crystal material in the composite layer mixture is in the range between 50% and 97%. If the amount of liquid crystal material employed is less than this range, the display will not respond to an applied electric field. If the amount of liquid crystal material employed is greater than this range, the proper contrast cannot be obtained.

A chiral component mixed with the liquid crystal material may be added as explained above in connection with the seventh embodiment. The liquid crystal polymer is not limited to side-chain and main-chain types, as other types may be employed that are capable of dissolving into liquid crystal material at a temperature higher than the operational temperature of the display, that can be aligned in their liquid phase, and can bring about phase separation of the polymer from liquid crystal material when the mixture is cooled. For example, liquid crystal polymers, e.g., set forth in Formulas 2 to 9 below, may be employed. These polymers are just examples, as the optimization is required when mixing with a liquid crystal material. If the solubility between the liquid crystal material and polymer in the liquid phase is poor, a cosolvent for the liquid crystal material and the polymer can be added. The liquid crystal polymer should be transformed into a liquid crystal phase when mixed with the cosolvent. The solvent should be removed after alignment so one component achieves solid phase and the other component remains in its liquid phase.

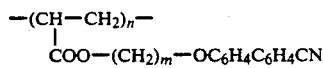

Formula 2:

(m is a positive integer, and $C_6H_4$ indicates a benzene ring.)

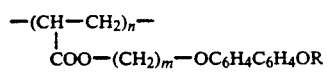

Formula 3:

(m is a positive integer, R is an alkyl group, and $C_6H_4$ indicates a benzene ring.)

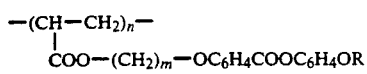

Formula 4:

(m is a positive integer, R is an alkyl group, and $C_6H_4$ indicates a benzene ring.)

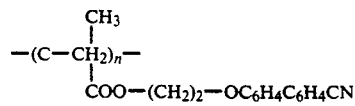

Formula 5:

(The isotropic phase transition point is 112° C., the nematic phase transition point is 50° C., and $C_6H_4$ indicates a benzene ring.)

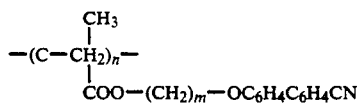

Formula 6:

(m is a positive integer, and $C_6H_4$ indicates a benzene ring.)

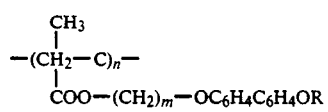

Formula 7:

(m is a positive integer, R is an alkyl group, and $C_6H_4$ indicates a benzene ring.)

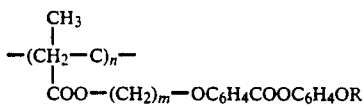

Formula 8:

(m is a positive integer, R is an alkyl group, and $C_6H_4$ indicates a benzene ring.)

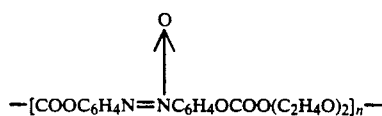

Formula 9:

($C_6H_4$ indicates a benzene ring.)

Tenth Embodiment

A tenth embodiment of this invention is a PDLC reflective type liquid crystal display involving modifications of the seventh, eighth, and ninth embodiments. The fundamental structure is the same as that shown in FIGS. 7A and 7B, except that aluminum or other metal film is employed for electrode 707 instead of employing a transparent conductive material. Since electrode 707 functions as a reflector and the cell thickness is the same as employed in the seventh embodiment, the transmittance (reflectance) can be reduced by one half thereby doubling the contrast. The same contrast is obtainable with half the cell thickness of the seventh embodiment so that the drive voltage can also be reduced by 50%. For example, with a 5 μm thick cell, the required drive voltage could be reduced to 5 volts.

Eleventh Embodiment

FIG. 12 illustrates a PDLC display according to an eleventh embodiment of this invention. The display comprises a MIM element. The basic display is the same as that of the seventh embodiment of FIGS. 7A and 7B except for the MIM element formed on substrate 1108. Electrode 1111 is formed on the surface of substrate 1108 by means of tantalum vapor deposition. The surface is oxidized forming an insulating layer 1110. Pixel electrodes 1102 and 1109, e.g., aluminum, is then vapor deposited on insulating layer 1110. Alignment films 1103 and 1106 are polyimide coatings formed on pixel electrodes 1102 and 1109, and are annealed before an aligning direction is established on the films. Substrates 1101 and 1108 are then assembled together forming a gap portion and the edges of the assembly are molded over resulting in a cell thickness of about 7 μm.

An epoxy resin and a nematic liquid crystal material are mixed in a ratio of 1:9, heated to 100° C., and sealed within the gap portion between substrates 1101 and 1108. The epoxy resin may be product No. YDF-170, available from Toto Kasei Co., Ltd., employed with a curing agent, such as, product No. 121 available from Shell Oil Co. The nematic liquid crystal material may be product No. LV-R2 available from Rodick Inc., and 1% of chiral component, product No. S-1011 available from Merck Co., Ltd., is added to the mixture. The mixture of epoxy resin and nematic liquid crystal material is gradually cooled, locking in the directional alignment. The resulting structure is then left for one day at room temperature to permit hardening of the epoxy resin and to allow liquid/solid separation of liquid crystal material 1105 from polymer 1104.

The resulting display that is almost completely transparent and, with field-OFF conditions, has a reflectance of 75%. For a field-ON condition comprising an AC electric field of 10 KHz and 7 volts, differences between the refractive indices of polymer 1104 and liquid crystal material 1105 cause light to scatter with a reflectance of 1%. A prototype display with 400 scan lines and 640 signal lines was made, which had uniform properties over the entire screen, which properties are otherwise difficult to realize. Utilizing a reflector layer on one of the substrates makes possible the use of MIM elements, which are required in cases for displays having large viewing screen area.

Polyimide is not the only alignment film that may be employed, as a variety of other materials, such as, polyvinyl alcohol, which can physically align the liquid crystal material, may be used as well. It is best to apply an alignment relative to only one of the substrates. When surfaces of two substrates have been aligned, the respective alignment directions must be individually tuned depending on the amount of added chiral component.

Preferably, the liquid crystal material used should have a refractive index anisotropy, Δn, as high as possible in order to achieve the best contrast. The transmittance or reflectance in a transmissive mode can be improved by employing liquid crystal materials with molecular structures similar to the polymer precursor. The optimum amount of liquid crystal material in the composite layer mixture is in the range between 50% and 97%. If the amount of liquid crystal material employed is less than this range, the display will not respond to an applied electric field. If the amount of liquid crystal material employed is greater than this range, the proper contrast cannot be obtained.

The chiral component mixed into liquid crystal material should be added in the manner explained previously in connection with the seventh embodiment. Polymers suggested in the eighth or ninth embodiments may also be employed. Beside electrode 1109 functioning as a reflector, this reflection layer is positioned to be opposite to electrode 1102 on substrate 1101 and may be laminated to the substrate.

Twelfth Embodiment

FIG. 13 illustrates a PDLC display comprising a twelfth embodiment of this invention. The display utilizes a three-terminal TFT and is the same basic structure as for the ninth embodiment shown in FIGS. 7A and 7B. The method of fabricating the display differs from the ninth embodiment, however, in that a TFT active device is formed on substrate 1208. A gate electrode 1217 is formed on the surface of substrate 1208. Gate insulating layer 1216 is formed on electrode 1217. Semiconductor layer 1215, drain electrode 1214, source electrode 1213, and pixel electrode 1209, also serving as a reflector layer, are, respectively, formed on substrate 1208. After an alignment film 1206 is formed on electrode 1209, a directional alignment is incorporated into the film. For substrate 1201, electrode 1202 is formed on its surface followed by alignment film 1203 formed on electrode 1202, and a directional alignment is incorporated in the alignment film. To set the alignment direction, the oblique evaporation method may be employed as well as the method of surface rubbing of the alignment films. Substrates 1201 and 1208 are assembled such that the direction of alignment of alignment films 1203 and 1206 are substantially parallel. The edges of the assembly are molded so the cell thickness is about 7 μm.

A mixture of a side-chain type liquid crystal polymer having a cyanobiphenyl group and a nematic liquid crystal material, heated to 120° C., is sealed within a gap portion formed between substrates 1201 and 1208. Product No. LV-R2, available from Rodick Inc., may be employed as the nematic liquid crystal material, and a chiral component comprising 1% of product No. S-1011, available from Merck Co., Ltd., is added to the mixture. The mixture of the side-chain type liquid crystal polymer and the nematic liquid crystal material is gradually cooled, locking in the alignment direction so that one component becomes solid phase and the other component remains in its liquid phase. The result is a display that is almost completely transparent with field-OFF conditions, and has a reflectance level of 75%.

For a field-ON condition comprising an AC electric field of 10 KHz and 7 volts, differences between the refractive indices of polymer 1204 and liquid crystal material 1205 cause a light scattering effect. The reflectance in the light scattering effect is 1%.

A prototype with 400 scan lines and 640 signal lines was made, which had uniform properties over the entire screen, which properties are otherwise difficult to realize. Utilizing a reflector layer allows the use of a TFT active devices, which are required for displays having a large viewing screen area. Polyimide is not the only alignment film that can be employed, as a variety of other materials, such as, polyvinyl alcohol, which can physically align a liquid crystal material, may be used as well. It is best to apply an alignment relative to only one of the substrates. When surfaces of two substrates have been aligned, the respective alignment directions must be individually tuned depending on the amount of added chiral component. Preferably, the liquid crystal material used will have a refractive index anisotropy, Δn, as high as possible in order to achieve the best contrast. The transmittance or reflectance in a transmissive mode can be improved by employing liquid crystal materials with molecular structures similar to the polymer precursor. The optimum amount of liquid crystal material in the composite layer mixture is in the range between 50% and 97%. If the amount of liquid crystal material employed is less than this range, the display will not respond to an applied electric field. If the amount of liquid crystal material employed is greater than this range, the proper contrast cannot be obtained. The chiral component mixed into liquid crystal material is added in the manner explained in the seventh embodiment.

As for other polymer components, those specified in the seventh and eighth embodiment as well as in the ninth embodiment may be employed.

Although the above has described only polymer reflection mode devices having MIM and TFT devices, transmissive mode devices are also possible as long as the drive voltage for PDLC display can be reduced. Otherwise, the voltage breakdown rating of the MIM and TFT active devices will need to be enhanced.

An alignment film applied to only one of the substrate is also still effective. The cell thickness is not limited to the value mentioned above, as this value can be experimentally determined.

Thirteenth Embodiment

FIGS. 14A and 14B illustrate a PDLC device according to a thirteenth embodiment of this invention utilizing a negative dielectric anisotropic liquid crystal material so that the liquid crystal material and polymer have initial alignments that are perpendicular to the planar extent of the substrates. A composite PDLC layer is sandwiched between two transparent substrates 1301 and 1308 comprising microscopic grains of a polymer 1304 dispersed in a liquid crystal material 1305 where one is in a liquid phase and the other is in a solid phase. Preferably, polymer 1304 and liquid crystal material 1305 will dissolve in each other when both are initially in their respective liquid crystal phases, after which the polymer is precipitated out of solution. Substrates 1301 and 1308 respectively have transparent electrodes 1302 and 1307 on their inner surfaces. Alignment films 1303 and 1306 are formed on electrodes 1302 and 1307, and the alignment of these films will commonly align liquid crystal material 1305 and polymer 1304 while they are in their liquid crystal phases. Thus, both of these components are initially in their liquid phase and are sealed between substrates 1301 and 1308. Although polymer 1304 is in a liquid phase to initially receive its alignment orientation, it is later hardened into a solid phase to fix the polymer alignment. Even under field-ON conditions applied to polymer 1304, the direction of alignment of polymer 1304 will not respond to the direction of the applied field. Since liquid crystal material 1305 has no fixed direction of alignment, the liquid crystal molecules can rotate parallel with the direction of the applied field during field-ON conditions.

As shown in FIG. 13A, in the absence of an applied electric field, polymer 1304 and liquid crystal material 1305 align in directions perpendicular to the planes of substrates 1301 and 1308. Under these conditions, wherein the refractive index of polymer 104 is equal to that of liquid crystal material 1305, the PDLC display operates in a transparent mode.

As shown in FIG. 13B, when a drive signal is applied between transparent electrodes 1302 and 1307, a field develops across the composite layer and the direction of alignment of liquid crystal material 1305 will become perpendicular to the direction of the applied field. In the direction of applied field, a light scattering effect is develop at the interface between liquid crystal material 1305 and polymer 1304 due to their differences in refractive indices so that the display becomes translucent, milky white.

A polymer precursor in a liquid phase, which is sealed between substrates 1301 and 1308 and can be polymerized, may be employed as polymer component 1304. The grains of polymer 1304 are dispersed into liquid crystal material 1305. On the other hand, the grains of liquid crystal material 1305 are dispersed into polymer 1304.

A method of fabricating the PDLC display of this embodiment comprises forming electrodes 1302 and 1307 on substrates 1301 and 1308 by means of a vapor deposition method. Substrates 1301 and 1308 are then soaked for 30 minutes in a 2% solution of product No. LP-8T, available from Shin-Etsu Silicon Co., Ltd., cleaned with water, and dried at a temperature of 130° C., resulting in alignment films 1303 and 1306. Alignment films 1303 and 1306 on substrates 1301 and 1308 are placed in face-to-face relation having a cell thickness of 10 $\mu$m. A mixture of a biphenyl methacrylate and a liquid crystal material, mixed in a ratio of 1:10, heated to 100° C., is sealed within a gap portion formed between substrates 1301 and 1308. A liquid crystal material, for example, product No. RDN00775, available from Rodick Inc., may be employed. The mixture of biphenyl methacrylate and liquid crystal material is then gradually cooled, exposed to ultraviolet light at room temperature to harden the biphenyl methacrylate, and to allow for liquid/solid separation of liquid crystal material 1305 from biphenyl methacrylate 1304.

Operation of the display fabricated in above manner will now be explained. Polymer 1304 and liquid crystal material 1305, shown in FIGS. 14A and 14B, have similar refractive index anisotropies. The refractive index is approximately 1.5 parallel to the direction of alignment, and about 1.7 perpendicular to the direction of alignment.

As shown in FIG. 14A, liquid crystal material 1305 aligns with polymer 1304 in the same direction whenever the applied electric field is off. The refractive indices of liquid crystal material 1305 and polymer 1304, therefore, are 1.5 and are aligned perpendicular to the planes of substrates 1301 and 1308. As a result, the display is almost completely transparent. The display has demonstrated a transmittance as high as 50%.

As shown in FIG. 14B, when a drive signal is applied to electrodes 1302 and 1307, a field is developed across the composite layer. Liquid crystal material 1305 aligns perpendicular to the direction of the applied field, i.e., parallel to the planes substrates 1301 and 1308. The direction of alignment of polymer 1304 does not change. With a field perpendicular to the planes of substrates 1301 and 1308, the refractive index of liquid crystal material becomes about 1.7, while that of polymer 1304 remains approximately 1.5. Differences between the refractive indices of polymer 1304 and liquid crystal material 1305 in the direction of the applied field are, therefore, about 0.2. This difference causes incident light entering at a direction perpendicular to the planes of substrates 1301 and 1308 to scatter twice as much as compared to light scattering in the prior art. So, the display becomes translucent, milky white in the direction of the applied field. For a field-ON condition comprising an AC field of 10 KHz and 20 volts, the transmittance is 5%.

In this embodiment, it should be noted that only a perpendicular method of ingraining an alignment direction is required relative to films 1303 and 1306. As a result, no rubbing is necessary to align the liquid crystal/polymer composite layer, thus simplifying the number of manufacturing steps. Further, a liquid crystal material which aligns perpendicular to the planes of the substrates under no voltage applied conditions provides for a display having a high resistance to ultraviolet light and, therefore, will have a longer service life.

Polymers will show a liquid crystal phase even when mixed with liquid crystal material when a benzene molecular structure or, preferably, a biphenyl molecular structure, is introduced into the polymer. Ultraviolet radiation is used to polymerize the materials while in their liquid crystal phase. A polymer without a benzene molecular structure can be employed as well if it can be successfully align with the liquid crystal material.

Fourteenth Embodiment

A fourteenth embodiment of this invention utilizes a thermosetting polymer and has a basic structure that is the same as that of the thirteenth embodiment shown in FIGS. 14A and 14B. A method of fabricating a PDLC display comprises forming electrodes on two substrates by means of a vapor deposition method. Alignment films are made by soaking the substrates for 30 minutes in a 2% solution of product No. LP-8T available from Shin-Etsu Silicon Co., Ltd., cleaning with water, and drying at a temperature of 130° C. Alignment films are placed in face-to-face relation with a cell thickness of 10 μm. An epoxy resin and a nematic liquid crystal material are mixed in a ratio of 1:9, heated to 100° C. and sealed within a gap portion formed between the substrates. The epoxy resin, e.g., product No. YDF-170 available from Toto Kasei Co., may be employed with a curing agent, such as, product No. 121 available from Shell Oil Co. The liquid crystal material may be product No. RDN0075 available from Rodick Inc. The mixture of the epoxy resin and the nematic liquid crystal material is gradually cooled, locking in the alignment imposed by the alignment films. The resultant structure is then left for one day at room temperature to permit hardening of the epoxy resin and to allow liquid/solid separation of the liquid crystal material from the polymer. The result is a display that is almost completely transparent under field-OFF conditions, and provides a transmittance as high as 40%. For a field-ON conditions comprising an AC electric field of 10 KHz and 10 volts, differences between the refractive indices of the polymer and the liquid crystal material cause light to scatter with a transmittance of 10%.

Polymers that will show a liquid crystal phase even when mixed with liquid crystal material and can be polymerized to a harden state by heating while in its liquid phase may be employed. If a benzene molecular structure, or preferably a biphenyl molecular structure, is introduced into polymer, it will improve its affinity with the liquid crystal material as well as assisting in their alignment. Further, a polymer even without benzene molecular structure can be employed as well if it aligns with the liquid crystal material. For instance, 4,4'-n-prophyl biphenyl- w,w'-diisocyanate and diol of biphenyl are mixed together for polymerization.

Fifteenth Embodiment

A fifteenth embodiment of this invention utilizes a thermoplastic polymer, and its basic structure is the same as that of the thirteenth embodiment shown in FIGS. 14A and 14B. A method of fabricating a PDLC display comprises forming electrodes on two substrates by means of a vapor deposition method. Alignment films are formed by soaking the substrates for 30 minutes in a 2% solution of product No. LP-8T, available from Shin-Etsu Silicon Co., Ltd., cleaning with water, and drying at a temperature of 130° C. The alignment films are placed face-to-face relation having a cell thickness of 10 μm. A mixture of a thermoplastic poly-α methylstyrene and a liquid crystal material, heated to 100° C., is sealed within the gap portion formed between the assembled substrates. Product No. RDN0075, available from Rodick Inc., may be employed for the liquid crystal material. The mixture of thermoplastic poly-α methylstyrene and liquid crystal material is then gradually cooled, locking in their prealignment. The resulting structure is then left at room temperature to harden the thermoplastic poly-α methylstyrene and to allow liquid/solid separation of the liquid crystal material from the polymer. The result is a display that is almost completely transparent with field-OFF conditions with a transmittance as high as 50%. For a field-ON condition comprising an AC electric field of 10 KHz and 6 volts, differences between the refractive indices of polymer and liquid crystal material cause a light scattering effect, with a transmittance of 10%. Further improvement can be realized by optimizing the structure of the thermoplastic resin. In particular, a molecular structure that can be linked with liquid crystal material molecules, such as, a biphenyl group, is introduced in a side chain or in the main chain. A thermoplastic type polymer may be employed which can be dissolved into liquid crystal material at a temperature higher than the operational temperature of the display, can be aligned in a liquid phase, and can bring about phase separation of the polymer from the liquid crystal material upon cooling.

Sixteenth Embodiment

A sixteenth embodiment of this invention comprises a liquid crystal polymer having the same basic structure as that of the thirteenth embodiment shown in FIGS. 14A and 14B. A method of fabricating a PDLC display comprises forming electrodes on two substrates by means of a vapor deposition method. Alignment films are formed by soaking the substrates for 30 minutes in a 2% solution of product No. LP-8T, available from Shin-Etsu Silicon Co., Ltd., cleaning with water, and drying at a temperature 130° C. The alignment films are placed in face-to-face relation with a cell thickness of 10 μm. A mixture of a side-chain type liquid crystal polymer having cyanobiphenyl group, set forth in Formula 10 below, and a liquid crystal material, product No. RDN0075, available from Rodick Inc., are heated to 120° C., and sealed within the gap portion. The mixture of the side-chain liquid crystal polymer and liquid crystal material are then gradually cooled, locking in the alignment direction. The resultant structure is then placed at room temperature so one component becomes a solid phase and the other component remains in its liquid phase.

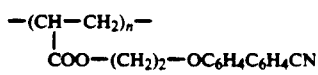

Formula 10:

(The isotropic phase transition point is 112° C., the nematic phase transition point is 62° C. and $C_6H_4$ indicates a benzene ring.)

The result is a display that is almost completely transparent with field-OFF conditions providing a transmittance as high as 80%. For a field-ON condition comprising an AC electric field of 10 KHz and 10 volts, differences between the refractive indices of polymer and liquid crystal material produce a light-scattering effect, with a transmittance of 10%. The polymer employed is not limited to just the side-chain or main-chain types, as any type which is capable of being dissolved into liquid crystal material at a temperature higher than the operational temperature, which can be aligned in a liquid phase and which can be phase separated from the liquid crystal material when cooled, can also be employed. For example, liquid crystal polymers having Formulas 11 to 18 can be employed. These polymers are just examples and the resulting structure requires optimization when mixing with a particular liquid crystal material. When solubility between a chosen liquid crystal material and liquid crystal polymer is poor, a cosolvent for the liquid crystal material and the liquid crystal polymer can be employed. The liquid crystal polymer should be of the type which changes into a liquid phase when mixed with a cosolvent. The cosolvent should be removed after alignment so that one component can be in its solid phase and the other component remains in its liquid phase.

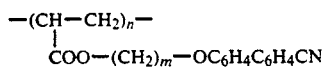

Formula 11:

(m is a positive integer, and $C_6H_4$ indicates a benzene ring.)

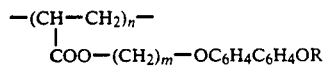

Formula 12:

(m is a positive integer, R is an alkyl group, and $C_6H_4$ indicates a benzene ring.)

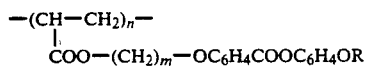

Formula 13:

(m is a positive integer, R is an alkyl group, and $C_6H_4$ indicates a benzene ring.)

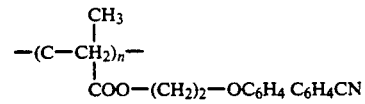

Formula 14:

(The isotropic phase transition point is 112° C., the nematic phase transition point is 50° C. and $C_6H_4$ indicates a benzene ring.)

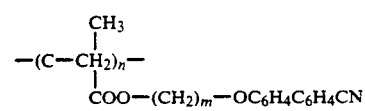

Formula 15:

(m is a positive integer, and $C_6H_4$ indicates a benzene ring.)

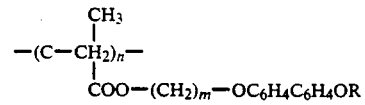

Formula 16:

(m is a positive integer, R is an alkyl group, and $C_6H_4$ indicates a benzene ring.)

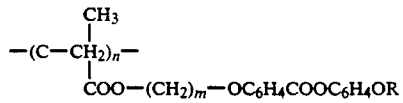

Formula 17:

(m is a positive integer, R is an alkyl group, and $C_6H_4$ indicates a benzene ring.)

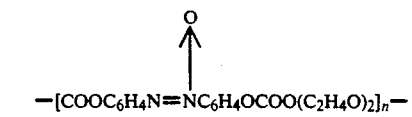

Formula 18:

($C_6H_4$ indicates a benzene ring.)

Seventeenth Embodiment

A seventeenth embodiment of this invention is a PDLC reflective type display which is a modification of the thirteenth to sixteenth embodiments. The fundamental structure is the same as the thirteenth embodiment, shown in FIGS. 14A and 14B, except that a metal, such as, aluminum, is employed for electrode 1307 instead of a transparent conductive material.

Since electrode 1307 functions as a reflector, the cell thickness is the same as in the thirteenth embodiment. The transmittance (reflectance) can be cut in half, doubling the contrast. The same contrast is obtainable with half the cell thickness of the thirteenth embodiment, i.e., 5 μm, so the drive voltage can correspondingly be reduced by 50%. For example, with a 5 μm thick cell, the required drive voltage can be reduced to 5 volts, which is highly compatible with inexpensive semiconductors.

Eighteenth Embodiment

FIG. 15 illustrates a PDLC display of the eighteenth embodiment utilizing a MIM two-terminal active device. The basic display is the same as that for the thirteenth embodiment in FIGS. 14A and 14B except for MIM elements formed on substrate 1808. A method of fabricating the display comprises the deposition of tantalum creating electrode 1811 on the surface of substrates 1808. The surface of electrode 1811 is then oxidized, forming an insulating layer 1810. Aluminum is deposited on the surface of substrate 1808 forming a pixel electrode 1809 on insulating layer 1810. Alignment films 1803 and 1806 are formed by soaking substrate 1808 for 30 minutes in a 2% solution product No. LP-8T available from Shin-Etsu Silicon Co., Ltd., cleaning with water, and drying at a temperature of 130° C. Electrode 1802 is formed on the surface of substrate 1801. Alignment films 1801 and 1808 are formed on the surfaces of substrates 1801 and 1808 and substrates 1801 and 1808 are assembled in face-to-face relation with a cell gap thickness of about 10 μm.

A mixture of a biphenyl methacrylate and a liquid crystal material, mixed in a ratio of 1:10 and heated to 100° C., is sealed within a gap portion formed between substrates 1801 and 1808. A liquid crystal material, product No. RDN00775 available from Rodick Inc., may be employed. The mixture of biphenyl methacrylate 1804 and liquid crystal material 1805 is then gradually cooled and exposed to ultraviolet light at room temperature to harden the biphenyl methacrylate and to allow a liquid/solid separation of liquid crystal material 1805 from biphenyl methacrylate 1804. The result is a display that is almost completely transparent with field-OFF conditions and has a reflectance of 50%. For a field-ON condition comprising an AC electric field of 10 KHz and 7 volts, differences between the refractive indices of polymer 1104 and liquid crystal material 1105 cause light to scatter with a reflectance of 5%. A prototype display with 400 scan lines and 640 signal lines was fabricated, which had uniform properties over the entire screen, which properties would otherwise be difficult to realize. Utilizing a reflector on one of the substrates makes possible the use of MIM elements, which are needed in order to provide a display with a large viewing screen area. As the polymer component, any of those specified in connection with the fourteenth through the sixteenth embodiments may be employed.

Nineteenth Embodiment

FIG. 16 illustrates a PDLC display according to the nineteenth embodiment utilizing a TFT device. The basic display is the same as that of the sixteenth embodiment shown in FIGS. 14A and 14B, except for the employment of TFT active devices formed on substrate 1908. A method of fabricating the display comprises forming gate electrode 1917 on the surface of substrate 1908, gate insulating layer 1916 on electrode 1917. Semiconductor layer 1915, drain electrode 1914, source electrode 1913 and pixel electrode 1909, also serving as a reflection layer, are sequentially formed on substrate 1908 and gate electrode 1917. Alignment film 1906 is formed on substrate 1908 and the TFT active device. As to substrate 1901, electrode 1902, followed by alignment film 1903, are formed on this substrate, and a direction of alignment is incorporated into alignment film 1903. The alignment process employed is the same as that employed in the thirteenth embodiment. Substrates 1901 and 1908 are assembled in face-to-face relation. The edges of the assembly are molded so that the cell thickness is about 7 μm.

A mixture of a side-chain type liquid crystal polymer having a cyanobiphenyl group and a nematic liquid crystal material are heated to 120° C. and sealed within a gap portion formed between substrates. For example, product No. RDN00775, available from Rodick Inc., may be employed for the liquid crystal material. The mixture of the liquid crystal polymer and nematic liquid crystal material is then gradually cooled, locking in alignment so that one component of the mixture becomes a solid phase and the other component remains in its liquid phase at 70° C. The result is a display that is almost completely transparent with field-OFF conditions and has a reflectance of 50%. For a field-ON condition comprising an AC electric field of 10 KHz and 7 volts, differences between the refractive indices of polymer 1904 and liquid crystal material 1905 cause a light scattering effect. The reflectance in a light scattering effect is 5%. A prototype display with 400 scan lines and 640 signal lines was fabricated, which had uniform properties over the entire screen, which properties would otherwise be difficult to realize. Utilizing a reflector on one of the substrates makes possible the use of TFT elements, which are needed in order to provide a display with a large viewing screen area.

As for the polymer component, a liquid crystal polymer as specified in the sixteenth embodiment, as well as those polymers specified in the thirteenth through the fifteenth embodiments, may all be employed. Although in this embodiment as well as previous embodiments, only a PDLC reflection mode device as applied to MIM elements and TFT elements has been disclosed, such active devices may be applied in a transmissive mode device as long as the drive voltages for PDLC display can be reduced in magnitude. Alternatively, if the voltage breakdown rating of the MIM and TFT active devices is enhanced, these active devices may be directly employed in a transmissive mode device.

While in the thirteenth through the nineteenth embodiments, reference has been made to the use of two substrates, a composite layer may be utilized relative to the use of only one substrate. The cell thickness is not limited to the value mentioned above, as other gap sizes may operate better with other combinations described. The material that is employed for the alignment films is not limited to product No. LP-8T, as a variety of other materials, such as, DMOAP or stearic acid, which are able to perpendicularly align a liquid crystal material, may be employed as well. It is best to incorporate an alignment means relative to only one of the substrates. The liquid crystal material has a negative dielectric anisotropy. It is preferred that the liquid crystal material have the largest birefringence as possible. The optimum amount of liquid crystal material in the composite layer mixture is in the range between 50% and 97%. If the amount of liquid crystal material employed is less than this range, the display will not respond to an applied electric field. If the amount of liquid crystal material employed is greater than this range, the proper contrast cannot be obtained. If a dichroic dye, such as product No. S-314, available from Mitsui Touatsu Chemicals, Inc., is mixed with the liquid crystal material, the device will absorb and scatter incident light under field-ON conditions. The display will become transparent for field-OFF conditions. Preferably, the polymer has a birefringence and its normal refractive index is equal to the normal refractive index of the liquid crystal material.

The present invention can be successfully applied to computer displays, light projectors, light valves, light control mirrors and the like.

Twentieth Embodiment

FIGS. 18A and 18B illustrates a PDLC device according to a twentieth embodiment of this invention utilizing a photo-polymerizing precursor. A schematic diagram of an apparatus for this embodiment is illustrated in FIG. 17. A method of fabricating the PDLC display comprises forming electrodes 2002 and 2007 on respective substrates 2001 and 2008 by means of a vapor deposition method. Alignment films 2003 and 2006 are made from a 2% solution of polyimide, such as, JIB polyimide available from Japan Synthetic Rubber Co. The solution is spin-coated onto the surfaces of electrodes 2002 and 2007 at a spinning rate of 2000 RPM. Substrates 2001 and 2008 and respective alignment films 2003 and 2006 are then annealed at 150° C. The surfaces of alignment films 2003 and 2006 are then rubbed in a single uniform direction with a bleached cotton cloth. The rubbing directions are such that the respective directions are substantially parallel after assembly of substrates 2001 and 2008. The surfaces of alignment films 2001 and 2008 face one another after assembly with a cell thickness of 10 μm. A mixture of biphenyl methacrylate and a nematic liquid crystal material are mixed in a ratio of 1:10, heated to 100° C., and sealed within a gap portion formed between the substrates. The nematic liquid crystal material, such as, product No. LV-R2, available from Rodick Inc., may be employed, together with a chiral component, e.g., product No. S-1011, available from Merck Co., Ltd. The mixture of biphenyl methacrylate polymer 2004 and nematic liquid crystal material 2005 is then gradually cooled, locking in alignment. The resultant structure is then exposed at room temperature to ultraviolet source 2009, as shown in FIG. 17. As a result, the biphenyl methacrylate 2004 is hardened and phase separated from liquid crystal material 2005.

Source 2009 comprises two four watt ultraviolet fluorescent lights, e.g., NEC type GL-4 bactericide lamps, and the exposure of the mixture is carried out for 20 minutes at a distance of 1 cm. The ultraviolet fluorescent lamps have a peak light intensity at 254 nm. The UV dose is 5 mW/cm$^2$. A type T-4L ultraviolet lamp can also be used with a peak wavelength of 365 nm. The UV dosage should be equal to or less than 50 mW/cm$^2$, preferably, 10 mW/cm$^2$ or less. It is better to polymerize the mixture for a longer period of time employing weaker ultraviolet light. Lamps other than photopolymer fluorescent lamps may be employed as long as the above mentioned conditions are satisfied.

If the ultraviolet dosage is increased, the polymer grains will become smaller. For a more informative discussion about various dosages and mixtures in PDLC processing, see, U.S. Pat. No. 4,938,568, issued Jul. 3, 1990, to Margerum, et al. If the polymer grains become too small, they will begin to lose their capacity for desired light scattering capability. Also, as the polymer grain sizes become smaller, polymer grains will float in the liquid crystal material and not attach to one another. When polymer grains are able to float within the liquid crystal material, the display becomes unstable during the application of an applied electric field.

FIG. 19 is a diagram representing an electron micrography of a cross section of a display made according to this embodiment. It can be seen from this diagram that the grains of polymer lie along the direction of alignment. A PDLC display fabricated according to this embodiment will be substantially transparent under field-OFF conditions, and will have a transmittance of at least 80%. For a field-ON condition comprising an AC electric field of 10 KHz and 20 volts, differences between the refractive indices of the polymer and the liquid crystal material cause a light scattering effect, with a transmittance of 1%. As seen from FIG. 20, the threshold characteristic 2010 shows a sharp knee change in transmittance in response to an applied voltage. This permits scanning of 16 scan lines at a time in a time-multiplexed drive mode of operation.

A variety of polymers may be employed for a precursor if they contain a molecular structure similar to the molecular structure in this liquid crystal material, such as, a biphenyl molecular structure. The structure of the polymer is not limited to ethylene, as long as the material is capable of polymerizing under ultraviolet light. For example, an epoxy polymer precursor may be employed and can also be applied to the case where a perpendicular alignment process is employed relative to the substrates. In some circumstances, it may be preferable to have ultraviolet sources provided on both sides of the composite layer mixture undergoing polymerization treatment.

Twenty-First Embodiment

A twenty-first embodiment of this invention utilizes a thermal polymerizing precursor and has the same basic structure as the twentieth embodiment shown in FIGS. 18A and 18B. A method of fabricating a PDLC display comprises forming electrodes on respective substrates by means of a vapor deposition method. A 2% solution of polyimide, e.g., product No. SP-740 available from Toray Industries, Inc., is spin-coated onto the surfaces of transparent electrodes of a pair of substrates at a spinning rate of 2000 RPM to form alignment films. The substrates are then annealed at 250° C. The alignment film surfaces are then rubbed in a single uniform direction with a bleached cotton cloth. The rubbing directions are such that the respective directions are substantially parallel after assembly of the substrates. The alignment film surfaces face one other upon substrate assembly with a cell thickness of 10 μm. An epoxy resin and a nematic liquid crystal material are mixed in a ratio of 1:9 and heated to 100° C. They are then sealed within the gap portion formed between the substrates. An epoxy resin, e.g., product No. YDF-170, available from Toto Kasei Co., Ltd., may be employed with a curing agent, such as product No. 121 available from Shell Oil Co. The nematic liquid crystal material may be product No. LV-R2 available from Rodick Inc. A 1% of product No. S-1011, available from Merck Co., Ltd. is added to the mixture. The mixture is then gradually cooled, locking in alignment of the polymer. The resultant structure is then left for two hours at 50° C. employing a controlled temperature as seen from the use of the lamps in FIG. 17. The epoxy resin hardens and a liquid/solid separation of liquid crystal material from polymer also occurs. The shapes of the grains of polymer produced in the above manner are similar to those illustrated in FIG. 19. Since thermosetting conditions differ among different polymer precursors, it is desirable to individually adjust the temperatures and hardening times for each polymer precursor. The hardening temperature should be adjusted to provide a structure illustrated in FIG. 19.

A variety of polymers may be employed as a precursor if they contain a molecular structure similar to the molecular structure of the liquid crystal material employed, such as, a biphenyl molecular structure. The structure of the active portion of the polymer is not limited to an ethylene molecular structure as long as it is able to polymerize under ultraviolet light. The controlled temperature conditions can be applied to both sides of the PDLC panel structure containing the composite layer.

Twenty-Second Embodiment

A twenty-second embodiment of this invention utilizes a thermosetting polymer and, otherwise, has the same basic structure as the twentieth embodiment shown in FIGS. 18A and 18B. A method of fabricating a PDLC display comprises forming electrodes on two substrates by means of a vapor deposition method. A 2% solution of polyimide of SP-740, available from Toray Industries, Inc., is spin-coated onto the surfaces of transparent electrodes of a pair of substrates at a spinning rate of 2000 RPM to form alignment films. The substrates are then annealed at 250° C. The alignment film surfaces are then rubbed in a single uniform direction with a bleached cotton cloth. The rubbing directions are such that the respective directions are substantially parallel after substrate assembly. The alignment film surfaces face each other after assembly with a cell thickness of 10 μm. A mixture of poly-a methylstyrene and a nematic liquid crystal material, 15 parts to 85 parts, respectively, are heated to a temperature of 120° C. and sealed within a gap portion provided between the substrates. The nematic liquid crystal material may be product No. LV-R2, available from Rodic Company, and a 1% of product No. S-1011, available from Merck Co., Ltd., is added to the mixture as a chiral component. The mixture of liquid crystal material and polymer are aligned while the polymer remains in a liquid phase and the mixture is then gradually cooled at the cooling rate of 50° C./min., at room temperature conditions, using a controlled temperature according to FIG. 17, phase separating the liquid crystal material from the polymer. The shapes of the grains of polymer produced in the above manner are similar to those illustrated in FIG. 19. The result is a display that is almost completely transparent having a transmittance as high as 20%. The controlled temperature approach may be employed relative to both sides of the PDLC panel structure containing the composite layer.

For a field-ON condition comprising an AC electric field of 10 KHz and 10 volts, differences between the refractive indices of the polymer and the liquid crystal material cause a light scattering effect, with a transmittance of 1%.

The thermosetting polymer is not limited to the above mentioned type, as any type which is capable of being dissolved into the liquid crystal material, that has a liquid crystal phase when dissolved into the liquid crystal material and is phase separable from the liquid crystal material at operational temperature levels, may also be employed. A liquid crystal polymer also having these properties may be employed.

The cooling rate for phase separating pre-aligned polymer and optimizing the polymer grain size to achieve the best light scattering effect depends on the particular types of polymers employed. For example, it is preferred to individually optimize the cooling rate in order to achieve the results shown in FIG. 19.

The materials that can be used for the alignment films is not limited to the particular example mentioned above, as a variety of other materials which are able to physically align with the liquid crystal material may be employed. It is best to apply an alignment film relative to only one of the substrates. When the surfaces of both substrates are provided with alignment, the directions of alignment of the respective surfaces require optimization.

Liquid crystal material having a refractive index anisotropy, Δn, as high as possible is preferable to in order improve the contrast. The liquid crystal material should be of a type having a positive dielectric anisotropy. The optimum amount of liquid crystal material in the composite layer mixture is in the range between 50% and 97%. If the amount of liquid crystal material employed is less than this range, the display will not respond to an applied electric field. If the amount of liquid crystal material employed is greater than this range, the proper contrast cannot be obtained. The chiral component mixed into the liquid crystal material is not limited to the above mentioned example, as other types may be employed. Preferably, the ratio of the chiral component to liquid crystal material is in the range of 0.1% to 5.0%.

While two substrates are utilized in this embodiment, the composite PDLC layer need only be associated for alignment with one of the substrates. Also, it is not required that alignment films be on both substrates. Fixing alignment relative to only one of the substrates is effective. The cell thickness is not limited to the value mentioned above and can be adjusted to enhance various characteristics of the display.

Although the ultraviolet source and the controlled temperature application are utilized relative to one side of the display, as shown in FIG. 17, such application can be applied from both sides of the display.

This invention is applicable to computer displays, light projectors, light valves, light control mirrors, and the like. Also, it is easy to combine a display with a two-terminal or three-terminal active semiconductor device permitting application to very large area displays.

Twenty-Third Embodiment

FIG. 21 shows a PDLC display according to a twenty-third embodiment of this invention utilizing either a liquid crystal material having a positive dielectric anisotropy or a liquid crystal material having a negative dielectric anisotropy. A method of fabricating the PDLC display comprises the following steps. First, electrodes 2302 and 2307 on formed on respective substrates 2301 and 2308 by means of a vapor deposition method. A 0.5% alcohol solution of product No. LP-8T, available from Shin-Etsu Silicon Co., Ltd., is spin-coated onto the surface of substrate 2301 at a spinning rate of 2000 RPM to provide an alignment film 2303. Alignment film 2303 is then annealed at 120° C. A conventional process is employed to establish a perpendicular direction of alignment on the surfaces of film 2303. A variety of processes may be employed as long as the one chosen aligns the liquid crystal material substantially perpendicular relative to the surface of substrate 2301. Then, a 2% solution of polyimide, such as, JIB polyimide available from Japan Synthetic Rubber Co., with a dimethyl acetoamide as a solvent, is spin-coated onto the surface of substrate 2308 at a spinning rate of 2000 RPM resulting in alignment film 2306, which is annealed at 150° C. The surface of alignment film 2306 is rubbed in a single uniform direction with a bleached cotton cloth to provide parallel alignment properties. The means for parallel directional alignment is not limited to rubbing, as other methods, such as, the oblique evaporation method and the LB film method, may also be employed. Substrates 2301 and 2308 are then assembled in face-to-face relation with a cell thickness of 10 μm. An ultraviolet-hardenable polymer precursor and a liquid crystal material are mixed in a ratio of 1:9, heated to 100° C., and sealed within a gap portion formed between the substrates. Biphenyl methacrylate may be employed as the ultraviolet-hardenable polymer precursor. For the liquid crystal material, product No. LV-R2, available from Rodick Inc., may be employed, and 1% of product No. S-1011, available from Merck Co., Ltd., is added to the mixture as a chiral component.

The mixture of the ultraviolet-hardenable polymer precursor and liquid crystal material is then gradually cooled and exposed to ultraviolet light to polymerize the polymer precursor. This process causes a phase separation of liquid crystal material 2305 from polymer 2304. The grains of polymer 2304 and molecules of liquid crystal material 2305 close to the surface of substrate 2301 align perpendicular to substrate 2301 because of the preparation of film 2303 for perpendicular alignment. The grains of polymer 2304 and molecules of liquid crystal material 2305 close to the surface of substrate 2308 will align parallel to substrate 2308 because of the preparation of film 2306 for parallel alignment. In regions between these surfaces, the molecules form a twist like ribbon. With field-ON conditions and utilizing a liquid crystal material having positive dielectric anisotropy, the portion of liquid crystal material 2305 close to substrate 2308 will more effectively respond to an applied electric field. On the other hand, if the liquid crystal material has negative dielectric anisotropy, the portion of liquid crystal material 2305 close to substrate 2301 will more effectively respond to an applied electric field.

The electro-optic characteristics 2211 of the display for this embodiment were measured and are shown in FIG. 22 showing the relationships between the applied voltage and the transmittance for a field-ON condition comprising an AC electric field of 10 KHz applied between electrodes 2302 and 2307 with changing applied voltage. The electro-optic characteristics 212 of a typical prior art display are shown in FIG. 23. As is apparent from the comparison between these figures, the slope steepness of curve 2211 in FIG. 22 is considerably improved over that of curve 2212 in FIG. 23. The contrast was also measured in an experiment for various drive signals at different duty cycles, such as are typical in conventional multiplexed LC display panels. The observed contrast ratios were 13:1 @ 25%, 5:1 @ 12.5%, and 3:1 @ 6.25%. The prior art typically requires duty cycles exceeding 33% so that the contrast has been significantly improved in the present invention and the use of multiplexing is more of an option in designing drive systems for such displays.

As indicated, a liquid crystal material having a positive or a negative dielectric anisotropy may be employed. Preferably, the liquid crystal material employed has a refractive index anisotropy, $\Delta n$, as high as possible to achieve the best contrast. The optimum amount of liquid crystal material in the composite layer mixture is in the range between 50% and 97%. If the amount of liquid crystal material employed is less than this range, the display will not respond to an applied electric field. If the amount of liquid crystal material employed is greater than this range, the proper contrast cannot be obtained. Other chiral components may be employed, and the pitch of the liquid crystal material is also important. The pitch of the liquid crystal material mixed with a chiral component which can be expressed as $P = 1/34C$, where P is the pitch in micrometers and C is the weight ratio. The concentration is in the range of about 0.1% to 5%, which provides a pitch of about 29 $\mu$m to about 0.59 $\mu$m. If other chiral components are employed, the pitch should be within this range. As for the polymer component, a polymer precursor which is capable of alignment when mixed with the liquid crystal material and that can be photopolymerized in that aligned state, may be employed. A polymer precursor having a molecular structure similar to the molecular structure of the liquid crystal will provide a display that has excellent contrast and transmittance.

Twenty-Fourth Embodiment

A twenty-fourth embodiment of this invention utilizes a liquid crystal polymer and has the same basic structure as found in the twenty-third embodiment, shown in FIG. 21. However, a mixture of a side-chain type liquid crystal polymer having a cyanobiphenyl group, expressed in Formula 19 below, and a nematic liquid crystal material, e.g., product No. RDP80616, available from Rodick Inc., and 1% of product No. S-1011, available from Merck Co., Ltd., added to the mixture as a chiral component, is heated to 120° C. and sealed within a gap portion formed between the substrates. The mixture is then cooled to 70° C. bring about phase separation of the liquid crystal polymer from the liquid crystal material.

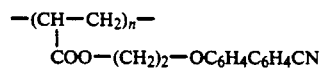

Formula 19:

(The isotropic phase transition point is 112° C. the nematic phase transition point is 62° C. and $C_6H_4$ indicates a benzene ring.)

The electro-optic characteristics of the display resulting from this embodiment were measured and the results were compare with those of the twenty-third embodiment.

The type of polymer that may be employed is not limited to side-chain or main-chain types of polymers, as any type may be employed which can be dissolved into the liquid crystal material at a temperature higher than the operational temperature of the display. The liquid crystal polymer should also be able to be aligned in a liquid phase and phase separate out from the liquid crystal material upon cooling to a lower temperature. For example, liquid crystal polymers having Formulas 20 to 27 may be employed. These types of polymer are examples, as the resulting structure requires optimization when mixing with a selected liquid crystal material. When the solubility between the liquid crystal material and the liquid crystal polymer is poor, a cosolvent can be added to enhance solubility. The liquid crystal polymer should be of a type capable of changing into a liquid phase when mixed with the cosolvent. The cosolvent is then removed after the materials have been proper aligned, and the polymer is caused to become a solid phase and the liquid crystal material remains in its liquid phase.

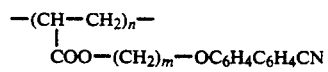

Formula 20:

(m is a positive integer, and $C_6H_4$ indicates a benzene ring.)

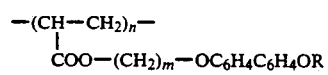

Formula 21:

(m is a positive integer, R is an alkyl group, and $C_6H_4$ indicates a benzene ring.)

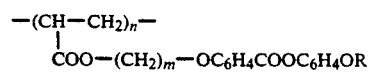

Formula 22:

(m is a positive integer, R is an alkyl group, and $C_6H_4$ indicates a benzene ring.)

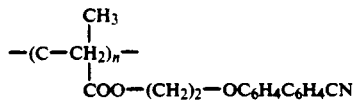

Formula 23

(The isotropic phase transition point is 112° C., the nematic phase transition point is 50° C., and $C_6H_4$ indicates a benzene ring.)

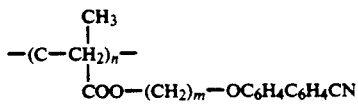

Formula 24

(m is a positive integer, and $C_6H_4$ indicates a benzene ring.)

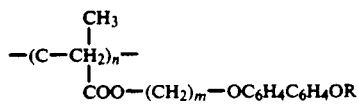

Formula 25

(m is a positive integer, R is an alkyl group, and $C_6H_4$ indicates a benzene ring.)

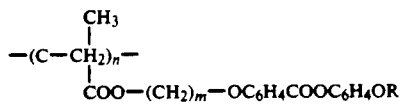

Formula 26

(m is a positive integer, R is an alkyl group, and $C_6H_4$ indicates a benzene ring.)

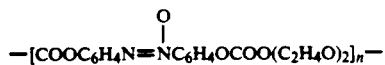

Formula 27

($C_6H_4$ indicates a benzene ring.)

As previously indicated, the liquid crystal material may have either a positive or a negative dielectric anisotropy. The cell thickness is not limited to the above mentioned dimension, as it can be experimentally optimized. The present invention may be employed with a transmissive type mode device as well as reflective type display. It is possible to provide a PDLC display with two-terminal or three-terminal active semiconductor devices to provide very large area displays. Although a side-chain type liquid crystal polymer having a cyanobiphenyl group is employed, this invention is not limited to this particular type of polymer, as a thermoplastic polymer or a thermosetting polymer may also be employed.

The above embodiment of the present invention can be successfully applied to computer displays, light projectors, light valves, light control mirrors, and the like.

Twenty-Fifth Embodiment

FIGS. 24A and 24B shows a PDLC display according to a twenty-fifth embodiment of this invention wherein a dichroic dye is added to a liquid crystal material. One of the formed electrodes serves as a reflector layer. A method of fabricating a PDLC display comprises forming electrodes 2502 and 2507 on respective substrates 2501 and 2508 by means of a vapor deposition method. Electrode 2507 serves a secondary role as a reflector and is preferably made of aluminum. Electrode 2502 is made of a transparent conductor, e.g., indium-tin oxide. A 2% solution of polyimide, such as, JIB polyimide, available from Japan Synthetic Rubber Co., with dimethyl acetoamide as a solvent, is spin-coated onto the surfaces of electrodes 2502 and 2507 at a spinning rate of 2000 RPM providing alignment films 2503 and 2506, which are annealed at 150° C., and are rubbed in a single uniform direction with a bleached cotton cloth to provide parallel alignment directions.

The means for parallel directional alignment is not limited to the rubbing method, as other widely used methods may be employed, such as, the oblique evaporation method and the LB film method. Rubbing the substrates without the use of alignment films is also effective. Substrates 2501 and 2508 are assembled in face-to-face relation with a cell thickness of 5 μm. A mixture of an ultraviolet-hardenable polymer precursor and a liquid crystal material is mixed in a ratio of 15:85, heated to 100° C., and sealed within a gap portion formed between the substrates. Biphenyl methacrylate may be employed as the ultraviolet-hardenable polymer precursor. A liquid crystal material, for example, product No. LV-R2 having a positive dielectric anisotropy, produced by Rodick Inc., may be employed. A chiral component, product No. S-1011 available from Merck Co., Ltd. and a dichroic dye, product No. S-344, available from Mitsui Touatsu Chemical Co., Ltd., are added to the liquid crystal material. The mixture ratio of liquid crystal to chiral component to dye is 97:1:2. The mixture of ultraviolet-hardenable polymer precursor 2504 and liquid crystal material 2505 is then gradually cooled and exposed to ultraviolet to polymerize the polymer precursor. A liquid/solid separation occurs between liquid crystal material 2505 and polymer 2504.

Polymer 2504 and liquid crystal material 2505 have similar refractive index anisotropies. The refractive index is approximately 1.5 for incident light parallel to the direction of alignment and about 1.7 for incident light parallel to the direction of alignment.

As shown in FIG. 24A, liquid crystal material 2505 aligns with polymer 2504 in the same direction in the absence of an applied electric field. The refractive indices of liquid crystal material 2505 and polymer 2504 will match each other when the direction of incident light is perpendicular to the planes of substrates 2501 and 2508. Dichroic dye is added to liquid crystal material 2504 for alignment in the same direction as liquid crystal material 2505 so that incident light from a direction orthogonal to the direction of alignment of liquid crystal material 2505, or perpendicular to the planes of substrates 2501 and 2508, can be most effectively absorbed.

As shown in FIG. 24B, when a drive signal is applied to electrodes 2502 and 2507, a field is developed across the composite layer and only liquid crystal material 2505 and the dichroic dye align in the direction of a field, i.e., perpendicular to the planes of substrates 2501 and 2508. Polymer 2504 does not change its direction of alignment. With a field perpendicular to the planes of substrates 2501 and 2508, the refractive index of liquid crystal material becomes about 1.5, while that of polymer 2504 remains approximately 1.7. Differences between the refractive indices of polymer 2504 and liquid crystal material 2505 in the direction of the applied field is about 0.2. This difference causes incident light in a direction perpendicular to the planes of substrates 2501 and 2508 to scatter. As the dichroic dye is aligned in the same direction as liquid crystal material 2505, i.e., the direction of the applied field, absorption of the dye in the direction of the applied field will not occur rendering the display translucent, milky white.

If no chiral component is mixed with nematic liquid crystal material 2505, the light incident to the display and perpendicular to the planes of substrates 2501 and 2508 is polarized parallel to these planes, as is the case for liquid crystal material 2505, i.e., parallel to the surface of the sheet of FIGS. 24A and 24B. This prevents the achievement of the best contrast. When a chiral component is mixed with nematic liquid crystal material 2505, incident light perpendicular to the planes of substrates 2501 and 2508, is not polarized parallel to this plane so that the liquid crystal material can be efficiently modulated, providing for improved contrast.

The electro-optical characteristics of the above display were measured and are shown in FIG. 25. With an AC electric field of 1 KHz applied between electrodes 2502 and 2507, the relationship is shown between the voltage and the reflectance as the voltage was varied. Compared to prior art reflection type PDLC displays, the drive voltage was reduced in this embodiment by 90% and the viewability is improved. If electrodes 2502 and 2507 are shaped like written characters, the display can cause a white character to appear to raised from the surface. The steep threshold slope is excellent, and time-multiplexed driving is possible with a 25% duty cycle.

The type of liquid crystal material is not limited to that specified in this embodiment. The optimum amount of liquid crystal material in the composite layer mixture is in the range between 50% and 97%. If the amount of liquid crystal material is less than this amount, the display will not respond to an applied electric field. If the amount of liquid crystal material is more than this amount, the proper contrast cannot be achieved. The dichroic dye content should be in the range between 1% to 10%, preferably between 2% to 5%. The proper content is optimized relative the dye selected and its intended usage. Preferably, the amount of chiral component in the liquid crystal material should be in the range of 0.1% to 5%. This varies depending on the particular chiral component employed. Satisfactory results can be obtained when the cholesteric pitch is in the range of about 30 $\mu$m to about 0.60 $\mu$m. A chiral component which comprises multiple chiral components is also acceptable.

For a polymer precursor, an biphenol ester or other such type may be employed as well if it is easily mixed with the liquid crystal material, has a liquid phase in the initial mixed mode, and can be photo-polymerized. Polymer precursors having a molecular structure similar to the liquid crystal material molecules will provide a display with excellent contrast and transmittance. Aluminum as well as other materials which reflect light may be employed as electrode 2507 when a reflector layer is to be employed.

Twenty-Sixth Embodiment

A twenty-sixth embodiment of this invention has the same fundamental structure as in the case of the twenty-fifth embodiment shown in FIGS. 24A and 24B and employs a transparent electrode 2507. However, a reflection layer is formed on the back or bottom surface of substrate 2508. Viewed directly from the top, this embodiment looks like the view from the top of the twenty-fifth embodiment. However, when viewed at an angle, a parallax is caused due the thickness of substrate 2508 between the cell and the reflector creating a double image.

This embodiment, when assembled with the use of active elements, such as, MIM elements or TFT active devices, can be applied to a large viewing area, such as used in a computer display, light projector, light valve, light control mirror, and the like.

Twenty-Seventh Embodiment

FIG. 26 shows a PDLC display according to a twenty-seventh embodiment of this invention utilizing a biphenylmethyl methacrylate and a biphenyl methacrylate as the polymer component. A method of fabricating the PDLC display comprises forming electrodes 2702 and 2707 on respective substrates 2701 and 2708 by means of a vapor deposition method. A 2% solution of polyimide, such as, JIB polyimide, available from Japan Synthetic Rubber Co., together with dimethyl acetoamide as a solvent, is spin-coated onto the surfaces of electrodes 2702 and 2707 at a spinning rate of 2000 RPM, providing alignment films 2703 and 2706, which are then annealed at 150° C. The surfaces of alignment films 2705 and 2706 are rubbed in a single uniform direction with a bleached cotton cloth to provide for parallel directional alignment. The means for parallel directional alignment is not limited to rubbing, as other methods may be employed, including the oblique evaporation method and the LB film method. Substrates 2701 and 2708 with alignment films 2703 and 2706 are placed in face-to-face relation with a cell thickness of 10 $\mu$m. Equal amounts of biphenylmethyl methacrylate and biphenyl methacrylate, as an ultraviolet-hardenable polymer precursor, are mixed together with a liquid crystal material in a ratio of 1:9, and sealed within a gap portion provided between the substrates. The liquid crystal material may be, for example, product No. LV-R2, available from Rodick Inc., plus a 1% of product No. S-1011, available from Merck Co., Ltd., as a chiral component. The mixture of polymer precursor and liquid crystal material is then gradually cooled, exposed to ultraviolet light to polymerize the polymer precursor, and allow liquid/solid separation of liquid crystal material 2705 from polymer 2704.

The electro-optical characteristics 2710 of the resulting display for this embodiment were measured and FIG. 27 shows the measured relationships between the applied voltage and the transmittance for a field-ON condition comprising an AC electric field of 10 KHz applied between electrodes 2702 and 2707 under varied voltage conditions. FIG. 28 shows the electro-optical characteristics 2711 for a typical prior art PDLC display. As illustrated in both FIGS. 27 and 28, the slope of curve 2710 is considerably steeper compared to curve 2711. The contrast achieved with the application of a time-multiplexed drive waveform was evaluated and the contrast was 33:1 for a 25% duty cycle, 27:1 for a 12.5% duty cycle, and 4:1 for a 6.25% duty cycle. The prior art case is typically limited to a 33% duty cycle.

The optimum amount of liquid crystal material in the composite layer mixture is in the range between 50% and 97%. If the amount of liquid crystal material is less than this amount, the display will not respond to an applied electric field. If the amount of liquid crystal material is greater than this amount, the proper contrast cannot be achieved. The pitch of the liquid crystal material is important. The pitch of the liquid crystal material mixed with a chiral component can be expressed as $P = 1/34C$, where P is the pitch in micrometers and C is the weight ratio. The concentration is in the range of about 0.1% to 5%, which corresponds to a pitch in the range of about 0.29 μm to about 0.59 μm. If other chiral components are employed, the pitch should fall within this range. If another type of chiral component is employed, this pitch range will not present a problem.

The higher the amount of added biphenylmethyl ester to the mixture, the steeper will be the slope of the threshold characteristic curve 2710. If the slope is too great, however, the display will not provide an optical response to an applied electric field. So, the limit on the amount of biphenylmethyl ester in the mixture depends largely on the type of chosen liquid crystal material. When the liquid crystal material is product No. LV-R2 or product No. RDP80616, either available from Rodick Inc., the content of biphenylmethyl ester in the polymer should be 80% or less.

Any polymer precursor which can be aligned in when mixed with a liquid crystal material and can be photo-polymerized, may be employed. One such polymer precursor is a derivative of biphenyl methacrylate. Polymer precursors having a molecular structure similar to the molecular structure of the liquid crystal material provide a display with excellent threshold characteristics as well as excellent contrast and transmittance.

Twenty-Eighth Embodiment

A twenty-eighth embodiment of this invention utilizes naphthyl methacrylate for a polymer and has the basic structure of the twenty-seventh embodiment shown in FIG. 26. The initial assembly of a display is the same as that in the twenty-seventh embodiment up to and including the alignment process. A method of fabricating an the display comprises forming electrodes 2702 and 2707 on respective substrates 2701 and 2708 by means of a vapor deposition method. A 2% solution of polyimide, such as JIB polyimide, available from the Japan Synthetic Rubber Co., with dimethyl acetoamide as a solvent, is spin-coated onto the surfaces of electrodes 2702 and 2707 at a spinning rate of 2000 RPM producing alignment films 2703 and 2706. Alignment films 2703 and 2706 are then annealed at 150° C. The surfaces of alignment films 2705 and 2706 are rubbed in a single uniform direction with a bleached cotton cloth to produce parallel directional alignment. The means for parallel direction alignment is not limited to just to rubbing, as other widely used methods may be employed, such as, the oblique evaporation method and the LB film method, which also effectively align the liquid crystal material. Substrates 2701 and 2708 with alignment films 2703 and 2706 are then placed face-to-face relation with a cell thickness of 10 μm. A mixture of biphenyl acrylate and naphthyl methacrylate as ultraviolet-hardenable polymer precursors in a ratio of 1:1 and a liquid crystal material are mixed in a ratio of 1:9 heated to 100° C. and sealed in a gap portion provide between the substrates. A liquid crystal material, for example, product No. LV-R2, available from Rodick Inc., and 1% of product No. S-1011, available from Merck Co., Ltd. as a chiral component, are mixed together. The mixture of the polymer precursor and the liquid crystal material is then gradually cooled, exposed to ultraviolet light to polymerize polymer precursor, and to allow liquid/solid separation of liquid crystal material 2705 from polymer 2704.

The electro-optical characteristics of the resulting display were measured and the results were almost the same as those of the twenty-seventh embodiment. With regard to the time-multiplexed driving characteristic, the contrast was 20:1 for a 25% duty cycle, 15:1 for a 12.5% duty cycle, and 4:1 for a 6.25% duty cycle.

The optimum amount of liquid crystal material in the composite layer mixture is in the range between 50% and 97%. With a less amount of liquid crystal material in the mixture, the display will not respond to an applied electric field. With a greater amount of liquid crystal material in the mixture, proper contrast cannot be achieved. The pitch of the liquid crystal material is important. The pitch of the liquid crystal material mixed with a chiral component can be expressed as $P=1/34C$, where P is the pitch in micrometers and C is the weight ratio. The concentration is in the range of about 0.1% to 5%, which corresponds to a pitch of about 29 μm to about 0.59 μm. If other chiral components are employed, the pitch should fall within this range. There is no problem if multiple chiral components are employed. The larger the amount of ester naphtol polymer employed, the steeper will be the slope of the threshold characteristic curve. If the steep slope is too high, however, the display will not optical respond to an applied electric field. Therefore, the allowable amount of naphthyl ester in the mixture depends largely on the type of chosen liquid crystal material. When product No. LV-R2 or product No. RDP80616, either available from Rodick Inc., are employed as a liquid crystal material, the content of naphthyl ester in the polymer should be 80% or less. As to the choice of the polymer component, a polymer precursor which is capable of alignment when mixed with a liquid crystal material and can be photo-polymerized may be employed. One such polymer precursor may be a vinyl ester derivative of naphtol. Polymer precursor having a molecular structure similar to the molecular structure of the liquid crystal material can provide a display with excellent threshold characteristic as well as excellent contrast and transmittance.

This invention applicable to a large viewing area, such as, a computer display, a light projector, a light valve, a light control mirror or the like.

Twenty-Ninth Embodiment

FIG. 29 shows a PDLC display of the twenty-ninth embodiment. A method of fabricating a PDLC display comprises forming electrodes 2902 and 2907 are formed on substrates 2901 and 2908 by means of a vapor deposition method. These substrates 2901 and 2908 are soaked for 30 minutes in a 2% solution of product No. LP-8T produced by Shin-Etsu Co., Ltd., cleaned with water, and dried at 130° C., providing alignment films 2903 and 2906. Substrates 2901 and 2908 with alignment films 2903 and 2906 are placed in face-to-face relation with a cell thickness of 10 μm. A mixture of a biphenyl methacrylate 2904 and a liquid crystal material 2905, mixed in a ratio of 1:10, heated to 100° C., is sealed within a gap portion formed between the substrates. A liquid crystal material, such as product No. RDN00775, available from Rodick Inc., may be employed. A dichroic dye, Product No. S-344, produced by Mitsui Touatsu Chemical Co., Ltd., was mixed with liquid crystal material in a ratio of liquid crystal/dye of 98:2. The mixture of polymer precursor and liquid crystal material is gradually cooled, is exposed to ultraviolet light at room temperature wherein one component becomes a solid phase and the other component remains in a liquid phase, and liquid crystal material 2905 is phase separated from biphenyl methacrylate 2904.

The resulting display was almost completely transparent under field-OFF conditions, as shown in FIG. 30, and had a transmittance as high as 68%. For a field-ON condition comprising an AC electric field of 10 KHz and 20 volts, the transmittance was reduced to 10%.

Polymer 2904 aligns perpendicular to the planes of substrates 2901 and 2908, and exhibits a negative dielectric anisotropy similar to that of liquid crystal material 2905, both having a refractive index of about 1.5 in the absence of an applied field, as shown in FIG. 29A. There will not be much difference between the refractive indices of liquid crystal material 2905 and polymer 2904. The dichroic dye is also aligned in the same direction as liquid crystal material 2905 without color, providing a transparent mode.

When a drive signal is applied to electrodes 2902 and 2907, a field is developed across the liquid crystal/polymer composite layer, as shown in FIG. 29B. As a result, only liquid crystal material 2905 aligns horizontal to substrates 2901 and 2908, while the direction of alignment of polymer 2904 remains unchanged. Therefore, the refractive index of polymer 2904 remains approximately 1.5 while that of liquid crystal material 2905 becomes about 1.7. Differences between the refractive indices of polymer 2904 and liquid crystal material 2905 in the direction of the applied field, therefore, becomes about 0.2. As a result, the dichroic dye aligns in the same direction as liquid crystal material 2905 and the light is scattered and absorbed by the dye.

The polymer will exhibit a liquid phase when mixed with liquid crystal material when a benzene molecular structure or, preferably, a biphenyl molecular structure, is introduced into polymer. Further, the polymer should be capable of being polymerized in a liquid phase when exposed to ultraviolet radiation. A polymer even without a benzene molecular structure may be employed if it is capable of alignment with a liquid crystal material. The material that can be used for the alignment films is not limited to product No. LP-8T (Shin-Etsu Silicon Co., Ltd.), but a variety of other materials, such as, DMOP or stearic acid, which can be align perpendicularly with a liquid crystal material, may also be employed. It is best to apply alignment relative to only one of the substrates. Liquid crystal material has negative dielectric anisotropy. It is preferred that the liquid crystal material have a birefringence factor as large as possible. The optimum amount of liquid crystal material in the composite layer mixture is in the range between 50% and 97%. If the amount of liquid crystal material employed is less than this range, the display will not respond to an applied electric field. If the amount of liquid crystal material employed is greater than this range, the proper contrast cannot be obtained. The dichroic dye is not limited to the one mentioned above; however, the higher the dichroicity of the dye, the higher the attained contrast.

Thirtieth Embodiment

A thirtieth embodiment of this invention is a PDLC display which is a modification of the twenty-ninth embodiment. As shown in FIG. 29, metal material, such as, aluminum, is employed instead of a transparent conductive material for electrode 2907 formed on substrate 2908. The same cell thickness as employed in the twenty-ninth embodiment, the transmittance (reflectance) can be reduced by one half, doubling the contrast. The same contrast is obtainable with half the cell thickness of the twenty-ninth embodiment so that the drive voltage can also be reduced by 50%. For example, with a 5 μm thick cell, the required drive voltage is reduced to 5 volts. Thus, electrode 2907 doubles as a reflector. Part of the light will be reflected from the front surface like a mirror due to light reflection from the back reflector, making it very difficult to view the display. It is, therefore, preferred to put a scattering plate with low scattering effect on the front surface of the display. Alternatively, electrode 2907 may be employed as an ordinary transparent electrode and a reflection layer with a scattering plate are positioned on the back surface of the display.

While two substrates are employed, the composite layer can be employed in conjunction with only one substrate. The cell thickness is not limited to values mentioned above, as it can be experimentally determined.

Thirty-First Embodiment

FIGS. 31 and 34 show a PDLC display according to a thirty-first embodiment of this invention utilizing a phase-shift plate 3108 and a reflector layer 3109. A method of fabricating the display comprises depositing transparent electrodes 3102 and 3107, respectively, on the surfaces of flat glass substrates 3101 and 3110 by means of a vapor deposition method. A polyimide of 2% dimethyl acetoamide solution of JIB polyimide, available from Japan Synthetic Rubber Co., is spin-coated onto the surfaces of transparent electrodes 3102 and 3107 for 30 seconds at a spinning rate of 3000 RPM, producing alignment films 3103 and 3106. Alignment films 3103 and 3106 are then annealed at 130° C. and are subsequently rubbed to provide alignment direction. The direction of alignment of alignment films 3103 and 3106 are arranged to be parallel. Substrates 3101 and 3110 with alignment films 3103 and 3106 are placed in face-to-face relation with a cell thickness of 10 μm. A mixture of a biphenyl methacrylate and a liquid crystal material, respectively, 15 parts to 85 parts, are heated to 100° C. and sealed into a gap portion formed between plates 3101 and 3108. Liquid crystal material chosen is product No. ZLI-3926, produced by Merck Co., Ltd. The mixture of polymer precursor and liquid crystal material is gradually cooled, aligned, and exposed to ultraviolet light at room temperature to harden the polymer precursor, and to allow liquid/solid separation of liquid crystal material 3105 from polymer 3104. Also, separately, aluminum reflector layer 3109 is deposited on a surface of phase-shift plate 3108, as seen in FIG. 34A. Thereafter, substrate 3110 is fixed to quarter-wave plate 3108. Quarter-wave plate 3108 is arranged in such a way that the optical axis of plate 3108 forms a 45° angle relative to the direction of alignment of alignment films 3103 and 3106.

As illustrated in FIG. 34A, natural light 3111 entering the display is divided into two polarization components. One component is polarized light 3112 parallel to the direction of alignment of polymer 3104. The other component is polarized light 3113 perpendicular to the direction of alignment of polymer 3104. When no voltage is applied to the display, the refractive index of liquid crystal material 3105 equals the refractive index of polymer 3104 so that natural light 3111 incident to the composite layer is reflected at reflector layer 3109 and then passes again through phase-shift plate 3108 and the composite layer in the reverse direction. In other words, with no voltage applied to the display, light 3111 is simply reflected at reflector layer 3109. However, as shown in FIG. 34B, under field-ON conditions to the display, liquid crystal material 3105 responds to the applied electric field so that its molecules rotate in the direction of the applied field creating differences between the refractive indices of liquid crystal material 3105 and polymer 3104. As polarized light 3112 is extraordinary light to liquid crystal material 3105 and polymer 3104, it will scatter due to this difference in the refractive indices of liquid crystal material 3105 and polymer 3104. Polarized light 3113, which is normal the direction alignment of polymer 3104, will not scatter regardless of these differences in refractive index. This is because polarized light 3112 passes through phase-shift plate 3108 before and after its incident with reflector layer 3109 so that the polarization direction is rotated 90°, rendering it extraordinary light. Polarized light 3112 is then scattered when it enters the liquid crystal/polymer composite layer. In other words, the scattering efficiency relative to natural light 3111 is doubled as compared to prior art displays.

With an AC electric field of 10 volts applied between opposite electrodes 3102 and 3107 of the display according to this embodiment, the electro-optical characteristics were measured and the results are shown in FIG. 32. Likewise, the same measurement is conducted for a prior art reflection mode device display having no quarter-wave plate, yielding the electro-optical characteristics shown in FIG. 33. As is apparent from a comparison of these figures, the display of this embodiment has a much higher scattering efficiency compared to the prior art display.

The phase shift plate/reflector structure of this embodiment can be applied to any other embodiment of this invention wherein the liquid crystal material and the polymer are align parallel to the substrates.

Thirty-Second Embodiment

A thirty-second embodiment of this invention comprises a guest-host reflection mode display that is the same structure as the thirty-first embodiment except that a 2% dichroic dye, e.g., product No. S-344, available from Mitsui Touatsu Chemical, Inc., was added to the liquid crystal material. S-344 dichroic dye is black in color.

Reference is made to FIGS. 36A and 36B wherein the operation of the display is disclosed. Natural light 3211 entering the display is divided into two polarization components. One component is polarized light 3212 parallel to the direction of alignment of polymer 3204. The other component is polarized light 3213 perpendicular to the direction of alignment of the polymer.

As shown in FIG. 36A, when no voltage is applied to the display, the refractive index of liquid crystal material 3205 is equal to the refractive index of polymer 3204 so that, relative to natural light 3211 which is incident to liquid crystal polymer composite layer, polarized light 3212, traveling in the same direction as the alignment direction of the dye molecules, will be efficiently absorbed by the black dye with a resulting intensity of almost zero. Polarized light 3213, which is perpendicular to the direction of alignment of the dye molecules, will pass through the composite layer with little absorption. Polarized light 3213 after passing through the phase shift plate, will be reflected by the reflector layer and then pass again through the phase shift plate bringing about a 90° rotation of the direction of polarization of the light. When the polarized light thereafter enters composite layer, it is efficiently absorbed by the black dye having a resulting intensity of almost zero.

As shown in FIG. 34B, under field-ON conditions, the dye molecules are rotated in the direction of the applied field by the liquid crystal material molecules. Both polarized light 3212 and 3213 will be hardly absorbed. As a result, both polarized light 3212 and 3213 are dispersed due to the difference in refractive index between the liquid crystal material and the polymer when passing through liquid crystal/polymer composite layer. The scattering efficiency relative to natural light 3211 is almost doubled.

The electro-optical characteristics of the display were measured providing the results shown by the solid line in FIG. 35. Likewise, the same measurement was conducted relative to a prior art quest-host reflection mode display with no quarter-wave plate, providing the results shown by the dash line in FIG. 35. As is apparent from these results, the display of this embodiment has an enhanced contrast and improved threshold characteristic compared to the prior art display.

Thirty-Third Embodiment

FIG. 37 illustrates a form of the display shown in the thirtieth embodiment except only one of the substrates of that PDLC display of that embodiment was employed in this embodiment, which is substrate 3309. In this embodiment, substrate 3309 also serves as a phase-shift plate, such as, a quarter-wave plate. A reflector layer 3310 is formed on one surface of substrate 3309 by means of a vapor deposition method. A transparent electrode 3307 and alignment film 3306 are deposited on the other surface of substrate 3309.

The electro-optical characteristics of the PDLC display of this embodiment are similar to that shown in FIG. 32. Since the reflection-type display of this embodiment has a single substrate, one less than shown in FIG. 31, the resulting PDLC display is lighter in weight rendering various applications to become possible.

In this embodiment, it is preferred to use a liquid crystal material having a highest birefringent dielectric anisotropy, $\Delta n$, and to use a polymer precursor which easily mixes with the liquid crystal material, has a liquid phase, and has a refractive index similar to that of the liquid crystal material. The preferable ratio of liquid crystal material to polymer is in the ratio range between 97:3 and 50:50. If the amount of the liquid crystal material is higher than the upper limits of the ratio, the liquid crystal material will not respond to an applied electric field. If the amount of the liquid crystal material is lower than the lower limits of the ratio, the required drive voltage becomes too high.

Thirty-Fourth Embodiment

FIG. 38 is a PDLC display according to a thirty-fourth embodiment of this invention. A method of fabricating the PDLC display comprises forming electrodes layers 3402 and 3407 on the surfaces of respective substrates 3401 and 3408 by means of a vapor deposition method. Polyimide (a 2% solution of polyimide of dimethylacetamide, SP-740 produced by Toray Industries, Inc.) is spin-coated onto the surfaces of electrodes 3402 and 3407 and annealed at 250° C., producing alignment films 3403 and 3406. An alignment direction is provided to the surfaces of alignment films 3403 and 3406. The method of ingraining an alignment direction is rubbing alignment films 3403 and 3406 in a single uniform direction with a bleached cotton cloth. The rubbing directions are arranged so as to be parallel when substrates 3401 and 3408 are assembled. Substrates 3401 and 3408 are placed in face-to-face relation with a cell thickness of 10 μm. A mixture of biphenyl methacrylate and a liquid crystal material, product No. LV-R2, available from by Rodick Inc., are dissolved in one another at a temperature of 100° C. in a ratio of 15:85, and sealed within a gap portion provided between the substrates. The mixture of polymer precursor and liquid crystal material is then gradually cooled, aligned and exposed to ultraviolet light at room temperature to harden the polymer precursor, and to allow liquid/solid separation of liquid crystal material 3405 from polymer 3404. As shown in FIG. 38A, polymer 3404, aligns with liquid crystal material 3405, parallel with the surfaces of substrates 3401 and 3408 and exhibits a refractive index similar to that of liquid crystal material 3405, and has a refractive index of about 1.5 in the direction of an applied field. Under field-OFF conditions, there will be no difference between the refractive indices of liquid crystal material 3405 and polymer 3404 rendering the display transparent.

As shown in FIG. 38B, under field-ON conditions, with respect to polarized light vibrating parallel to the direction of alignment of polymer 3404, only liquid crystal material 3405 will align in the direction of the applied field. As a result, the refractive index of liquid crystal material 3405 becomes approximately 1.5 while that of polymer 3404 remains at about 1.7. Differences between the refractive indices of liquid crystal material 3405 and polymer 3404 is, therefore, about 0.2, producing a light scattering effect. With regard to the polarized light vibrating perpendicular to the direction of alignment of polymer 3404, even in the presence of the applied electric field, the refractive indices of both polymer 3404 and liquid crystal material 3405 are about 1.5, showing no difference so that this polarized light passes through composite layer without scattering. Thus, this polarized light vibrating perpendicular to the direction of alignment of polymer 3404, therefore, passes through a display so that the display can be utilized as a polarizing element.

For a field-ON condition comprising an AC electric field of 10 KHz and 20 volts, the polarized light vibrating in the direction of alignment of the polymer is scattered nearly 100% while most of the polarized light perpendicular to the direction of alignment of the polymer passes through the display. FIG. 39 shows the electro-optical characteristics of this polarizing element. It is apparent from FIG. 39, with a sufficiently applied electric field, polarized light vibrating in a single uniform direction is sufficiently scattered, reducing the amount of transmitted light to about one half.

A polymer with an added benzene molecular structure, or preferably a biphenyl molecular structure, will show a liquid phase when mixed with liquid crystal material. Further, the polymer should be capable of being in a liquid phase when exposed to ultraviolet radiation. A polymer even without benzene molecular structure can be used as well if it is capable of being aligned by the liquid crystal material. The material for the alignment film is not limited to polyimide. In fact, if necessary, the alignment film can be eliminated. Various alignment processes may be used as long as they are capable of aligning the liquid crystal material. Other liquid crystal materials can be employed with this embodiment, particularly one with a large refractive index which will improve contrast. The optimum amount of liquid crystal material in the composite layer mixture is in the range between 50% and 97%. With a less amount of liquid crystal material in the mixture, the display will not respond to an applied electric field. With a greater amount of liquid crystal material in the mixture, proper contrast cannot be achieved.

Thirty-Fifth Embodiment

FIGS. 40A and 40B illustrate a PDLC display according to the thirty-fifth embodiment of this invention comprising two adjacent polarizing elements each of the type shown in the thirty-forth embodiment, and each of these polarizing elements are assembled so that their polarizing directions are orthogonal to one another. Thus, the basic structure of this embodiment is the same as that of the thirty-fourth embodiment except for being two staked elements. In FIGS. 40A and 40B, the lead line directed circles indicate that the direction of alignment of the liquid crystal material or the polymer wherein, in one element, they are perpendicular to the plane of the drawing sheet containing these figures and, in the other element, they are parallel to the plane of the drawing sheet of these figures. This also true in the case of subsequent figures. As shown in FIG. 40A, in the absence of an applied electric field, polymer 3404 and liquid crystal material 3405 in each polarizing element have the same refractive index, so that incident light will not scatter and pass entirely through the display. As shown in FIG. 40B, with an electric field applied, the polarized light of incident light which is parallel to the direction of alignment of polymer 3404 of the first polarizing element is scattered by this polarizing element, while the polarized light perpendicular to that polarized light passes through the first polarizing element reaching the second polarizing element. As the polarizing direction of the light reaching the second polarizing element is parallel to the direction of alignment of polymer 3404 of the second polarizing element, this light is efficiently scattered. In other words, with an applied electric field, all incident light will be completely scattered.

FIG. 41 shows the electro-optical characteristics of the PDLC display of this embodiment wherein it can be seen that the transmittance in the absence of an applied electric field is 75% while the transmittance in the presence of an applied electric field is 1%.

This embodiment can also be assembled using active elements, such as, MIM elements or TFT active devices and applied to large viewing area applications, such as, computer displays, light projector, light valves, light control mirrors and the like.

Thirty-Sixth Embodiment

FIG. 42 illustrates a PDLC display according to a thirty-sixth embodiment of this invention. A polymer precursor is employed that is hardened by the application of ultraviolet light. A method of fabricating the PDLC display comprises forming transparent electrodes 3602 and 3607 on the flat surfaces of transparent substrates 3601 and 3608 by means of a vapor deposition method. A 2% solution of polyimide of JIB (Japan Synthetic Rubber Co.) is spin-coated on transparent electrodes 3602 and 3607 at a spinning rate of 2000 RPM producing alignment films 3603 and 3606. Substrates 3601 and 3608 and respective alignment films 3603 and 3606 are annealed at 150° C. An alignment direction is ingrained on the alignment film surfaces 3603 and 3606 by means of rubbing in a single uniform direction with a bleached cotton cloth. The rubbing directions are arranged so as to be substantially parallel when the two transparent substrates 3601 and 3608 are subsequently assembled. Substrates 3601 and 3608 are assembled in face-to-face relation with a 10 μm gap portion formed between the substrates. Two types of polymer precursors, biphenyl methacrylate and p-fluorobiphenyl and methacryalate, and a liquid crystal material, product No. RDP10248, available from Rodic Company, are dissolved together, respectively, in a ratio of 7:7:86 at a temperature of 100° C., and sealed as a liquid crystal material/polymer composite layer in a gap portion formed between the substrates. The mixture of the two polymer precursors and the liquid crystal material is then gradually cooled with alignment. The mixture is then exposed to ultraviolet light at room temperature to polymerize the polymer precursor, hardening the polymer, and to allow liquid/solid separation of liquid crystal material 3605 from polymer 3604.

The specific resistance of the display of this embodiment was measured and is shown by the solid line in FIG. 43 wherein the highest magnitude of specific resistance was $2.40 \times 10^{11} \Omega \cdot cm$. An LCR meter 4272A produced by Yokokawa-Hewlett-Packard, Ltd. was used for the measurement, and an AC electric field of 100 Hz and 2 volts was applied between transparent electrodes 3602 and 3607. The charge holding mode of the display was measured and is shown in FIG. 45 wherein the charge holding rate is 93%, as indicated by the solid line of FIG. 45. The charge holding rate is the rate of charge held after a predetermined period of time upon release of an applied electric field. In FIG. 44, an applied electric field of about 14 volts is applied at 100 millisecond intervals at an alternating rate of 60 μsec.

A display like that above was attempted where only biphenyl methacrylate was employed for the polymer precursor and was mixed with a liquid crystal material in a ratio of 15:85, the specific resistance measured was $4.06 \times 10^{10} \Omega \cdot cm$, as indicated by the dash line in FIG. 43, and a charge holding rate was 32%, as indicated by the dash line in FIG. 45. When only p-fluorobiphenyl methacrylate is employed for the polymer precursor, it could not be polymerized by the ultraviolet light, so that a display could not be successfully fabricated. As is apparent from these results, the use of combined polymer precursors significantly increases the specific resistance and, correspondingly, the charge holding rate of the display. The combination of a mixture of polymer precursors with the use of TFT active devices or MIM elements will provide a display with little flickering.

The polymer precursor is not limited to those described above, as many others can be employed which will substantially align in the same direction as the liquid crystal material, or, at least in a more or less similar direction of alignment with the liquid crystal material. Polyimide is not the only alignment film that can be employed, as a variety of other materials, such as, polyvinyl alcohol may be employed. The use of alignment films may not be necessary. In employing the rubbing method for alignment, the material for rubbing with is not limited to use of a beached cotton cloth. It is preferred to apply an alignment relative to only one of the substrates. The direction of applied alignment is arbitrary. Preferably, the liquid crystal material employed should have a refractive index anisotropy, Δn, as high as possible in order to achieve the best contrast. A liquid crystal material having positive dielectric anisotropy may be employed. The optimum amount of liquid crystal material in the composite layer mixture is in the range between 50% and 97%. With a less amount of liquid crystal material in the mixture, the display will not respond to an applied electric field. With a greater amount of liquid crystal material in the mixture, proper contrast cannot be achieved. In this embodiment, a chiral component was not added to the precursor/liquid crystal material mixture. When a chiral component in the range of 0.1% to 1% is added to the mixture, however, the threshold characteristic of the display is improved. The polymerized portion of the polymer precursors were of the type that harden upon application of ultraviolet light, but thermosetting type polymer precursors can be employed for polymerization if phase separation can be achieved between the polymerized portion and the crystal liquid material after these components have been previously dispersed and aligned.

Thirty-Seventh Embodiment

A thirty-seventh embodiment of this invention utilizes a biphenyl derivative including fluorine as one type of a polymer precursor. Two kinds of these derivatives are employed as the polymer precursor: 4-(2-fluoro)biphenyl methacrylate and biphenyl methacrylate. The ratio of these polymer precursors and the liquid crystal material, product No. RDP10248 available from Rodic Company, are respectively set at 7:7:86. All other conditions and structure of this embodiment are the same as the thirty-sixth embodiment.

The specific resistance of the display were measured and is indicated by the solid line in FIG. 46 wherein the specific resistance is $4.64 \times 10^{10} \Omega \cdot cm$. The charge holding rate was 95%, as indicated by the solid line in FIG. 47. When only biphenyl methacrylate was employed for the polymer precursor, the specific resistance and the charge holding rate were, respectively, as indicated by the dash lines in FIGS. 46 and 47. The display of this embodiment has a significantly improved specific resistance and charge holding rate. The combination of the display of this embodiment with TFT active devices or MIM elements would provide a display with little flickering. When utilizing only 4-(2-fluoro)biphenyl methacrylate as the polymer precursor, polymerization by ultraviolet light could not be achieved so that a display could not be fabricated.

Thirty-Eighth Embodiment

In this embodiment, naphthalene derivatives were employed for the polymer precursor. Two kinds of naphthalene derivatives for the polymer precursor were used which are 4-(4'-nonyloxy)biphenyl methacrylate and 4-4'-nonyloxy biphenlester methacrylate. The ratio of these polymer precursors with the liquid crystal material was set at 7:7:86. All other conditions and structure of this embodiment are the same as the thirty-sixth embodiment. Liquid crystal material was product No. RDP10248, available from Rodick Inc.

The measured specific resistance of the display was $1.07 \times 10^{12} \Omega \cdot cm$ and is shown by the solid line in FIG. 48. The charge holding rate is 97% is shown by the solid line in FIG. 49. The same measuring method as employed in the thirty-sixth embodiment was employed. Fabrication of a display employing only 4-(4'-nonyloxy)biphenyl methacrylate as the polymer precursor was accomplished, and the measured specific resistance was $2.07 \times 10^{11} \Omega \cdot cm$ and the charge holding rate was about 36%, which are, respectively, shown by the broken lines in FIGS. 48 and 49. Employing the other polymer precursor, 4-(2-fluoro)biphenyl methacrylate, by itself as the polymer precursor, the polymer precursor can be polymerized by the same method as described in previous embodiments.

The display has excellent specific resistance and charge holding rate qualities. The combination of a display with a TFT active device or an MIM element would provide a display with low level flickering.

Thirty-Ninth Embodiment

The polymer precursors employed in this embodiment did not contain either fluorine or naphthalene derivative. The two polymer precursors employed were 4-(4'-nonyloxy)biphenyl methacrylate and biphenyl methacrylate. All other conditions were the same as in the case of the thirty-sixth embodiment previously described above.

The measured specific resistance of the display was $39.90 \times 10^{11} \Omega \cdot cm$, as indicated by the solid line in FIG. 50. A charge holding rate of 89%, indicated by the solid line in FIG. 51, was about the same as that for the case of the thirty-sixth embodiment. FIGS. 50 and 51 show the specific resistance and the charge holding mode for purposes of comparison with the case wherein the two polymer precursors are employed independently. FIG. 50 shows the specific resistance wherein the broken line is the case for the 4-(4'-nonyloxy)biphenyl methacrylate alone and the dash line is the case for the biphenyl methacrylate alone. FIG. 51 shows a single dash line, indicating that there is no difference in charge holding rate between the case wherein the polymer precursors are employed in combination and the cases wherein the polymer precursors are independently employed.

Compared to the prior art, the display has the slightly improved specific resistance and the significantly increased charge holding rate. When a display is actually activated in combination with TFT active devices or the MIM elements, flickering occurred so that a clear display was not provided.

Although the above embodiment utilized two substrates, a composite layer can be formed on a single substrate. An alignment film need not be formed on surfaces of both substrates, as an alignment film provided on either substrate will be effective. The gap portion provided between the spaced substrates can be a value other than provided in this embodiment.

The present invention can be applied to a computer display, light projector, light valve, light control mirror or the like.

Fortieth Embodiment

FIG. 52 illustrates a PDLC display according to a fortieth embodiment of this invention. A reflection-type display was provided with a structure comprising a liquid crystal material and a polymer dispersed in each other and align in a single uniform direction between two substrates with respective electrodes. The direction of alignment of polymer is perpendicular to the surface of the substrate and the axis of incident light. FIG. 52 shows the PDLC display when a field-ON condition is present.

A method of fabricating the PDLC display of this embodiment comprises forming electrodes 4002 and 4007 respectively on the surfaces of substrates 4001 and 4008 by means of a vapor deposition method. Polyimide, comprising a 2% solution of polyimide of dimethylacetamide, SP-740 available from Toray Industries, Inc., is spin-coated onto the surfaces of electrodes 4002 and 4007 and annealed at 250° C., providing alignment films 4003 and 4006. The method of ingraining an alignment direction was by rubbing alignment films 4003 and 4006 in a single uniform direction with cloth. The rubbing directions are arranged so as to be parallel when substrates 4001 and 4008 are assembled in face-to-face, spatial relation forming a gap portion having a cell thickness of 10 μm.

A mixture of biphenyl methacrylate and a liquid crystal material, product No. PN001, available from Rodick Inc., were dissolved into each other at a temperature of 100° C. in a ratio of 15:85 and sealed within the gap portion between the substrates. The mixture of the polymer precursor and the liquid crystal material is then gradually cooled, aligned, and thereafter exposed to ultraviolet light at room temperature so one component, polymer 4004, became a solid phase and the other component, liquid crystal material 4005, remains in a liquid phase. A black velvet cloth can be used as the background for the display.

With a display provided as shown in FIG. 52, the electro-optical characteristics were measured, yielding the results indicated in FIG. 53. The angle of incident light 4011 is set to 65° relative to a plane parallel with the substrate surface. As shown in FIG. 53, the horizontal scale shows the applied voltage, at frequency of 1 KHz, and the vertical scale shows the reflectance as compared to the case where a perfect scattering plate provides 100% reflection. The solid line in FIG. 53 indicates the electro-optical characteristics in the case where the direction of alignment of polymer 4004 is perpendicular to the plane of the substrate 4001 and perpendicular to the plane of the optical axis of incident light 4011, e.g., the drawing sheet containing FIGS. 52 and 53. The broken line in FIG. 53 indicates the electro-optical characteristics in the case where the direction of alignment of polymer 4004 is parallel to the plane of the substrate 4001 and parallel to the plane of the optical axis of incident light 4011, e.g., the drawing sheet containing FIGS. 52 and 53. As shown, the solid line shows a better characteristic than the broken line. This is because the light scattering performance of polymer 4004 is isotropic. Consequently, more effective light scattering is achieved when the polarized light is perpendicular to the plane of the substrate and the optical axis of incident light. Normally, light from the direction of the ceiling in a room is reflected at the walls to be significantly polarized, and this polarized light when entering the display is further polarized at the interface of transparent substrate. If the display is so arranged that the polarizing direction matches the alignment direction of the polymer, the light will be efficiently scattered.

Polymer will show a liquid crystal phase even when mixed with liquid crystal material, and a benzene molecular structure, or preferably a biphenyl molecular structure, is introduced in polymer. Further, polymer should be polymerized in a liquid crystal phase when exposed to ultraviolet radiation. A polymer even without benzene molecular structure can be used as well if it aligns with liquid crystal material. The material that can be used for the alignment film is not limited to polyimide. The alignment film is eliminated, if required, and, in such a case, rubbing the substrate with cloth is performed. Various alignment processes can be used as long as they can align liquid crystal material.

Furthermore, liquid crystal material is not limited to the material specified, although a liquid crystal material with a large refractive index will improve the contrast. The optimum amount of liquid crystal material in the composite layer mixture is in the range between 50% and 97%. If the amount of liquid crystal material employed is less than this range, the display will not respond to an applied electric field. If the amount of liquid crystal material employed is greater than this range, the proper contrast cannot be obtained. If dichroic dye is mixed in with the liquid crystal material, the reflectance, under field-OFF conditions, can be reduced, thereby improving the contrast.

Forty-First Embodiment

FIG. 54 illustrates a PDLC display according to a forty-first embodiment of this invention comprising polarizor plate 4009 and reflector plate 4010 formed on the back of the display. Otherwise, the basic structure of this embodiment is the same as that of the fortieth embodiment of FIG. 52. Polarizor plate 4009 is disposed on the back of the display so that polarized light is perpendicular to the alignment direction of polymer 4004, while reflector plate 4010 reflects the polarized light. In FIG. 54, the arrow at polarizor plate 4009 indicates its polarizing direction.

FIG. 55 indicates the electro-optical characteristics according to this embodiment wherein, with an applied electric field to the display, the amount of light reflected is 60% compared with the case of a perfect scattering plate so that the display efficiently scatters the light. The light passing through the display, passes through polarizor plate 4009 and is reflected by reflector plate 4010 and, thereafter, passes again through polarizor plate 4009 and through the display. The resulting viewing appearance is that the display appears brighter because this light passes through the display and is reflected out.

While the polarizing direction of polarizor plate 4009 is set perpendicular to the alignment direction of polymer 4004, the same or similar effect is inherent if these respective directions cross each other at a substantially perpendicular angle. Polarizor plate 4009 and reflector plate 4010, or substrate 4008, polarizor plate 4009 and the reflector 4010 are formed as an integral unit. If dichroic dye is mixed with liquid crystal material 4005 and the polarizing direction of polarizor plate 4009 is set parallel to the alignment direction of polymer 4005, the color of the display will be black under field-OFF conditions thereby improving contrast.

Forty-Second Embodiment

FIG. 56 illustrates a PDLC display according to a forty-second embodiment of this invention utilizing phase correcting plate 4013, light attenuating plate 4014, and reflector plate 4010 on the back of the display. Otherwise, the basic structure is the same as that of the fortieth embodiment shown in FIG. 52. Phase correcting plate 4013 is disposed on back of the display so that its alignment direction forms an angle of 45° with the alignment direction of polymer 4004. Light attenuating plate 4014 is disposed on the back of plate 4013, followed by reflector plate 4010. If the direction of alignment of phase correcting plate 4013 does not form an angle of 45° with the direction of alignment of polymer 4004, the brightness of the display will not be improved. Phase correcting plate 4013 is a plate having a delay of quarter wavelength (144 nm) relative to green light. Other phase correcting plates may be employed if its positional relationship relative to the display is optimized.

FIG. 57 shows the electro-optical characteristics of the display according to this embodiment wherein, with an applied electric field to the display, the amount of light reflected is 80%, compared with the case of a perfect scattering plate so that the display efficiently scatters the light. Moreover, this embodiment scatters light more efficiently than the previous embodiment shown in FIG. 54. According to the structure of this embodiment, light having passed through the display composite layer undergoes phase correction by phase correcting plate 4013, passes through attenuating plate 4014 and is reflected at reflector plate 4010. The reflected light then passes through light attenuating plate 4014, undergoes again phase correction by phase correcting plate 4013, and then returns through the display composite layer after its polarizing direction has been rotated 90°. The light reflected at reflector plate 4010 is scattered again by the display, rendering the display brighter. Light attenuating plate 4014 is provided to rendered the display black under field-OFF conditions. Light attenuating plate 4014 has a transmittance of 60%, but other types may be employed as well, in which case, optimization is required. The color provided can be any desired color.

Phase correcting plate 4013 and light attenuating plate 4014, or light attenuating plate 4014 and reflector plate 4010, or phase correcting plate 4013, light attenuating plate 4014 and reflector plate 4010 are formed as an integral unit. If dichroic dye is mixed with the liquid crystal material, the contrast can be improved.

As described above, good transparency can be accomplished under field-OFF conditions by aligning the liquid crystal material and polymer in a given direction. Use of this display can be applied to car windows wherein the windows become transparent under field-OFF conditions thereby providing a fail-safe light controlling window glass. Further, adding a chiral component in the liquid crystal material results in good light scattering conditions under applied voltage conditions as well as improve the threshold characteristics of the display as well as reducing the hysteresis response, which may become prominent when the polarity of the applied voltage is changed. The provision of a reflection layer can provide a reflection mode. A PDLC device will have good contrast with a low drive voltage useful for very large screen area displays. Employing two or more types of polymer precursors can enhance the display specific resistance after fabrication of the display as well as improve the charge holding ratio. By mixing dichroic dye into the liquid crystal material, good transparency can be achieved under field-OFF conditions, and a good colored scattering mode can be achieved under field-ON conditions. Furthermore, it is possible to provide a high-visibility and bright display with an excellent contrast by employing a field controlled type polarizor element. The present invention has utility in photo-sunglasses, which normally function as ordinary glasses, but can remove polarized light when an electric field is applied.

The present invention provides a basic technique of widening the application of a PDLC display to applications of a simple matrix type display as well as to applications of large viewing screen areas utilizing active matrix type display elements.

Summary of Observations

It is preferable that the inner surface of at least one of the two substrates be subjected to a fixed alignment to align both the liquid crystal material and the polymer in a direction parallel to the substrate, or to align the liquid crystal material and the polymer perpendicular to the substrate. One of two substrates may be provided with an alignment surface for aligning the direction of the liquid crystal material and the polymer in a direction parallel to the substrate, while the other substrate has an alignment surface for aligning the direction of the liquid crystal material and the polymer perpendicular to the substrate. An alignment film on the surface of the substrate may be employed for the alignment.

One of the two substrates may have an electrode that functions also as a reflector, or, further, includes a film reflector. Alternatively, one of the substrates may have a reflector, or, further, includes a film reflector.

The liquid crystal material is a nematic liquid crystal material that has a chiral component and/or a dichroic dye or dyes. Chiral monomers may be employed for the chiral component. Even a slight amount of chiral component will reduce the driving voltage required for field-ON conditions in homeotropic alignment.

Further, the polymer comprises a phenyl or biphenyl side chain, an ultraviolet-hardened polymer, a thermosetting polymer, a thermoplastic polymer, or a liquid crystal polymer. The polymer may have a cosolvent, and have a liquid crystal phase in a liquid phase state. The polymer can comprise a polymerization of at least two types of combined polymer precursors having a polymer portion and an aromatic ring.

At least one of the polymer precursors may contain a mesogenic portion, or fluorine atoms on a side chain accompanying a mesogenic portion, or a mesogenic portion containing naphthalene, phenyl or biphenyl and a derivative, and is polymerized to a hardened state by means of ultraviolet light exposure.

Further, a phase-shift plate, i.e., a quarter-wave plate, may be disposed between a composite layer and a reflection layer, with the optical axis of the phase-shift plate forming an angle of 45° with the alignment direction of the liquid crystal/polymer composite layer. The phase-shift plate may include a transparent electrode. A reflection layer may be formed on a surface of the phase-shift plate.

Two PDLC display elements may be employed together in which the alignment directions of the liquid crystal material and the polymer in the composite layer of the display elements perpendicularly intersect one another. Preferably, the alignment direction of the polymer is perpendicular to the plane of the substrates and the optical axis of incident light. Further, a combination of a polarizing plate and a reflector plate may be employed on a back surface of one of the substrates. Alternatively, a combination of a phase correcting plate, a light attenuating plate and a reflector plate may be employed on the back surface of one of the substrates.

A method of fabricating a PDLC display according to this invention is characterized by the steps of heating a liquid crystal material and a thermoplastic polymer to cause the liquid crystal material and the polymer to be dissolved in one another, mixing the dissolved components together, aligning the liquid crystal material and the polymer in the same direction, cooling the resultant structure to harden the polymer and phase separating the liquid crystal material from the polymer while maintaining the alignment of the polymer. Alternatively, a method of fabricating a PDLC display according to this invention is characterized by the steps of heating a liquid crystal material and a polymer precursor to cause the liquid crystal material and the polymer precursor to be dissolved in one another, mixing the dissolved components together, aligning the liquid crystal material and the polymer precursor in the same direction in while their liquid phase, polymerizing the polymer precursor to yield a polymer and phase separating the liquid crystal material from the polymer while maintaining the alignment of the polymer. Alternatively, either two substrates or one substrate may be utilized. Preferably, at least one of the substrates is subjected to an alignment fixing process.

It is desirable to adjust the rate for phase separation between the polymer and liquid crystal to provide for a polymer grain size in the range of 0.1 μm to 10.0 μm, permitting the polymer to provide the best light scattering effect.

A derivative of methacrylate of biphenyl methanol, ester acrylate, or a compound thereof may be employed for the polymer precursor component, or a derivative of methacrylate of naphthol, ester acrylate, or a compound thereof may be employed for the polymer precursor component. Further, a mixture of the ester and a derivative of methacrylate of biphenyl methanol, or a derivative of ester acrylate may be employed for the polymer precursor component.

While the invention has been described in conjunction with several specific embodiment of the present inventions, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

We claim:

1. A method of fabricating a polymer dispersed liquid crystal display having a polymer dispersed liquid crystal medium formed in a gap portion in said display comprising the steps of:

forming a mixture of liquid crystal material and thermoplastic polymer to cause said liquid crystal material and polymer to be soluble in one other;

injecting said soluble mixture in the gap portion, aligning the liquid crystal material and polymer in a predetermined direction while said mixture remains in its soluble state; and causing said mixture to bring about a phase separation between the liquid crystal material and the polymer forming polymer grains dispersed throughout the liquid crystal material retaining their original alignment in said predetermined direction.

2. The method of fabricating of claim 1, further comprising, before the step of injecting, the step of preparing at least one inner surface of said gap portion with a means for aligning liquid crystal material and polymer in a direction substantially parallel with or perpendicular to the plane of a substrate proximate to said gap.

3. A method of fabricating a polymer dispersed liquid crystal display comprising the steps of:

forming a mixture of liquid crystal material and polymer precursor to cause said liquid crystal material and polymer precursor to be soluble in one other in their liquid phases, aligning said liquid crystal material and polymer precursor in a predetermined direction while in their liquid phases; and polymerizing said polymer precursor in-situ to form a plurality of solid polymer grains dispersed throughout said liquid crystal material with a phase separation occurring between the liquid crystal material and the polymer grains wherein the polymer grains maintain said predetermined directional alignment.

4. The method of fabricating of claim 3, further comprising the steps, before polymerizing, of:

sealing said mixture between two substrates and aligning said liquid crystal material and said polymer precursor in said predetermined direction by means of an orientation process provided on at least one of said substrates.

5. The method of fabricating of claim 3, further comprising the step of controlling the rate of polymerization to adjust the rate of phase separation to yield polymer grain sizes in the range of about 0.1 $\mu$m–10.0 $\mu$m.

6. The method of claim 3 wherein said polymer precursor comprises a liquid crystal phase.

7. A method of fabricating a polymer dispersed liquid crystal display comprising the steps of:

processing at least one inner surface of a pair of planar substrates having inner electrodes to align a liquid crystal material and a polymer precursor in contact therewith in a direction substantially parallel with or perpendicular to the plane of said substrates;

forming a mixture of the liquid crystal material and polymer precursor into each other;

sealing said mixture between said substrates; and polymerizing said polymer precursor in-situ to yield a polymer, such that a phase separation is exhibited between the liquid crystal material and polymer with the polymer retaining said alignment.

8. A method of fabricating a polymer dispersed liquid crystal display comprising the steps of:

processing a surface of a first substrate to enable a liquid crystal material and a polymer precursor to align in a common direction substantially parallel with or perpendicular to the plane of said substrate;

forming a mixture of the liquid crystal material and the polymer precursor into each other to form a soluble liquid phase and coating said mixture onto said substrate;

aligning the liquid crystal material and said polymer precursor in said common direction while in said soluble liquid phase; and polymerizing said polymer precursor to yield a polymer, so as to have a phase separation between the liquid crystal material and polymer which retains said common direction alignment.

9. The method of fabricating of claim 8 wherein said polymer precursor comprises a derivative form of at least one of biphenyl methacrylate, biphenyl acrylate, naphthyl methacrylate and naphthyl acrylate.

10. The method of fabricating of claim 8 wherein said polymer precursor comprises a mixture of an ester and at least one of a derivative of biphenylmethyl methacrylate and a derivative of biphenylmethyl acrylate.

11. A liquid crystal device made according to the process of:

sealing in said device a mixture of a liquid crystal material and a polymer precursor while both are in their liquid phase;

transmitting a predetermined direction of alignment to said polymer precursor through said liquid crystal material utilizing an alignment means; and solidifying the polymer precursor into a hardened polymer while causing the precipitation of said polymer from said mixture into a plurality of solid grains dispersed throughout said liquid crystal material such that said predetermined direction of alignment is permanently retained by said polymer grains.

12. The liquid crystal device of claim 11 wherein the step of transmitting said predetermined direction of alignment is derived from rubbing the inside of at least one substrate in contact with said mixture.

13. The liquid crystal device of claim 11 wherein the step of transmitting said predetermined direction of alignment is derived from forming an aligning layer on an inside surface of at least one substrate in contact with said mixture.

14. A polymer dispersed liquid crystal device comprising a mixture of in-situ fixation of pre-aligned polymer grains dispersed in a layer of liquid crystal medium sealed by at least one substrate in contact with said mixture.

15. The polymer dispersed liquid crystal device of claim 14 wherein the amount of liquid crystal material in said mixture exceeds the amount of polymer grains and is in the range between 50% and 97% of the mixture with said polymer.

16. The polymer dispersed liquid crystal device of claim 14 further comprising means for establishing an aligning direction for said polymer grains before and during fixing of the orientation of said polymer grains in said mixture, said liquid crystal material transmitting said aligning direction for said polymer grains before and during said orientation fixing.

17. The device of claim 16 wherein said fixing is accomplished by polymerization.

18. The polymer dispersed liquid crystal device of claim 16 wherein said alignment means comprises an alignment treatment applied to a surface of said one at least substrate in contact with said mixture.

19. The polymer dispersed liquid crystal device of claim 14 wherein said mixture includes a component for orienting said polymer grains and said liquid crystal medium in an elongated helical twist.

20. The polymer dispersed liquid crystal device of claim 19 wherein said component comprises a chiral component.

21. An improved polymer dispersed liquid crystal device having a drive voltage requirement under five volts, the improvement comprising:

a polymer precursor comprising a monomethacrylate and not a diacrylate; and a liquid crystal layer comprising a liquid crystal material having a cholesteric pitch in the range of about 30 $\mu$m to about 0.60 $\mu$m.

22. The polymer dispersed liquid crystal device of claim 21 wherein the polymer precursor and liquid crystal material are mixed together in a solution with the polymer precursor being in the range between 3% and 50%.

23. The polymer dispersed liquid crystal device of claim 21 wherein the polymer precursor has been polymerized into grains that are not necessarily spherical.

24. The polymer dispersed liquid crystal device of claim 21 wherein the polymer precursor and liquid crystal material subsequent to polymerization are such that light dispersion in one of the field-ON and field-OFF conditions is caused by a substantial difference that exists in the respective refractive indices of the polymer and the liquid crystal material and not by a phase transition that occurs between the cholesteric phase and the nematic phase.

25. A polymer dispersed liquid crystal device having a spatial gap portion formed between spaced electrodes formed on respective substrates, comprising:
   a liquid crystal phase in said gap portion,
   a polymer phase comprising a plurality of polymeric grains dispersed in said liquid crystal phase,
   said liquid crystal phase having positive or negative dielectric anisotropy,
   alignment means provided relative to at least one of said substrates for orienting optical axes of both said liquid crystal phase and said polymer phase in a predetermined direction relative to a surface of said electrodes,
   means to fix the orientation of said polymer phase in said predetermined direction, and
   means to apply a field between said electrodes to switch between two conditions comprising matching and mismatching of the optical axes of said liquid crystal phase relative to said fixed polymer phase so that in one condition a light transparent state is created and in another condition a light dispersion state is created.

26. The polymer dispersed liquid crystal device of claim 25 wherein the total amount of said polymer phase within said liquid crystal phase is less than the total amount of liquid crystal phase present in said gap portion.

27. The polymer dispersed liquid crystal device of claim 26 wherein the total amount of said liquid crystal phase relative to said polymer phase is in the range between 50% and 97%.

28. The polymer dispersed liquid crystal device of claim 25 wherein said direction of orientation of the optical axis of said polymer phase is oriented and fixed in said liquid crystal phase in a direction substantially parallel to the surface of said electrodes.

29. The polymer dispersed liquid crystal device of claim 25 wherein said direction of orientation of the optical axis of said polymer phase is oriented and fixed in said liquid crystal phase in a direction substantially perpendicular to the surface of said electrodes.

30. The polymer dispersed liquid crystal device of claim 25 wherein said liquid crystal phase comprises a nematic liquid crystal containing a chiral component.

31. The polymer dispersed liquid crystal device of claim 25 wherein said liquid crystal phase includes a dichroic dye material.

32. The polymer dispersed liquid crystal device of claim 25 wherein one of said electrodes has a light reflecting surface.

33. The polymer dispersed liquid crystal device of claim 25 wherein said polymer phase comprises a polymer precursor hardened by ultraviolet light or heat comprising said fixing means.

34. The polymer dispersed liquid crystal device of claim 25 wherein said polymer phase comprises a thermoplastic polymer, a liquid crystal polymer or a polymer having a cosolvent with a liquid crystal.

35. The polymer dispersed liquid crystal device of claim 25 wherein said fixing means for said polymer phase is obtained from polymerization of one or more polymer precursors containing molecules having one or more polymerizable portions and one or more aromatic ring portions.

36. The polymer dispersed liquid crystal device of claim 35 wherein said ring portions comprise phenyl or biphenyl or naphthyl or derivatives thereof.

37. The polymer dispersed liquid crystal device of claim 25 further comprising a phase-shift plate positioned between said gap portion and one of said substrates, and a reflection layer formed on said one substrate.

38. The polymer dispersed liquid crystal device of claim 25 further comprising a polarizing plate and a reflector plate formed on a back surface of one of said substrates.

39. The polymer dispersed liquid crystal device of claim 25 further comprising a phase correcting plate, a light attenuating plate, and a reflector plate formed on a back surface of one of said substrates.

40. The polymer dispersed liquid crystal device of claim 25 wherein said polymer phase comprises a polymer having no liquid crystal characteristics.

41. The polymer dispersed liquid crystal device of claim 25 wherein said alignment means is applied to said substrates, alignment relative to a surface of one of said substrates being such that molecules in the liquid crystal phase and polymer grains in the polymer phase approximate to the one substrate surface align parallel with the one substrate surface, and alignment relative to a surface of the other of said substrates being such that molecules in the liquid crystal phase and polymer grains in the polymer phase approximate to the other substrate surface align perpendicular to the other substrate surface.

42. A polymer dispersed liquid crystal device having a spatial gap portion formed between spaced electrodes formed on respective substrates, comprising:
   a liquid crystal phase in said gap portion,
   a polymer phase comprising solid polymeric grains dispersed in said liquid crystal phase,
   optical axes of said liquid crystal phase and said polymer phase alignable in a common direction substantially parallel with a surface of said electrodes,
   means provided in said liquid crystal phase to provide a helical twist to said polymer phase extending through said gap portion in a direction transverse to said electrode surface, and
   means to apply a field between said electrodes to switch between two conditions comprising matching and mismatching of the optical axes of said liquid crystal phase relative to said polymer so that in one condition a light transparent state is created and in another condition a light dispersion state is created.

43. The polymer dispersed liquid crystal device of claim 42 wherein said provided means comprises a chiral element is added to said liquid crystal phase to bring about said helical twist.

44. The polymer dispersed liquid crystal device of claim 43 wherein said optical axes of said polymer phase and said liquid crystal phase are gradually twisted about an axis perpendicular to said planar electrode surface.

45. The polymer dispersed liquid crystal device of claim 42 wherein one of said electrodes has a light reflecting surface.

46. The polymer dispersed liquid crystal device of claim 42 wherein said liquid crystal phase comprises a nematic liquid crystal containing a chiral component whereby said polymer phase and said liquid crystal phase are oriented between said electrodes in an elongated helical structure having an axial orientation substantially perpendicular to a planar extent of said electrodes.

47. The polymer dispersed liquid crystal device of claim 42 wherein the helical twist provided to said liquid crystal phase includes a dichroic dye material.

48. The polymer dispersed liquid crystal device of claim 42 wherein said polymer phase is fixed in its orientation by inclusion of a polymer precursor hardened by ultraviolet light or heat.

49. The polymer dispersed liquid crystal device of claim 42 wherein said polymer phase comprises a thermoplastic polymer, a liquid crystal polymer or a polymer having a cosolvent with a liquid crystal.

50. The polymer dispersed liquid crystal device of claim 42 wherein said polymer is obtained from polymerization of one or more polymer precursors containing molecules having one or more polymerizable portions and one or more aromatic ring portions.

51. The polymer dispersed liquid crystal device of claim 50 wherein said ring portions comprise phenyl or biphenyl or naphthyl or derivatives thereof.

52. The polymer dispersed liquid crystal device of claim 42 wherein said polymer phase comprises a polymer having no liquid crystal characteristics.

53. A polymer dispersed liquid crystal device having a light modulating material formed between spatially disposed electrodes, comprising:
   said light modulating material comprising a polymer phase and a liquid crystal phase,
   said polymer phase and a liquid crystal phase having optical axes alignable together in a predetermined direction,
   light absorption additive included in said liquid crystal phase to provide for light absorption when said optical axes are aligned in said predetermined direction,
   means to apply a field between said electrodes to switch between two conditions comprising alignment and misalignment of the optical axes of said liquid crystal phase relative to said polymer phase so that in one condition a light absorption state is created in said material and in another condition a light dispersion state is created in said material.

54. The polymer dispersed liquid crystal device of claim 53 wherein said light absorption state occurs when the optical axes of said polymer phase and a liquid crystal phase are aligned in said predetermined direction, and said light dispersion state occurs when said optical axes are misaligned.

55. The polymer dispersed liquid crystal device of claim 54 wherein said misalignment is the case wherein the optical axes of said liquid crystal phase is substantially orthogonal to said predetermined direction.

56. The polymer dispersed liquid crystal device of claim 53 wherein said predetermined direction is substantially parallel to said electrodes.

57. The polymer dispersed liquid crystal device of claim 53 wherein said liquid crystal phase has positive dielectric anisotropy and optical axes of said polymer phase and said liquid crystal phase are aligned to be substantially parallel to a surface of said electrodes.

58. The polymer dispersed liquid crystal device of claim 57 wherein said light absorption additive comprises a dichroic dye material.

59. The polymer dispersed liquid crystal device of claim 53 wherein said light absorption state occurs when said applied field is OFF and said light dispersion state occurs when said field is ON.

60. The polymer dispersed liquid crystal device of claim 53 wherein one of said electrodes has a light reflecting surface.

61. The polymer dispersed liquid crystal device of claim 53 wherein said liquid crystal phase comprises a nematic liquid crystal containing a chiral component.

62. The polymer dispersed liquid crystal device of claim 53 wherein said polymer phase comprises a precursor hardened by ultraviolet light or heat.

63. The polymer dispersed liquid crystal device of claim 53 wherein said polymer phase comprises a thermoplastic polymer, a liquid crystal polymer or a polymer which has a cosolvent with a liquid crystal.

64. The polymer dispersed liquid crystal device of claim 53 wherein said polymer phase comprises a polymer having no liquid crystal characteristics.

65. The polymer dispersed liquid crystal device of claim 53 wherein said polymer phase is obtained from polymerization of one or more polymer precursors containing molecules having one or more polymerizable portions and one or more aromatic ring portions.

66. The polymer dispersed liquid crystal device of claim 65 wherein said ring portions comprise phenyl or biphenyl or naphthyl or derivatives thereof.

67. The polymer dispersed liquid crystal device of claim 53 further comprising a substrate for supporting each of said electrodes, a phase-shift plate positioned between said material and one of said substrates, and a reflection layer formed on said one substrate.

68. The polymer dispersed liquid crystal device of claim 53 further comprising a substrate for supporting each of said electrodes, and alignment means provided relative to at least one of said substrates for orienting optical axes of both said liquid crystal phase and said polymer phase in said predetermined direction relative to a surface of said planar electrodes.

69. A polymer dispersed liquid crystal device having a light modulating material formed between spatially disposed electrodes, comprising:
   said light modulating material comprising a polymer phase dispersed in a liquid crystal phase,
   said polymer phase and a liquid crystal phase having optical axes alignable together in a predetermined direction,
   means to apply a field between said electrodes to switch between two conditions comprising matching and mismatching of the optical axes of said liquid crystal phase relative to said polymer phase wherein in a field-OFF condition, incident light on said device is transparent in said material and wherein in a field-ON state, incident light on said device is absorbed and dispersed.

70. The polymer dispersed liquid crystal device of claim 69 wherein said liquid crystal phase has negative dielectric anisotropy, said aligned optical axes of said polymer phase and said liquid crystal phase substantially perpendicular to a surface of said electrodes during the occurrence of said field-OFF state.

71. The polymer dispersed liquid crystal device of claim 69 wherein said liquid crystal phase includes a dichroic dye material.

72. The polymer dispersed liquid crystal device of claim 69 wherein said polymer phase comprises a precursor hardened by ultraviolet light or heat.

73. The polymer dispersed liquid crystal device of claim 69 wherein said polymer phase comprises a thermoplastic polymer, a liquid crystal polymer or a polymer which has a cosolvent with a liquid crystal.

74. The polymer dispersed liquid crystal device of claim 69 wherein said polymer phase comprises a polymer having no liquid crystal characteristics.

75. The polymer dispersed liquid crystal device of claim 69 wherein said polymer phase is obtained from polymerization of one or more polymer precursors containing molecules having one or more polymerizable portions and one or more aromatic ring portions.

76. The polymer dispersed liquid crystal device of claim 75 wherein said ring portions comprise phenyl or biphenyl or naphthyl or derivative thereof.

77. A polymer dispersed liquid crystal device having a light modulating material formed between spatially disposed electrodes, comprising:
said light modulating material comprising a polymer phase and a liquid crystal phase,
said polymer phase and a liquid crystal phase having optical axes alignable together in a direction substantially perpendicular to a planar extent of said electrodes,
light absorption additive included in said liquid crystal phase to provide for light absorption and scattering when said optical axes are nonaligned in said direction,
means to apply a field between said electrodes to switch between two conditions comprising matching and mismatching of the optical axes of said liquid crystal phase relative to said polymer phase wherein in a field-OFF condition, said polymer phase and a liquid crystal phase optical axes are aligned and incident light on said device is transparent in said material and wherein in a field-ON state, said polymer phase and a liquid crystal phase optical axes are misaligned and incident light on said device is absorbed and scattered.

78. The polymer dispersed liquid crystal device of claim 77 wherein said polymer phase is dispersed in a liquid crystal phase.

79. The polymer dispersed liquid crystal device of claim 77 wherein said light absorption additive comprises a dichroic dye material.

80. The polymer dispersed liquid crystal device of claim 77 wherein said polymer phase comprises a precursor hardened by ultraviolet light or heat.

81. The polymer dispersed liquid crystal device of claim 77 wherein said polymer phase comprises a thermoplastic polymer, a liquid crystal polymer or a polymer which has a cosolvent with a liquid crystal.

82. The polymer dispersed liquid crystal device of claim 77 wherein said polymer phase comprises a polymer having no liquid crystal characteristics.

83. The polymer dispersed liquid crystal device of claim 77 wherein said polymer phase is obtained from polymerization of one or more polymer precursors containing molecules having one or more polymerizable portions and one or more aromatic ring portions.

84. The polymer dispersed liquid crystal device of claim 83 wherein said ring portions comprise phenyl or biphenyl or naphthyl or derivatives thereof.

85. A light modulating liquid crystal layer comprising
a birefringent, polymer, solid phase having no liquid crystal characteristics dispersed in a birefringent, liquid crystal phase,
optical axes of said phases aligned relative to at least one surface of two surfaces between which the layer is maintained, ordinary and extraordinary indices of refraction of said phases being matched whereby the layer is transparent when the respective optical axes of said phases are in an aligned state, and the layer is opaque when the respective optical axes of said phases are in an unaligned state wherein said respective optical axes are substantially in orthogonal relation,
said unaligned state occurring when an electric field is applied across said liquid crystal layer and said aligned state occurring in the absence said electric field across said liquid crystal layer.

86. The light modulating liquid crystal material of claim 85 wherein said relative alignment is either substantially perpendicular to or parallel with said material surface.

87. The light modulating liquid crystal material of claim of 85 wherein a chiral component is added to said liquid crystal phase.

88. The light modulating liquid crystal material of claim 85 wherein said birefringent, polymer, solid phase comprises a plurality of polymeric solid grains dispersed throughout said liquid crystal phase comprising a liquid crystal medium.

89. The light modulating liquid crystal material of claim of 88 wherein said polymeric solid grains are formed from a methacrylate having no liquid crystal side chains.

90. The light modulating liquid crystal material of claim of 89 wherein said methacrylate comprises naphthyl methacrylate, biphenyl methacrylate or biphenylmethyl methacrylate.

91. A light modulating liquid crystal layer comprising
a birefringent, liquid crystal or solid polymer dispersed in a birefringent, liquid crystal phase wherein said solid polymer,
the ratio of said liquid crystal phase to said polymer being greater than 1:1,
a chiral type component additive included in said liquid crystal phase to provide a helical twist orientation to both said polymer and liquid crystal phase,
means to fix the helical twist orientation of said polymer in said liquid crystal phase,
optical axes of said liquid crystal phase and said polymer aligned relative to at least one surface of two surfaces between which the layer is maintained,
ordinary and extraordinary indices of refraction of said liquid crystal phase and said polymer being matched whereby the layer is transparent when the optical axes of said liquid crystal phase and polymer are in an aligned state, and the layer is opaque when the optical axes of said liquid crystal phase and polymer are in unaligned state.

92. The light modulating liquid crystal material of claim 91 wherein said liquid crystal phase is between 50% and 97% of said material.

93. The light modulating liquid crystal material of claim 91 wherein said material is transparent in a field-OFF state and is opaque in a field-ON state.

94. A light modulating liquid crystal material comprising:
a birefringent, polymer, solid phase having no liquid crystal characteristics dispersed in a birefringent, liquid crystal phase,
light absorption additive included in said liquid crystal phase,
the effective indices of refraction of the polymer solid phase and the liquid crystal phase being matched for all directions of incident light so that the material is transparent in a field-OFF state, and the effective indices of refraction are mismatched in directions of incident light so that the material is light absorbing and scattering in a field-ON state.

95. An improved polymer dispersed liquid crystal device having a drive voltage requirement under five volts, the improvement comprising:
 a polymer precursor comprising a monomethacrylate and not a diacrylate; and
 a liquid crystal layer comprising a liquid crystal material having a chiral component in the range of 0.1% to 5%.

* * * * *

UNITED STATES PATENT AND TRADEMARK OFFICE
CERTIFICATE OF CORRECTION

PATENT NO. : 5,305,126
DATED : April 19, 1994
INVENTOR(S) : Hidekazu Kobayashi, et al.

It is certified that error appears in the above-identified patent and that said Letters Patent is hereby corrected as shown below:

Title page, item [54] and col. 1, lines 1-6, should read as follows:

"Polymer Dispersed Liquid Crystal (PDLC) Device"..

Signed and Sealed this

Twenty-first Day of February, 1995

Attest:

BRUCE LEHMAN

*Attesting Officer*                *Commissioner of Patents and Trademarks*